US011300810B2

(12) United States Patent
Yamamoto et al.

(10) Patent No.: US 11,300,810 B2
(45) Date of Patent: Apr. 12, 2022

(54) DISPLAY DEVICE FOR AERIAL IMAGE HAVING RETRO-REFLECTIVE PART

(71) Applicant: Utsunomiya University, Utsunomiya (JP)

(72) Inventors: Hirotsugu Yamamoto, Utsunomiya (JP); Yutaka Tokuda, Utsunomiya (JP); Shusei Ito, Utsunomiya (JP); Nao Kurokawa, Utsunomiya (JP)

(73) Assignee: Utsunomiya University, Utsunomiya (JP)

( * ) Notice: Subject to any disclaimer, the term of this patent is extended or adjusted under 35 U.S.C. 154(b) by 699 days.

(21) Appl. No.: 16/002,592

(22) Filed: Jun. 7, 2018

(65) Prior Publication Data
US 2018/0284470 A1 Oct. 4, 2018

Related U.S. Application Data

(63) Continuation of application No. PCT/JP2016/086351, filed on Dec. 7, 2016.

(30) Foreign Application Priority Data

Dec. 7, 2015 (JP) .............................. JP2015-238993
Aug. 31, 2016 (JP) .............................. JP2016-170376

(51) Int. Cl.
*G02B 5/30* (2006.01)
*G02B 27/02* (2006.01)
(Continued)

(52) U.S. Cl.
CPC ............... *G02B 30/56* (2020.01); *G02B 5/12* (2013.01); *G02B 5/124* (2013.01); *G02B 5/128* (2013.01);
(Continued)

(58) Field of Classification Search
CPC ........ G02B 5/12–136; G02B 27/10–16; G02B 30/56
See application file for complete search history.

(56) References Cited

U.S. PATENT DOCUMENTS 5,726,806 A * 3/1998 Holden ................... G02B 27/01
359/630
5,861,993 A 1/1999 Shanks et al.
(Continued)

FOREIGN PATENT DOCUMENTS

CN 103033972 A 4/2013
EP 0460873 B1 4/1995
(Continued)

OTHER PUBLICATIONS

International Search Report dated Mar. 7, 2017, issued in corresponding International Application No. PCT/JP2016/086351, filed Dec. 7, 2016, 11 pages.
(Continued)

Primary Examiner — Ryan S Dunning
(74) Attorney, Agent, or Firm — Christensen O'Connor Johnson Kindness PLLC

(57) ABSTRACT

A display device (1A) according to the present invention includes a first light source, a first retro-reflective part disposed at a position in an emission direction of first light emitted from the first light source, and a first light-separating part configured to reflect a part of the first light that has passed through the first retro-reflective part as a first reflected light and transmits at least a part of the first reflected light.

9 Claims, 38 Drawing Sheets

(51) Int. Cl.

| | |
|---|---|
| *G02B 27/14* | (2006.01) |
| *G02B 30/56* | (2020.01) |
| *G02B 5/12* | (2006.01) |
| *G02B 27/28* | (2006.01) |
| *G02B 5/124* | (2006.01) |
| *G02B 5/128* | (2006.01) |
| *G02B 30/25* | (2020.01) |
| *G02B 5/04* | (2006.01) |

(52) U.S. Cl.
CPC ............ *G02B 5/3083* (2013.01); *G02B 27/14* (2013.01); *G02B 27/283* (2013.01); *G02B 30/25* (2020.01); *G02B 5/045* (2013.01)

(56) References Cited

U.S. PATENT DOCUMENTS

| | | | | |
|---|---|---|---|---|
| 6,055,108 | A * | 4/2000 | Dreyer .................. | G02B 5/124 359/529 |
| 2009/0290126 | A1 | 11/2009 | Yabui et al. | |
| 2010/0214394 | A1 | 8/2010 | Maekawa | |
| 2015/0153577 | A1 | 6/2015 | Nikitin et al. | |
| 2015/0248014 | A1 | 9/2015 | Powell et al. | |

FOREIGN PATENT DOCUMENTS

| | | | |
|---|---|---|---|
| JP | H08-511631 | A | 12/1996 |
| JP | 9-506717 | A | 6/1997 |
| JP | 3097559 | U | 1/2004 |
| JP | 2004-294668 | A | 10/2004 |
| JP | 2006-030507 | A | 2/2006 |
| JP | 2006-113476 | A | 4/2006 |
| JP | 2006-309115 | A | 11/2006 |
| JP | 2009-025776 | A | 2/2009 |
| JP | 2009-075483 | A | 4/2009 |
| JP | 2009-229905 | A | 10/2009 |
| JP | 2010-002894 | A | 1/2010 |
| JP | 2010-224292 | A | 10/2010 |
| JP | 2010-262228 | A | 11/2010 |
| JP | 2011-070074 | A | 4/2011 |
| JP | 2012-118193 | A | 6/2012 |
| JP | 2013-080227 | A | 5/2013 |
| JP | 2014-145936 | A | 8/2014 |
| JP | 2015-040944 | A | 3/2015 |
| JP | 2015-152718 | A | 8/2015 |
| JP | 2015-203782 | A | 11/2015 |
| WO | 95/16935 | A1 | 6/1995 |
| WO | 2009/038173 | A1 | 3/2009 |
| WO | 2015/122473 | A1 | 8/2015 |

OTHER PUBLICATIONS

Written Opinion dated Mar. 7, 2017, issued in corresponding International Application No. PCT/JP2016/086351, filed Dec. 7, 2016, 9 pages.

Yamamoto, H., et al., "Floating Aerial LED Signage Based on Aerial Imaging by Retro-Reflection (AIRR)," Optics Express 22(22):26919-26924, Nov. 2014.

Notice of Reasons for Rejection dated Aug. 4, 2020, issued in corresponding Japanese Application No. 2016-170376, filed Aug. 31, 2016, 10 pages.

Notice of Reasons for Rejection dated Oct. 19, 2021, issued in corresponding Japanese Application No. 2020-201375, filed Dec. 3, 2020, 8 pages.

Notice of Reasons for Rejection dated Oct. 19, 2021, issued in corresponding Japanese Application No. 2020-201376, filed Dec. 3, 2020, 8 pages.

Notice of Reasons for Rejection dated Oct. 19, 2021, issued in corresponding Japanese Application No. 2020-201377, filed Dec. 3, 2020, 5 pages.

* cited by examiner

COLORED PART

PART THAT HAS BEEN COLORED

DISPLAY DEVICE FOR AERIAL IMAGE HAVING RETRO-REFLECTIVE PART

CROSS REFERENCE TO RELATED APPLICATIONS

This application is a continuation application based on a PCT Patent Application No. PCT/JP2016/086351, filed on Dec. 7, 2016, whose priority is claimed on Japanese Application No. 2015-238993, filed on Dec. 7, 2015, and Japanese Application No. 2016-170376, filed on Aug. 31, 2016, the entire content of which are hereby incorporated by reference.

BACKGROUND OF THE INVENTION

Field of the Invention

The present invention relates to a display device and a display method for an aerial image.

Description of the Related Art

In recent years, in the fields of communication and broadcasting, entertainment, art, healthcare, and the like, aerial display technologies through which it is possible to display an image that is visible without special glasses or the like in a 3D space have been focused on. As one of the methods of displaying an image in a 3D space as described above, aerial display (aerial imaging by retro-reflection: AIRR) using retro-reflection is known (for example, refer to H. Yamamoto, Y. Tomiyama, S. Suyama, "Floating aerial LED signage based on aerial imaging by retro-reflection (AIRR)," Optics Express, Vol. 22, No. 22, pp. 26919-26924, 2014).

A display device 101 shown in FIG. 53 is an example of an AIRR configuration, and includes a light source S that is provided in a display D1 or the like, a half mirror 104, and a retro-reflective part 106. Within light L1 emitted from the light source S, some of the light L101 is reflected by the half mirror 104 as reflected light L102. The reflected light L102 is incident on the retro-reflective part 106, is reflected by the retro-reflective part 106 in the same direction as the incident direction, and is incident on the half mirror 104 as reflected light L103, and also passes through the half mirror 104, and forms an aerial image I at a position Q1 that is plane-symmetrical to the display D1 with respect to the half mirror 104. A user can see the aerial image I displayed in a space A (that is, a space in which the user is present with respect to the half mirror 104) from an observation direction E0 on the side opposite to the light source S with respect to the half mirror 104. Here, the aerial image I that the user can observe is limited to a range in which the retro-reflective part 106 is visible from a viewpoint position of the user through the half mirror 104. Also if the aerial image I is formed, the user can observe only the aerial image I within the above range, that is, within an area Z1 shown in FIG. 53.

In addition, as an example of a configuration with fewer components, Japanese Unexamined Patent Application, First Publication No. H9-506717 discloses a display device including a beam-splitting device which is provided along a path of light from an object (a light source) and a retro-reflective part which is provided along a path of light from an object which is transmitted or reflected by the beam-splitting device. In the display device described in Patent Literature 1, the beam-splitting device is attached to an opening on an opaque surface.

SUMMARY

A display device includes a first light source, a first retro-reflective part which is disposed at a position on a first emission axis that indicates an emission direction of first light emitted from the first light source, and a first light-separating part configured to reflect at least a part of the first light emitted from the first light source as first reflected light and transmits at least a part of the first reflected light that is retro-reflected by the first retro-reflective part.

Non-transparent part of the first reflected light may be formed in the first retro-reflective part in the display device.

The non-transparent part may be disposed in a region in which the first reflected light incidents.

The first retro-reflective part may be disposed on the side opposite to the emission direction of the first light with respect to the first light source on the first emission axis, and at a position at which the first light source on the first emission axis is disposed, a removed section of the first light source in which the first light and the first reflected light are able to transmit.

The first retro-reflective part may be disposed at a position at which the first light source on the first emission axis is disposed.

The first reflected light may be incident on the first retro-reflective part.

The display device may include a first wavelength plate that is disposed between the first light source on the first emission axis and the first retro-reflective part, a second wavelength plate that is disposed in the emission direction of the first light with respect to the first retro-reflective part on the first emission axis, and a first polarization branching part that is disposed between the first light source on the first emission axis and the first wavelength plate, and transmits specific polarized light to pass therethrough. The first wavelength plate and the second wavelength plate may provide a phase difference of $(\pi/2)$ in an electric field vibration direction of light that is incident on each plate.

The display device may further include a second retro-reflective part which is disposed at a position on a second emission axis that indicates an emission direction of the first reflected light reflected by the first light-separating part and which is disposed at a different position from the first retro-reflective part.

The display device may further include a first wavelength plate that is disposed between the first light source on the first emission axis and the first retro-reflective part, a second wavelength plate that is disposed in the emission direction of the first light with respect to the first retro-reflective part on the first emission axis, a first polarization branching part that is disposed between the first light source on the first emission axis and the first wavelength plate and transmits specific polarized light, a second light source configured to emit second light to the side opposite to an emission direction of the first reflected light reflected by the first light-separating part, a second retro-reflective part which is disposed at a position on a third emission axis that indicates an emission direction of the second light and is able to retro-reflect the first reflected light and transmits the second light a second light-separating part that reflects at least some of the second light that has passed through the second retro-reflective part as second reflected light and transmits at least a part of the second reflected light retro-reflected by the second retro-reflective part, a third wavelength plate that is disposed between the second light source on the third emission axis and the second retro-reflective part, a fourth wavelength plate that is disposed in the emission direction of the second light with respect to the second retro-reflective part on the third emission axis, and a second polarization branching part that is disposed between the second light source on the third emission axis and the third wavelength plate and transmits polarized light perpendicular to the specific polarized light. The first wavelength plate, the second wavelength plate, the third wavelength plate and the fourth wavelength plate may provide a phase difference of ($\pi/2$) in an electric field vibration direction of light that is incident on each plate.

The display device may further include a second light source configured to emit second light to the side opposite to an emission direction of the first reflected light reflected by the first light-separating part, and a second retro-reflective part which is disposed at a position on a third emission axis that indicates an emission direction of the second light and is able to retro-reflect the first reflected light and transmits the second light.

An imaging element may be disposed between the first light source on the first emission axis and the first retro-reflective part of the display device.

A display method for an aerial image includes a step of emitting first light from a first light source and transmitting the first light through a first retro-reflective part at a position on a first emission axis that indicates an emission direction of the first light, a step of reflecting at least some of the first light that has passed through the first retro-reflective part by a first light-separating part as first reflected light toward the first retro-reflective part, and a step of transmitting at least a part of the first reflected light retro-reflected by the first retro-reflective part through the first light-separating part.

The display method for an aerial image may further include a step of forming a non-transparent part of the first reflected light in the first retro-reflective part.

The display device may further include a second light-separating part which is disposed so as to face to the first light-separating part with the first light source interposed therebetween. An emission part of the first light source may be directed to a space formed between the first light-separating part and the second light-separating part of the display device. The second light-separating part may reflect at least a part of the first light as first reflected light and reflect at least some of the first reflected light of the display device. In one light-separating part between the first light-separating part and the second light-separating part, a first retro-reflective part provided on the side opposite to the side that faces the other light-separating part.

A display device includes a first light source, a first retro-reflective part which is disposed at a position on a first emission axis that indicates an emission direction of first light emitted from the first light source and in which non-transparent part is formed, a first light-separating part that reflects at least some of the first light emitted from the first light source as first reflected light and transmits at least a part of the first reflected light. The first liquid crystal panel is disposed at a position on a first emission axis that indicates an emission direction of the first light. The first polarizing plate is disposed between the first light source on the first emission axis and the first liquid crystal panel.

A prism sheet including a plurality of prisms disposed in a direction perpendicular to the first emission axis and being different from the first retro-reflective part may be disposed in front of the first light source on the first emission axis of the display device.

DETAILED DESCRIPTION OF THE PREFERRED EMBODIMENTS

A display device and a display method for an aerial image according to embodiments of the present invention will be described below with reference to the drawings. Note that the drawings used in the following description are schematic and proportions of lengths, widths, thicknesses, and the like are not necessarily the same as those of actual sizes and can be appropriately changed.

First Embodiment

Figure 1:
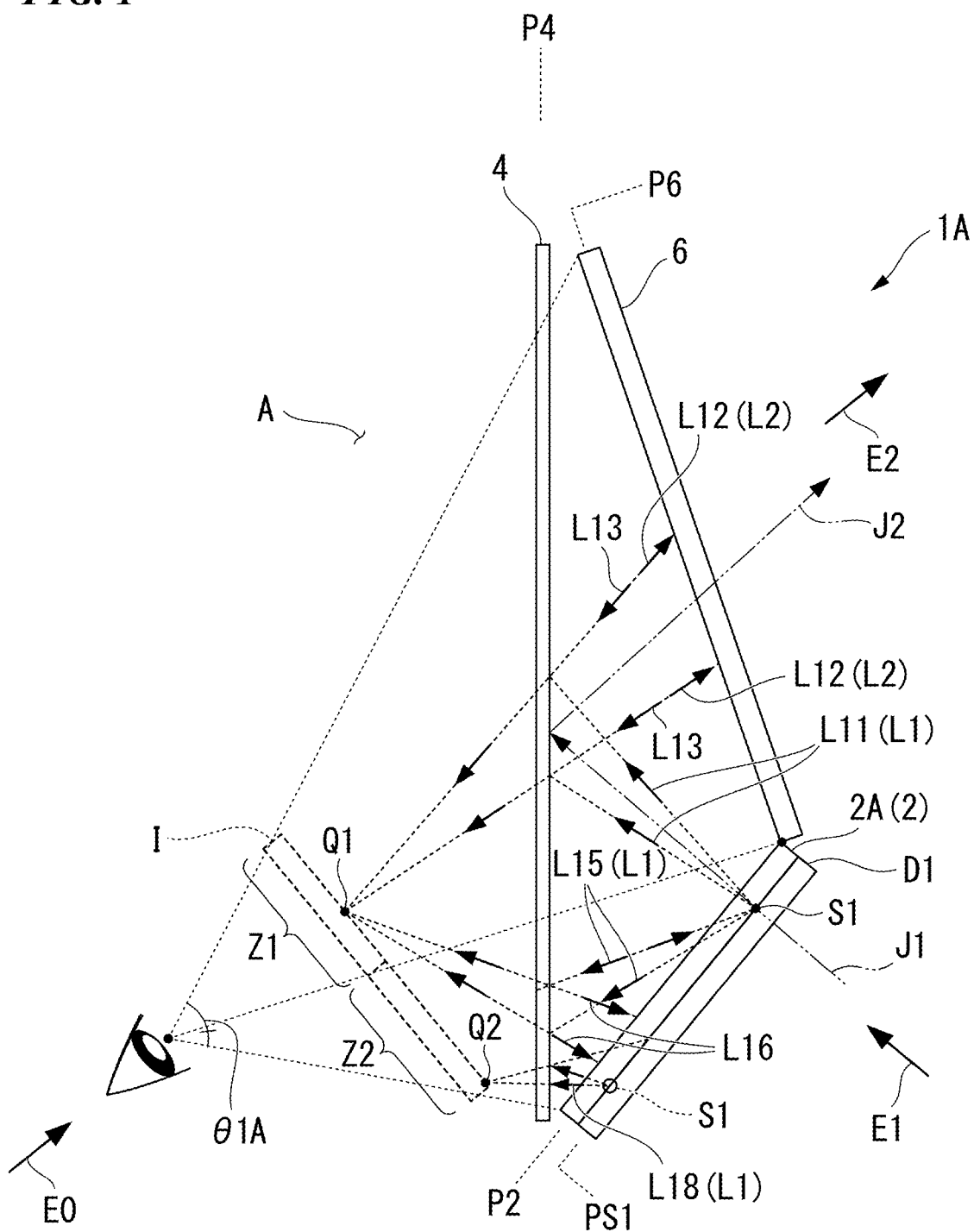
FIG. 1 is a schematic diagram showing a configuration of a display device according to a first embodiment of the present invention.

As shown in FIG. 1, a display device 1A according to a first embodiment includes a first light source S1, a first retro-reflective part 2A, a first light-splitting part 4, and a second retro-reflective part 6.

The first light source S1 is, for example, an LED, but it is not particularly limited. A plurality of first light sources S1 of the display device 1A of the first embodiment are arranged in parallel to a plate surface of a first display D1 and are provided so that light emission directions thereof are aligned with each other. Here, the number of first light sources S1 and relative dispositions therebetween are not particularly limited.

In the present invention, a first retro-reflective part 2 is disposed at a position P2 on a first emission axis J1 that indicates an emission direction E1 of first light L1 emitted from the first light source S1.

The first retro-reflective part 2A of the first embodiment is disposed in the emission direction E1 with respect to the first light source S1 on the first emission axis J1. The first retro-reflective part 2A is preferably disposed in the vicinity of the first display D1 (that is, a position PS1 of the first light source S1) on the first emission axis J1. The first retro-reflective part 2A may be attached to the emission direction E1 side of the first light source S1 of the first display D1 and integrated with the first display D1.

The first retro-reflective part 2A has a known retro-reflective structure. As the retro-reflective structure of the first retro-reflective part 2A, for example, as shown in FIGS. 2 and 3, retro-reflective structures 3A and 3B having a plurality of part structures 10 including at least one reflective surface 12 may be exemplified.

Figure 2:
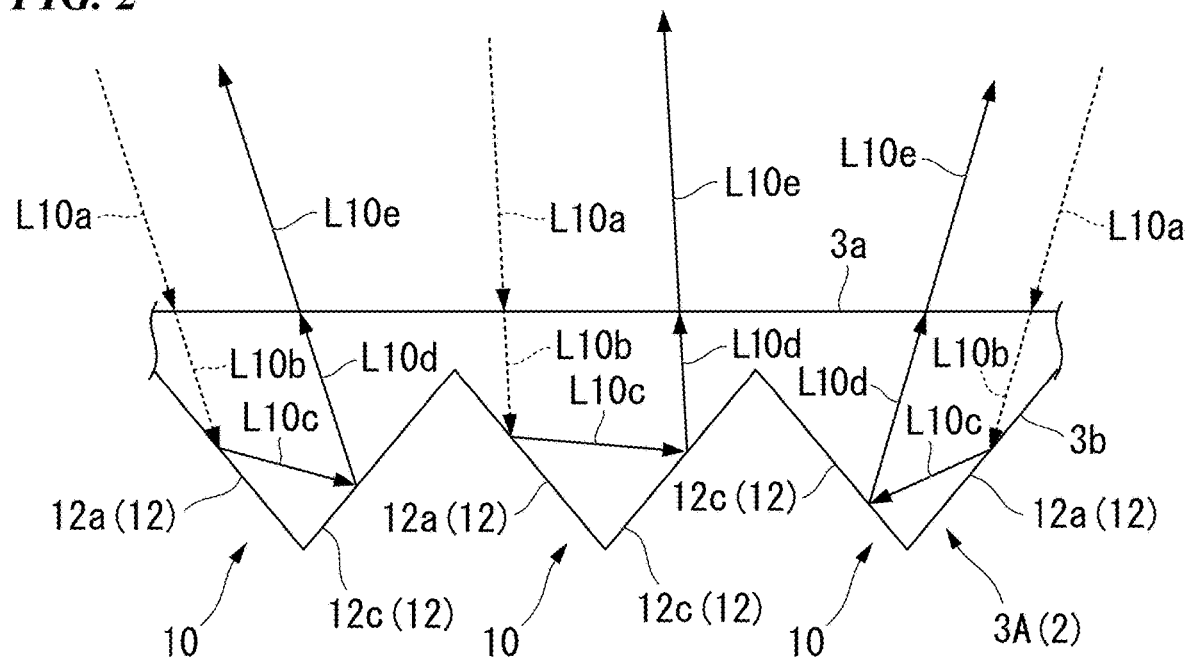
FIG. 2 is a side view showing a first example of a structure of a retro-reflective part that is used in the display device according to the first embodiment of the present invention.
Figure 3:
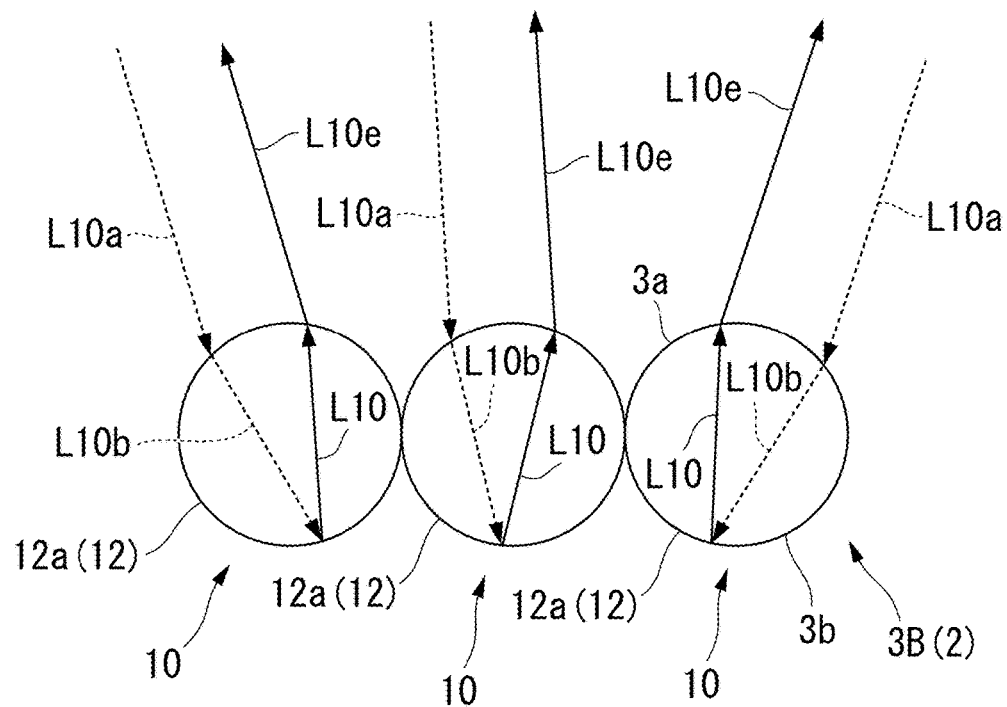
FIG. 3 is a side view showing a second example of the structure of the retro-reflective part that is used in the display device according to the first embodiment of the present invention.

A surface 3a (that is, a surface on which light is incident) of the retro-reflective structure 3A shown in FIG. 2 is formed flat. On the other hand, on a surface 3b of the retro-reflective structure 3A, a plurality of triangular shapes constituting the unit structure 10 are formed adjacent to each other along the surface 3b when viewed from the side.

Light L10a incident on the surface 3a passes through a surface 2a, and enters a reflective surface 12a of the unit structure 10 as light L10b. The light L10b is reflected by the reflective surface 12a and travels toward a reflective surface 12c of the unit structure 10 as light L10c. In the retro-reflective structure 3A, an interior angle formed by the reflective surfaces 12a and 12c of the unit structure 10 is set to a predetermined angle (that is, about 90 degrees). Therefore, the light L10c incident on the reflective surface 12c is reflected as light L10d in a direction parallel to the light L10b by the reflective surface 12c, and is emitted as reflected light L10e from the surface 3a.

Here, in FIG. 2, refraction from light 10a to light 10b using the surface 3a as a boundary and an angle of refraction from light 10d to light 10e are not shown.

On the surfaces 3a and 3b of the retro-reflective structure 3B shown in FIG. 3, a plurality of semicircular shapes constituting the unit structure 10 are formed adjacent to each other along the surfaces 3a and 3b when viewed from the side. That is, the retro-reflective structure 3B is a structure in which a plurality of small cylindrical objects or spheres are arranged adjacent to each other in one direction.

Light L10a incident on the surface 3a passes through the surface 3a, is refracted at an angle of refraction by the surface 3a according to a curvature thereof, and travels toward the reflective surface 12a of the unit structure 10 as light L10b. Light L10b incident on the reflective surface 12a is reflected by the reflective surface 12a and travels toward the surface 3a as reflected light L10d. Since the surface 3a and the reflective surface 12a correspond to each other and form a sphere, light L10d reflected by the reflective surface 12a is refracted in a direction parallel to light L10a by the surface 3a, and is emitted as reflected light L10e from the surface 3a.

According to the first retro-reflective part 2A having the retro-reflective structures 3A and 3B, since an angle of incidence and an exit angle are the same, light incident on the first retro-reflective part 2A is reflected in the same direction as an incident direction regardless of a refractive index of a material of the retro-reflective structure 3A. The first retro-reflective part 2A is disposed so that the side of the surface 3b of the retro-reflective structure 3A or the retro-reflective structure 3B faces the first light source S1.

A material of the first retro-reflective part 2A is not particularly limited as long as it allows the first light L1 to pass therethrough, and allows the first retro-reflective part 2A to retro-reflect light incident from the side of the first light-separating part 4 (that is, the side opposite to the emission direction E1). When the first light L1 is visible light, for example, optical glass, polycarbonate resin (PC), and polymethylmethacrylate resin (PMMA) may be exemplified as a material of the first retro-reflective part 2A because they allow the first light L1 to pass through the inside of the retro-reflective structures 3A and 3B with higher efficiency. In addition, a reflective component (not shown) is provided in contact with the side of the surface 3b, that is, on the reflective surfaces 12a and 12c. As the reflective component, a component that allows the first light L1 to pass in the emission direction E1 and can reflect light (for example, light L16) incident in a direction opposite to the emission direction E1 with respect to the first retro-reflective part 2A, for example, a dielectric component, may be used.

Here, the structure and material of the first retro-reflective part 2 are not particularly limited as long as light incident on the first retro-reflective part 2 can be reflected in the same direction as the incident direction.

For example, as the first retro-reflective part 2, a full corner cube, a cat eye retro-reflective component, a combination of a lenticular lens and a reflection plate, a combination of a lens (a so-called fly's eye lens) in which single lenses are arranged in contact with each other vertically and horizontally and a reflection plate, a hologram copying retro-reflection performance, a digital hologram that can be formed of a spatial light modulator (SLM), an acousto-optic modulator (AOM), or the like and has a retro-reflective function program, a phase conjugate mirror, and the like may be exemplified. As the full corner cube, for example, a known prism type reflection sheet (for example, refer to http://www.yao-sangyo.co.jp/sign/prism_4090.html) and a crystal grade (registered trademark, for example, refer to http://www.carbide.co.jp/jp/viewer/file/product/4c74f1d8ac72dfc26d1e3587c0358529.pdfsurasshu4c74f1d8ac72dfc26d1e3587c0358529.pdf) may be exemplified.

The first light-separating part 4 reflects some of the first light L1 that has passed through the first retro-reflective part 2A toward the second retro-reflective part 6 as first reflected light L2, and allows at least some of the first reflected light L2 reflected by the second retro-reflective part 6 to pass therethrough. The first light-separating part 4 is disposed at a predetermined position on the side of a user observation position relative to the first light source S1 and the first retro-reflective part 2A. The first light-separating part 4 is, for example, a half mirror, and is not particularly limited as long as it reflects some of the first light L1 described above and allows at least some of the first reflected light L2 reflected by the first retro-reflective part 2A to pass therethrough. As the first light-separating part 4, in addition to a half mirror, for example, a plate-like member made of acrylic or glass, a hollow structure which is made of these materials and contains water in the hollow, a plate made of punched metal and having openings, a wire grid film, a reflective polarizing film, and others generally called a beam splitter may be exemplified.

The second retro-reflective part 6 is disposed at a position P6 on a second emission axis J2 that indicates an emission direction E2 of the first reflected light L2 reflected by the first light-separating part 4. The position P6 of the second retro-reflective part 6 is appropriately set at a position at which first reflected light L2 can enter in the emission direction E2 in consideration of the position PS1 of the first display D1, the position P2 of the first retro-reflective part 2A, and a position P4 of the first light-separating part 4.

The second retro-reflective part 6 has a known retro-reflective structure. That is, as a structure and material of the second retro-reflective part 6, the same structure and materials as those of the first retro-reflective part 2 described above may be exemplified. However, the structure and material are not particularly limited as long as light incident on the second retro-reflective part 6 can be reflected in the same direction as the incident direction. However, since it is not necessary for first reflected light L2 to pass through the second retro-reflective part 6, for example, when the retro-reflective structures 3A and 3B are used, for a reflective component provided on the side on the surface 3b, that is, the reflective surfaces 12a and 12c, in addition to the above dielectric component, for example, aluminum, gold, and silver may be exemplified.

In the display device 1A of the first embodiment, within the first light L1 emitted from the first light source S1, some of the light L11 is reflected by the first light-separating part 4 as reflected light L12 (first reflected light L2). The reflected light L12 is incident on the second retro-reflective part 6, is reflected by the second retro-reflective part 6 in the same direction as the incident direction, is incident on the first light-separating part 4 as reflected light L13 and passes through the first light-separating part 4, and forms an aerial image I at a position Q1 symmetrical to the first light source S1 with respect to a plate surface (that is, a reflective surface) of the first light-separating part 4.

In addition, within the first light L1, light L15 is reflected by the first light-separating part 4, and is then incident on the first retro-reflective part 2A as reflected light L16 (first reflected light L2), is reflected by the first retro-reflective part 2A in the same direction as the incident direction, and passes through the first light-separating part 4, and forms an aerial image I at the position Q1 symmetrical to the first light source S1 with respect to a plate surface (that is, a reflective surface) of the first light-separating part 4.

In addition, for example, light L18 (the first light L1) emitted from the first light source S1 disposed at one end of the first display D1 is reflected by the first light-separating part 4, is then incident on the first retro-reflective part 2A as reflected light L19 (first reflected light L2), is reflected by the first retro-reflective part 2A in the same direction as the incident direction, and passes through the first light-separating part 4, and forms an aerial image I at a position Q2 symmetrical to the first light source S1 with respect to a plate surface (that is, a reflective surface) of the first light-separating part 4.

According to the display device 1A of the first embodiment described above, a user can observe the aerial image I in an area Z2 in which an image could not be observed with a conventional display device, in addition to the area Z1 in the space A (that is, a space in which the user is present with respect to the first light-separating part 4). Therefore, the user can observe the aerial image I displayed in the area Z1 and the area Z2 from the observation direction E0 on the side opposite to the first light source S1 with respect to the first light-separating part 4. Accordingly, it is possible to increase an angle θ1A at which the aerial image I is visible in the display device 1A. In addition, as can be understood with reference to FIG. 1, regardless of the position of the first light source S1 in the first display D1, since substantially all of the first light L1 emitted from the first light source S1 can contribute to forming an image I, it is possible to improve the brightness of the aerial image I.

Second Embodiment

Next, a display device 1B according to a second embodiment of the present invention will be described. Here, in components of the display device 1B of the second embodiment shown in FIG. 4, components the same as those of the display device 1A of the first embodiment shown in FIG. 1 and the like are denoted with the same reference numerals, and description thereof will be omitted.

Figure 4:
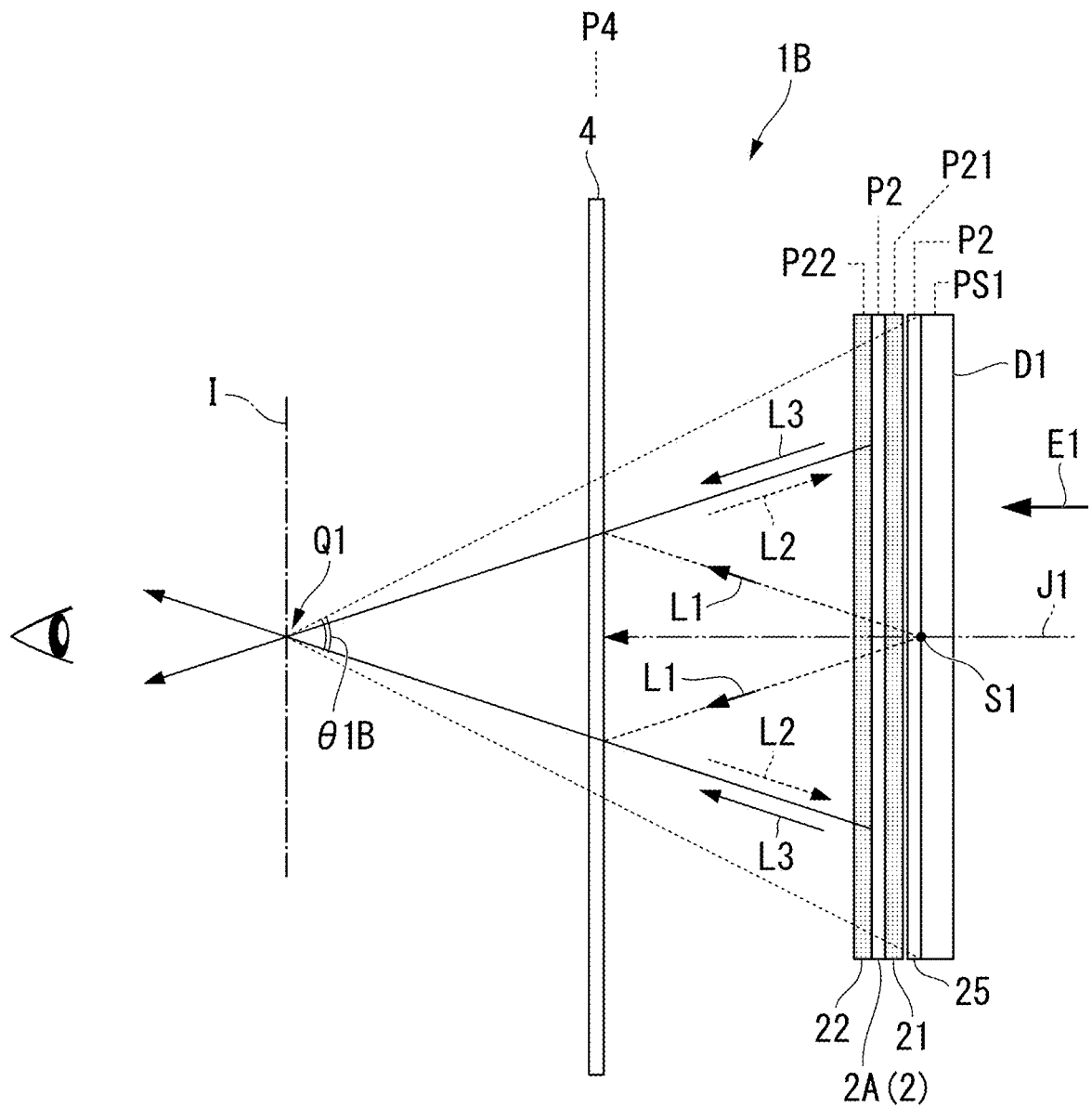
FIG. 4 is a schematic diagram showing a configuration of a display device according to a second embodiment of the present invention.

As shown in FIG. 4, the display device 1B includes the first light source S1, the first retro-reflective part 2A, the first light-separating part 4 that is disposed to face the first retro-reflective part 2A, a first wavelength plate 21, a second wavelength plate 22, and a first polarization branching part 25.

In addition, the display device 1B is configured so that first reflected light L2 is incident on the first retro-reflective part 2A.

Regarding a disposition of the first retro-reflective part 2A, this is not particularly limited as long as the user can see the aerial image I formed by the first retro-reflective part 2A and the first light source S1 (that is, light directly transmitted) as one image. Specifically, when a distance (that is, observation distance) between a position of the user's eye and the aerial image I is set as V and an interval between the position PS1 of the light source S1 and the position P2 of the first retro-reflective part 2A is set as T, $T<(V/50)$ is preferable.

The first wavelength plate 21 is disposed between the first light source S1 on the first emission axis J1 and the first retro-reflective part 2. The second wavelength plate 22 is disposed in the emission direction E1 of the first light L1 with respect to the first retro-reflective part on the first emission axis J1.

The first wavelength plate 21 and the second wavelength plate 22 are so-called λ/4 plates in which a phase difference of (π/2) is provided in an electric field vibration direction of light that is incident on each plate.

The first polarization branching part 25 is disposed between the first light source S1 on the first emission axis J1 and the first wavelength plate 21. Therefore, in the display device 1B, in the emission direction E1 of the first light L1, the first display D1 including the first light source S, the first polarization branching part 25, the first wavelength plate 21, the first retro-reflective part 2A, the second wavelength plate 22, and the first light-separating part 4 are disposed to face each other. Among them, the first display D1, the first polarization branching part 25, the first wavelength plate 21, the first retro-reflective part 2A, and the second wavelength plate 22 are preferably very close to each other and may be brought into contact with each other and integrated.

The first polarization branching part 25 allows P-polarized light to pass therethrough and reflects S-polarized light, and is, for example, a reflective polarization beam splitter.

In the display device 1B of the second embodiment, within the first light L1 emitted from the first light source S, only P-polarized first light L1 passes through the first polarization branching part 25 and is emitted in the emission direction E1, and passes through the first wavelength plate 21, the first retro-reflective part 2, and the second wavelength plate 22 in that order and is emitted as S-polarized first light L1. Some of the S-polarized first light L1 emitted from the second wavelength plate 22 is reflected by the first light-separating part 4 as first reflected light L2. The S-polarized first reflected light L2 passes through the second wavelength plate 22 and is incident on the first retro-reflective part 2A, and is reflected by the first retro-reflective part 2A in the same direction as the incident direction, and passes through the second wavelength plate 22 again and is incident on the first light-separating part 4 as P-polarized reflected light L3. Then, the P-polarized reflected light L3 passes through the first light-separating part 4, and forms the aerial image I at the position Q1 symmetrical to the first light source S1 with respect to a plate surface (that is, a reflective surface) of the first light-separating part 4.

According to the display device 1B of the second embodiment described above, the user can observe the aerial image I from the observation direction E0 on the side opposite to the first light source S1 with respect to the first light-separating part 4. Therefore, an angle θ1B at which the aerial image I is visible in the display device 1B of the second embodiment extends over the entire area of the first light source S1 disposed in the first display D1 and the angle θ1B can be increased. In addition, as can be understood with reference to FIG. 4, regardless of the position of the first light source S1 in the first display D1, substantially all of the P-polarized first light L1 emitted from the first light source S1 can contribute to forming the aerial image I.

In addition, according to the display device 1B of the second embodiment, the first retro-reflective part 2 is provided in the emission direction E1 of the first light L1 with respect to the first light source S1 and the first display D1, and a reflective polarizing film, a polarizing plate or a half mirror on which a polarizing film is provided, or the like is used as the first light-separating part 4. Therefore, since light directly transmitted is blocked by the first light-separating part 4, the user cannot see the first light source S and the first display D1 (that is, light directly transmitted). Accordingly, it is possible to prevent visibility of the aerial image I from deteriorating due to mixing of the aerial image I and the first light source S1.

In addition, according to the display device 1B of the second embodiment, the second retro-reflective part 6 is omitted, in the emission direction E1 of the first light L1, the first light source S1, the first polarization branching part 25, the first wavelength plate 21, the first retro-reflective part 2A, the second wavelength plate 22, and the first light-separating part 4 can be disposed, and it is possible to reduce the size and space of the entire device.

Third Embodiment

Next, a display device 1C according to a third embodiment of the present invention will be described. Here, in components of the display device 1C of the third embodiment shown in FIG. 5, components the same as those of the display device 1A of the first embodiment shown in FIG. 1 and the like are denoted with the same reference numerals, and description thereof will be omitted.

Figure 5:
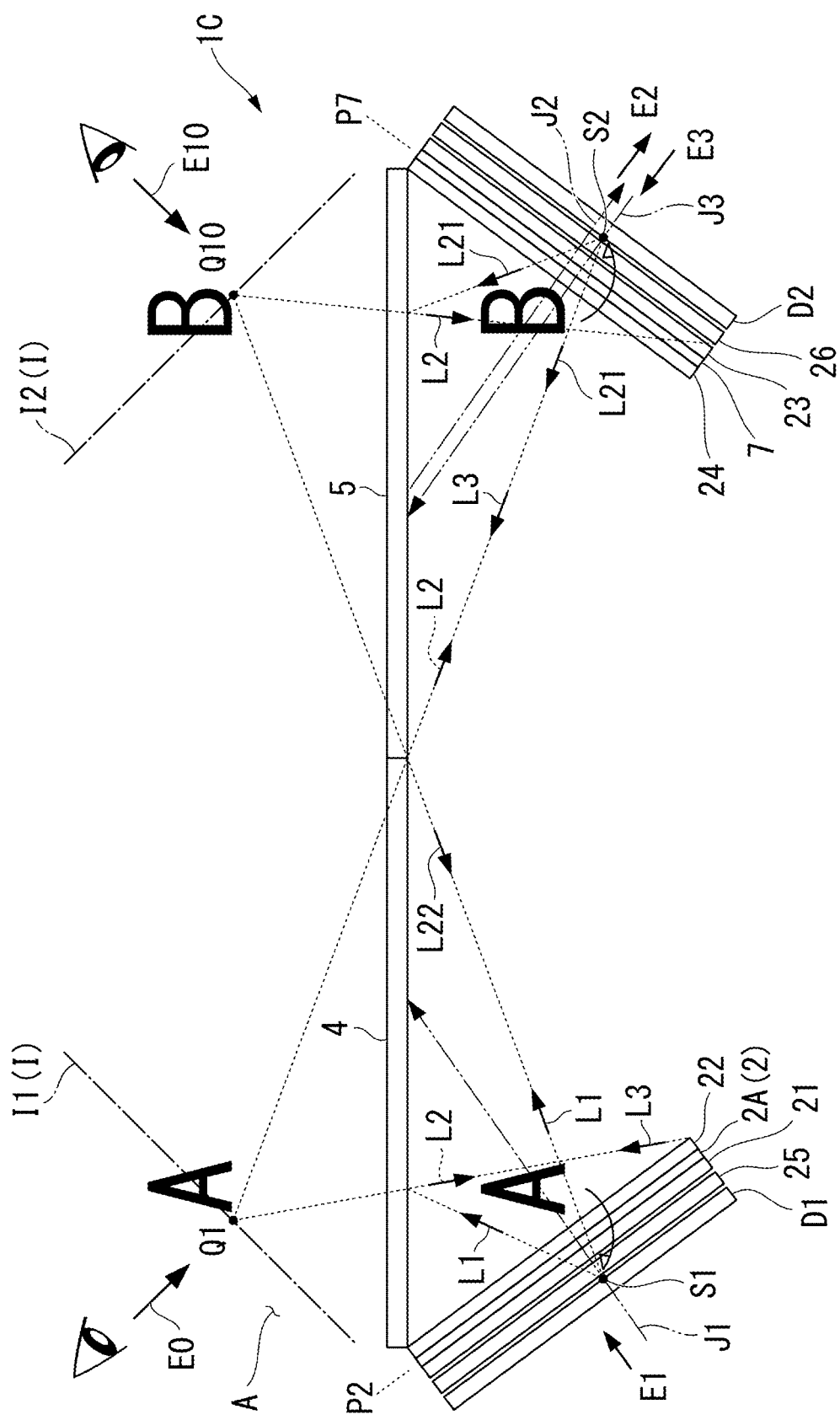
FIG. 5 is a schematic diagram showing a configuration of a display device according to a third embodiment of the present invention.

As shown in FIG. 5, the display device 1C includes the first light source S1, the first retro-reflective part 2A, the first light-separating part 4, the first wavelength plate 21, the second wavelength plate 22, the first polarization branching part 25, a second light source S2, a second retro-reflective part 7, a second light-separating part 5, a third wavelength plate 23, a fourth wavelength plate 24, and a second polarization branching part 26.

Like the first light source S1, the second light source S2 is, for example, an LED, but it is not particularly limited.

In addition, a plurality of second light sources S2 of the display device 1C of the third embodiment are arranged in parallel to a plate surface of a second display D2 and are provided so that light emission directions thereof are aligned with each other. Here, the number of second light sources S2 is not particularly limited. However, the second light source S2 is disposed so that it can emit second light L21 in a direction E3 (hereinafter referred to as the emission direction E3) on the side opposite to the emission direction E2 of first reflected light L2.

The second retro-reflective part 7 is disposed at a position P7 on a third emission axis J3 that indicates the emission direction E3 of second light L21 and can retro-reflect first reflected light L2 and allow at least some of the second light L21 to pass therethrough. As a structure and material of the second retro-reflective part 7, the same structure and materials as those of the first retro-reflective part 2 described above may be exemplified.

The second light-separating part 5 allows some of the second light L21 that has passed through the second retro-reflective part 7 to pass therethrough, and reflects at least some of the second light L21 that has passed through the second retro-reflective part 7 as second reflected light L22.

The third wavelength plate 23 is disposed between the second light source S2 on the third emission axis J3 and the second retro-reflective part 7. The fourth wavelength plate 24 is disposed at a position of the second light L21 in the emission direction E3 with respect to the second retro-reflective part 7 on the third emission axis J3.

Like the first wavelength plate 21 and the second wavelength plate 22, the third wavelength plate 23 and the fourth wavelength plate 24 are so-called λ/4 plates in which a phase difference of ($\pi$/2) is provided in an electric field vibration direction of light that is incident on each plate.

The second polarization branching part 26 is disposed between the second light source S2 on the third emission axis J3 and the third wavelength plate 23. Therefore, in the display device 1C, in the emission direction E3 of second light L21, the second display D2 including the second light source S2, the second polarization branching part 26, the third wavelength plate 23, the second retro-reflective part 7, the fourth wavelength plate 24, and the second light-separating part 5 are appropriately disposed. Among them, the second display D2, the second polarization branching part 26, the third wavelength plate 23, the second retro-reflective part 7, and the fourth wavelength plate 24 are preferably very close to each other and may be brought into contact with each other and integrated.

The second polarization branching part 26 can reflect P-polarized light and allow S-polarized light to pass therethrough, and is, for example, a reflective polarization beam splitter.

As can be understood with reference to FIG. 5, in the display device 1C of the third embodiment, a relative position between a configuration including the first display D1 including the first light source S1, the first polarization branching part 25, the first wavelength plate 21, the first retro-reflective part 2A and the second wavelength plate 22, and the first light-separating part 4 in the display device 1B of the second embodiment is set to be the same as a relative position between the first display D1 and the first retro-reflective part 2A, and the first light-separating part 4 in the display device 1A of the first embodiment, and the same configuration is disposed to face such a configuration.

In the display device 1C of the third embodiment, within the first light L1 emitted from the first light source S1, only P-polarized first light L1 passes through the first polarization branching part 25 and is emitted in the emission direction E1, and passes through the first wavelength plate 21, the first retro-reflective part 2, and the second wavelength plate 22 in that order and is emitted as S-polarized first light L1. Some of the S-polarized first light L1 emitted from the second wavelength plate 22 is reflected by the first light-separating part 4 as first reflected light L2. The S-polarized first reflected light L2 passes through the second wavelength plate 22 and is incident on the second retro-reflective part 6 and is reflected by the second retro-reflective part 6 in the same direction as the incident direction and passes through the second wavelength plate 22 again and is incident on the first light-separating part 4 as P-polarized reflected light L3. Then, the P-polarized reflected light L3 passes through the first light-separating part 4 and forms an aerial image I1 at the position Q1 symmetrical to the first light source S1 with respect to a plate surface (that is, a reflective surface) of the first light-separating part 4.

On the other hand, within second light L21 emitted from the second light source S2, only S-polarized second light L21 passes through the second polarization branching part 26 and is emitted in the emission direction E3, and passes through the third wavelength plate 23, the second retro-reflective part 7, and the fourth wavelength plate 24 in that order and is emitted as P-polarized first light L21.

Some of the P-polarized first light L1 emitted from the fourth wavelength plate 24 is reflected by the second light-separating part 5 as first reflected light L2. The P-polarized first reflected light L2 passes through the fourth wavelength plate 24 and is incident on the second retro-reflective part 7, and is reflected by the second retro-reflective part 7 in the same direction as the incident direction, and passes through the fourth wavelength plate 24 again and is incident on the second light-separating part 5 as S-polarized reflected light L3. Then, the S-polarized first reflected light L3 passes through the second light-separating part 5 and forms an aerial image I2 at a position Q10 symmetrical to the second light source S2 with respect to a plate surface (that is, a reflective surface) of the second light-separating part 5.

According to the display device 1C of the third embodiment described above, the user can observe the aerial image I1 (for example, a letter image "A") from the observation direction E0 on the side opposite to the first light source S1 with respect to the first light-separating part 4. On the other hand, the user can observe the aerial image I2 (for example, a letter image "B") from an observation direction E10 on the side opposite to the second light source S2 with respect to the second light-separating part 5. In this manner, according to the display device 1C of the third embodiment, it is possible to realize multiple views of the aerial images I1 and I2.

Regarding a disposition in which polarization directions of transmitted light in the above first light-separating part 4 and second light-separating part 5 are perpendicular to each other, the second light source S2 and the second display D2 (that is, light directly transmitted) can be observed behind the aerial image I1 through the first light-separating part 4 from the observation direction E0, and the first light source S1 and the first display D1 (that is, light directly transmitted) can be observed behind an aerial image I10 through the second light-separating part 5 from the observation direction E10. That is, multiple views of two layers of the aerial image and light directly transmitted serving as a background are realized.

On the other hand, when disposition is performed such that polarization directions of transmitted light are parallel in the first light-separating part 4 and the second light-separating part 5, for example, when disposition is performed such that only a P-polarized light component passes in the second light-separating part 5 and disposition is performed such that only a P-polarized light component passes also in the second polarization branching part 26 in accordance therewith, the first light source S1 and the first display D1 (that is, light directly transmitted) and the second light source S2 and the second display D2 (that is, light directly transmitted) are not observed, and only the aerial image I1 is observed in an observation direction E1. Therefore, in the observation direction E10, multiple views in which only the aerial image I10 is observed are realized.

FIG. 5 shows multiple views in two directions, and when the display device 1B is provided in a form that faces each of observation directions, it is possible to realize multiple views in three or more directions.

An angle at which the aerial images I1 and I2 are visible extends over the entire area of the first light source S1 disposed in the first display D1 or the entire area of the second light source S2 disposed in the second display D2 and can be further increased. In addition, regardless of the position of the first light source S1 in the first display D1 and the position of the second light source S2 in the second display D2, substantially all of the P-polarized first light L1 emitted from the first light source S1 and the S-polarized second light L21 emitted from the second light source S2 can contribute to forming the aerial images I1 and I2.

In addition, according to the display device 1C of the third embodiment, a reflective polarizing film, a polarizing plate or a half mirror on which a polarizing film is provided, or the like is used as the first light-separating part 4 and the second light-separating part 5. Therefore, since light directly transmitted is blocked by the first light-separating part 4 and the second light-separating part 5, the user cannot see the first light source S and the first display D1 (that is, light directly transmitted). Accordingly, it is possible to prevent visibility of the aerial image I from deteriorating due to mixing of the aerial image I and the first light source S1 or the second light source S2.

Figure 6:
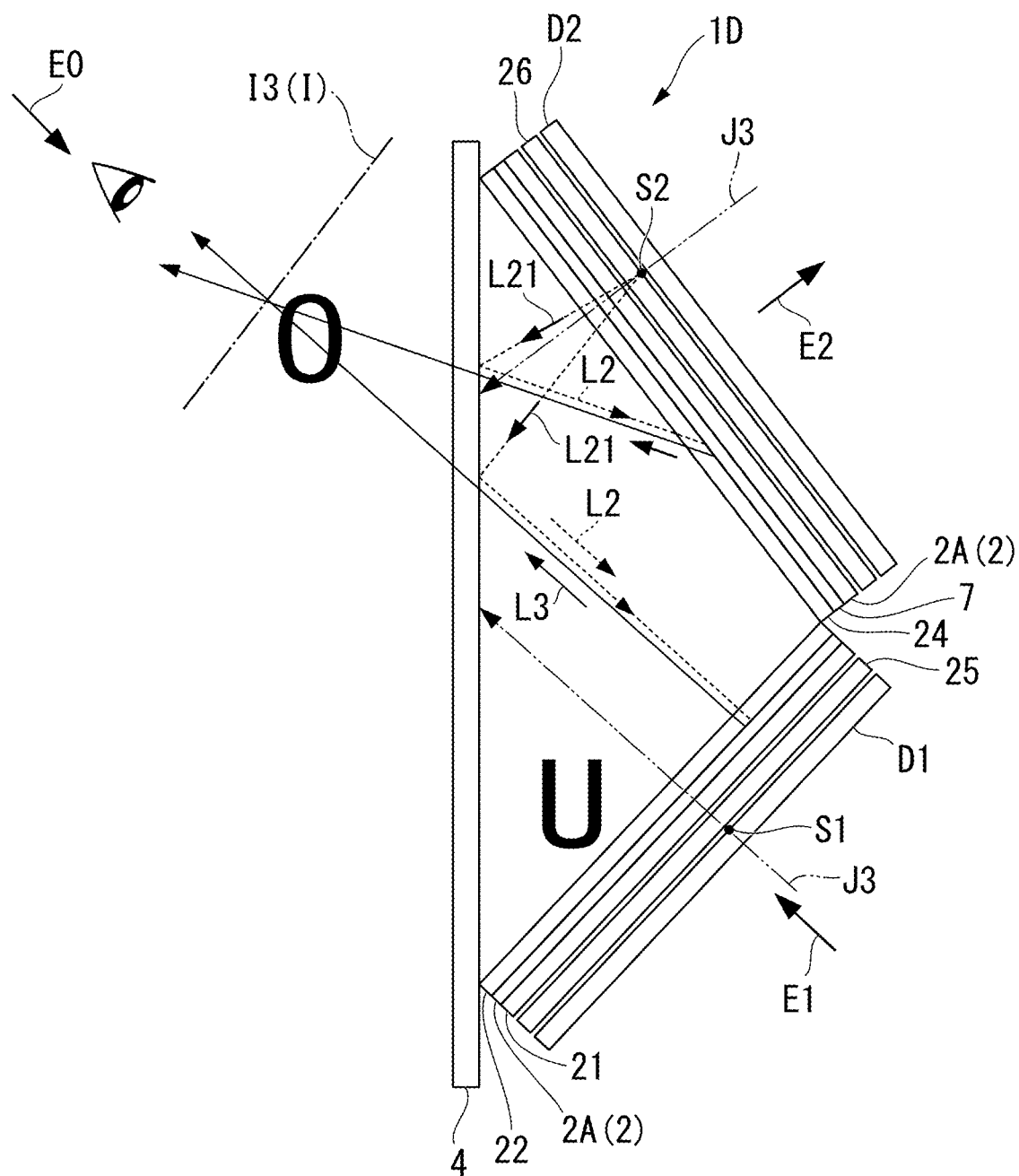
FIG. 6 is a schematic diagram showing a configuration of a modified example of the display device according to the third embodiment of the present invention.

A display device 1D as a modified example of the display device 1C of the third embodiment, as shown in FIG. 6 has a configuration in which a structure including the first light source S1 of the display device 1C, the first retro-reflective part 2, the first light-separating part 4, the first wavelength plate 21 and the second wavelength plate 22 and a configuration including the first polarization branching part 25, the second light source S2, the second retro-reflective part 7, the third wavelength plate 23, the fourth wavelength plate 24, and the second polarization branching part 26 are brought into proximity with each other. Therefore, in the display device 1D, the second light-separating part 5 is omitted.

According to the display device 1D as a modified example of the third embodiment, an angle at which the aerial image I is visible extends over the entire area of the first light source S1 disposed in the first display D1 or the second light source S2 disposed in the second display D2 and can be increased. In addition, when the first polarization branching part 25 is provided so that direct light of the first display D1 passes through the first light-separating part 4, the user can see a background (for example, a letter image "U") by direct light behind an aerial image I3 (for example, a letter image "O") from the direction E0 which is on the side opposite to the second light source S2 with respect to the first light-separating part 4. In this manner, according to the display device 1D as a modified example of the third embodiment, it is possible to realize a two-layer image of the aerial image I and the direct image.

Fourth Embodiment

Next, a display device 1E according to a fourth embodiment of the present invention will be described. Here, in components of the display device 1E of the fourth embodiment shown in FIG. 7, components the same as those of the display device 1A of the first embodiment shown in FIG. 1 and the like are denoted with the same reference numerals, and description thereof will be omitted.

Figure 7:
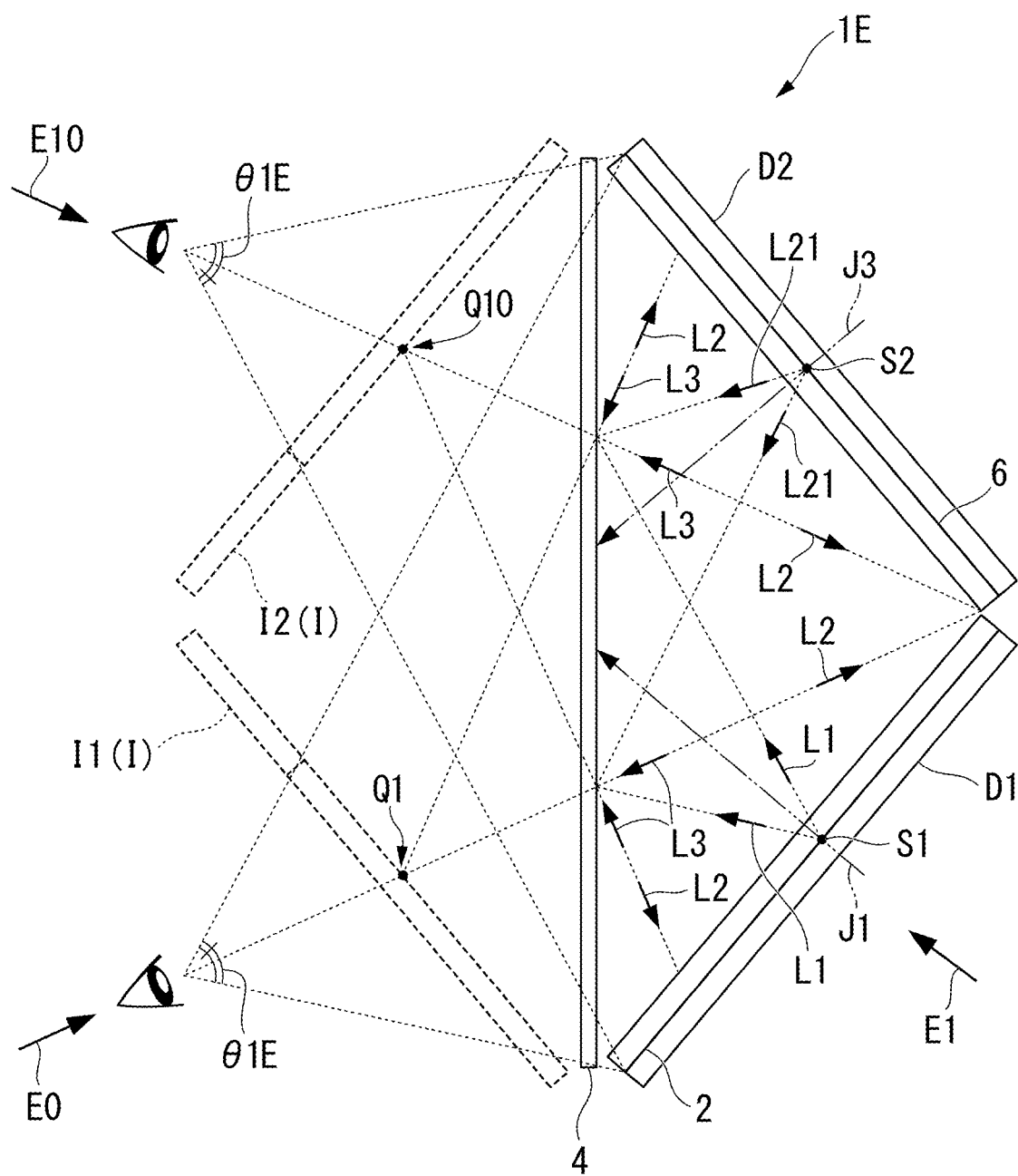
FIG. 7 is a schematic diagram showing a configuration of a display device according to a fourth embodiment of the present invention.

As shown in FIG. 7, the display device 1E includes the first light source S1, the first retro-reflective part 2, the first light-separating part 4, the second light source S2, and the second retro-reflective part 7. The display device 1E has a configuration in which the second retro-reflective part 7 is provided at a position of the second retro-reflective part 6 and the second display D2 is disposed in the emission direction E2 of second reflected light L2 with respect to the configuration of the display device 1A.

In the display device 1E of the fourth embodiment, some of the first light L1 emitted from the first light source S1 is reflected by the first light-separating part 4 as first reflected light L2. The first reflected light L2 is incident on the second retro-reflective part 6 and is reflected by the second retro-reflective part 6 in the same direction as the incident direction, and is incident on the first light-separating part 4 as reflected light L3, and also passes through the first light-separating part 4 and forms the aerial image I1 at the position Q1 symmetrical to the first light source S1 with respect to a plate surface (that is, a reflective surface) of the first light-separating part 4.

Some of the second light L21 emitted from the second light source S2 is also reflected by the first light-separating part 4 as first reflected light L2. The first reflected light L2 is incident on the second retro-reflective part 6 and is reflected by the second retro-reflective part 6 in the same direction as the incident direction and is incident on the first light-separating part 4 as reflected light L3. Then, the first reflected light L2 passes through the first light-separating part 4 and forms the aerial image I2 at the position Q10 symmetrical to the second light source S2 with respect to a plate surface (that is, a reflective surface) of the first light-separating part 4.

According to the display device 1E of the fourth embodiment described above, the user can see both the aerial image I1 and the second light source S2 (that is, light directly transmitted) of the display D2 from the direction E0 which is on the side opposite to the first light source S1 with respect to the first light-separating part 4. On the other hand, the user can see both the aerial image I2 and the first light source S1 (that is, light directly transmitted) of the display D1 from the observation direction E10 which is on the side opposite to the second light source S2 with respect to the second light-separating part 5. In this manner, according to the display device 1C of the third embodiment, it is possible to realize multiple views in which the aerial image I and the displays D1 and D2 (that is, the light sources S1 and S2) are combined.

An angle θ1E at which the aerial images I1 and I2 are visible extends over the entire area of the first light sources S1 and S2 disposed in the first displays D1 and D2, respectively, and can be increased. In addition, regardless of the position of the first light source S1 in the first display D1 and the position of the second light source S2 in the second display D2, substantially all of the first light L1 emitted from the first light source S1 and the second light L21 emitted from the second light source S2 can contribute to forming the aerial images I1 and I2.

Fifth Embodiment

Next, a display device 1F according to a fifth embodiment of the present invention will be described. Here, in components of the display device 1F of the fifth embodiment shown in FIG. 8, components the same as those of the display device 1A of the first embodiment shown in FIG. 1 and the like are denoted with the same reference numerals, and description thereof will be omitted.

Figure 8:
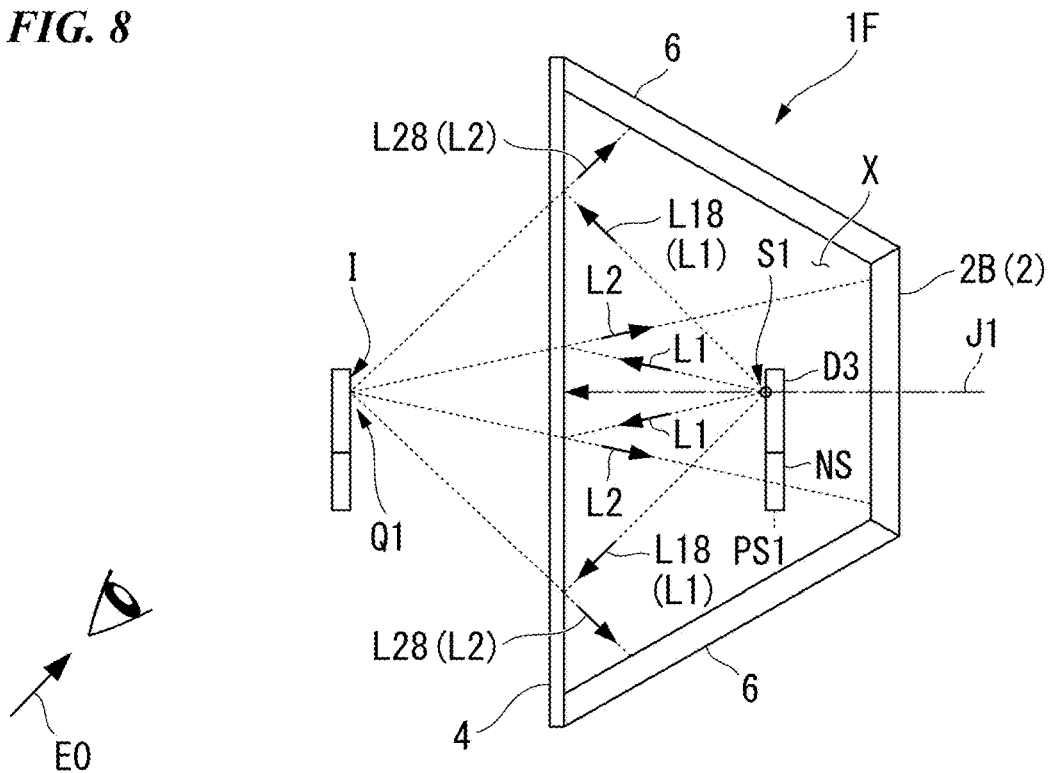
FIG. 8 is a schematic diagram showing a configuration of a display device according to a fifth embodiment of the present invention.

As shown in FIG. 8, the display device 1F includes the first light source S1, a first retro-reflective part 2B, the first light-separating part 4, and the second retro-reflective part 6.

In the display device 1F, the first retro-reflective part 2B is disposed on the side opposite to the emission direction E1 with respect to the first light source S1 on the first emission axis J1 that indicates the emission direction E1 of the first light L1 emitted from the first light source S1.

The second retro-reflective part 6 is disposed so that the outer circumferential edge of the first retro-reflective part 2B is connected to the outer circumferential edge of the first light-separating part 4.

However, since it is not necessary for the first light L1 or first reflected light L2 to pass through the first retro-reflective part 2B, for example, when the retro-reflective structures 3A and 3B are used, for a reflective component provided on the side of the surface 3b, that is, the reflective surfaces 12a and 12c, in addition to the above dielectric component, for example, aluminum, gold, and silver may be exemplified. That is, the first retro-reflective part 2B and the second retro-reflective part 6 may have the same retro-reflective structure.

In the above disposition, the first light source S1 is disposed in a space X surrounded by the first retro-reflective part 2B, the first light-separating part 4, and the second retro-reflective part 6.

In a third display D3 having the first light source S1, that is, at the position PS1 of the first light source S1, first light and first reflected light L2 can pass through a removed section NS of the first light source S1. As such a third display D3, for example, displays called a transparent display or a see-through display may be exemplified. Specifically, for example, a liquid crystal display with transparent pixels and without a color filter, a display in which the removed section NS is seen as being transparent because a part is made transparent according to organic EL, or a panel (a so-called ribbon LED, etc.) including a plurality of LEDs that are disposed in a stripe form at intervals may be used.

In the display device 1F of the fifth embodiment, some of the first light L1 emitted from the first light source S1 is reflected by the first light-separating part 4 as first reflected light L2. The first reflected light L2 is incident on the first retro-reflective part 2B and is reflected by the first retro-reflective part 2B in the same direction as the incident direction, partially passes through the removed section NS of the third display D3 and is incident on the first light-separating part 4, and also passes through the first light-separating part 4 and forms the aerial image I at the position Q1 symmetrical to the first light source S1 with respect to a plate surface (that is, a reflective surface) of the first light-separating part 4.

In addition, within the first light L1, the first light L18 incident on the first light-separating part 4 at a relatively small angle of incidence is reflected by the first light-separating part 4, and is then incident on the second retro-reflective part 6 as reflected light L28 (first reflected light L2), and is reflected by the second retro-reflective part 6 in the same direction as the incident direction, and passes through the first light-separating part 4, and forms an aerial image I at a position Q1 symmetrical to the first light source S1 with respect to a plate surface (that is, a reflective surface) of the first light-separating part 4.

According to the display device 1F of the fifth embodiment described above, the user can observe the aerial image I from the direction E0 which is on the side opposite to the first light source S1 with respect to the first light-separating part 4. Since an angle at which the aerial image I is visible in the display device 1F extends over substantially the entire plate surface of the first light-separating part 4, it is possible to increase the angle with respect to that in a conventional display device and the like. In addition, as can be understood with reference to FIG. 8, regardless of the position of the first light source S1 in the first display D1, since substantially all of the first light L1 emitted from the first light source S1 can contribute to forming the aerial image I, it is possible to improve the brightness of the aerial image I.

Sixth Embodiment

Next, a display device 1G according to a sixth embodiment of the present invention will be described. Here, in components of the display device 1G of the sixth embodiment shown in FIG. 9, components the same as those of the display device 1A of the first embodiment shown in FIG. 1 and the like are denoted with the same reference numerals, and description thereof will be omitted.

Figure 9:
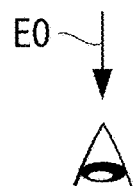
FIG. 9 is a schematic diagram showing a configuration of a display device according to a sixth embodiment of the present invention.
Figure 9:
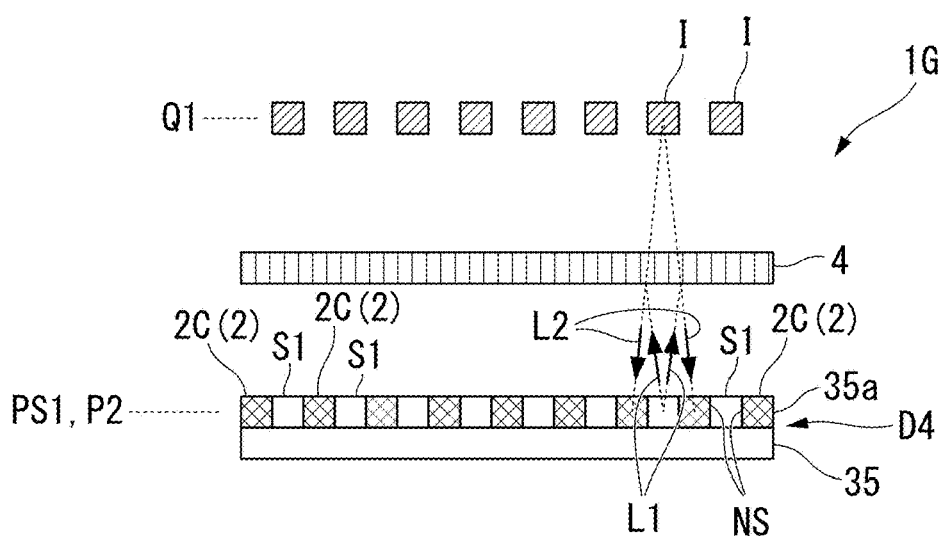

As shown in FIG. 9, the display device 1G includes a fourth display D4 including the first light source S1 and a first retro-reflective part 2C, the first light-separating part 4, and the second retro-reflective part 6.

In addition, the display device 1G is configured so that first reflected light L2 is incident on the first retro-reflective part 2C.

Figure 10:
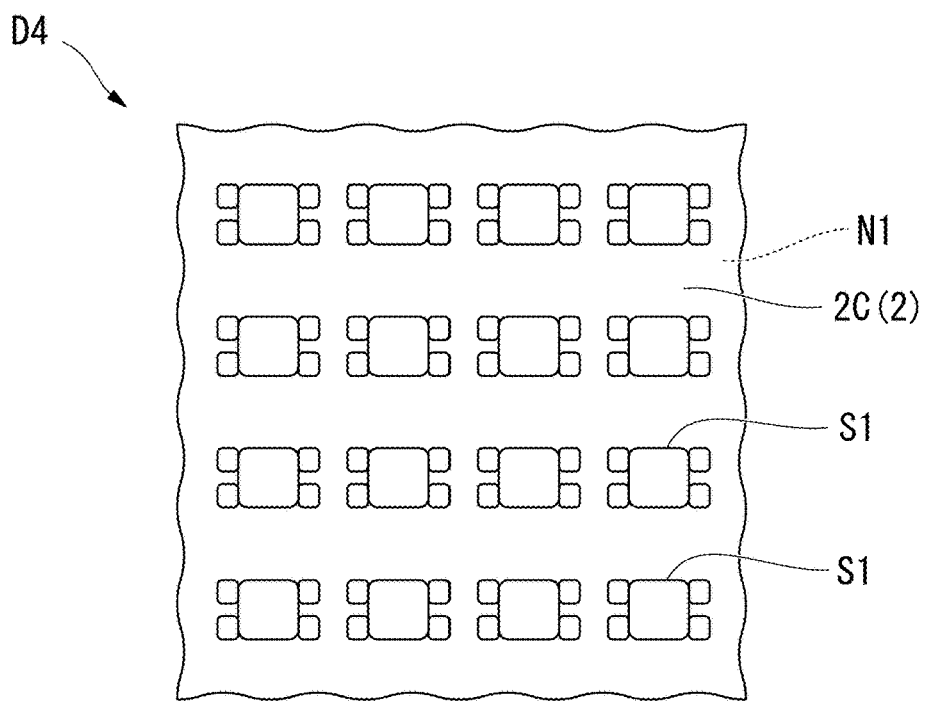
FIG. 10 is a plan view of a fourth display of the display device shown in FIG. 9.

In the display device 1G, in the fourth display D4, on a surface 35a of a substrate 35, the first light sources S1 are disposed at intervals and the first retro-reflective parts 2C are disposed between the first light sources S1 (that is, the removed section NS of the first light source S1, and a non-transparent part of the first reflected light L2). In such a configuration, the first retro-reflective part 2C is disposed at the position P2 on the first emission axis J1 that indicates the emission direction E1 of the first light L1 emitted from the first light source S1. That is, at the same positions PS1 and P2, as shown in FIG. 10, the plurality of light sources S1 and the first retro-reflective parts 2C are spatially divided and disposed.

Here, since it is not necessary for the first light L1 or first reflected light L2 to pass through the first retro-reflective part 2C, for example, when the retro-reflective structures 3A and 3B are used, for a reflective component provided on the side on the surface 3b, that is, the reflective surfaces 12a and 12c, in addition to the above dielectric component, for example, aluminum, gold, and silver may be exemplified.

As shown in FIG. 9, in the display device 1G of the sixth embodiment, some of the first light L1 emitted from the first light source S1 is reflected by the first light-separating part 4 as first reflected light L2. The first reflected light L2 incident on the first retro-reflective part 2C is reflected by the first retro-reflective part 2C in the same direction as the incident direction, and passes through the first light-separating part 4, and forms the aerial image I at the position Q1 symmetrical to the first light source S1 with respect to a plate surface (that is, a reflective surface) of the first light-separating part 4.

In addition, within the first light L1, the first light L18 incident on the first light-separating part 4 at a relatively small angle of incidence is reflected by the first light-separating part 4 and is then incident on the second retro-reflective part 6 as reflected light L28 (first reflected light L2), is reflected by the second retro-reflective part 6 in the same direction as the incident direction, passes through the first light-separating part 4, and forms an aerial image I at a position Q1 symmetrical to the first light source S1 with respect to a plate surface (that is, a reflective surface) of the first light-separating part 4.

According to the display device 1G of the sixth embodiment described above, the user can observe the aerial image I from the direction E0 which is on the side opposite to the first light source S1 with respect to the first light-separating part 4. Since an angle at which the aerial image I is visible in the display device 1G extends over substantially the entire plate surface of the first light-separating part 4, it is possible to increase the angle with respect to that in a conventional display device and the like. In addition, as can be understood with reference to FIG. 9, regardless of the position of the first light source S1 in the fourth display D4, since substantially all of the first light L1 emitted from the first light source S1 can contribute to forming the aerial image I, it is possible to improve the brightness of the aerial image I.

Figure 11:
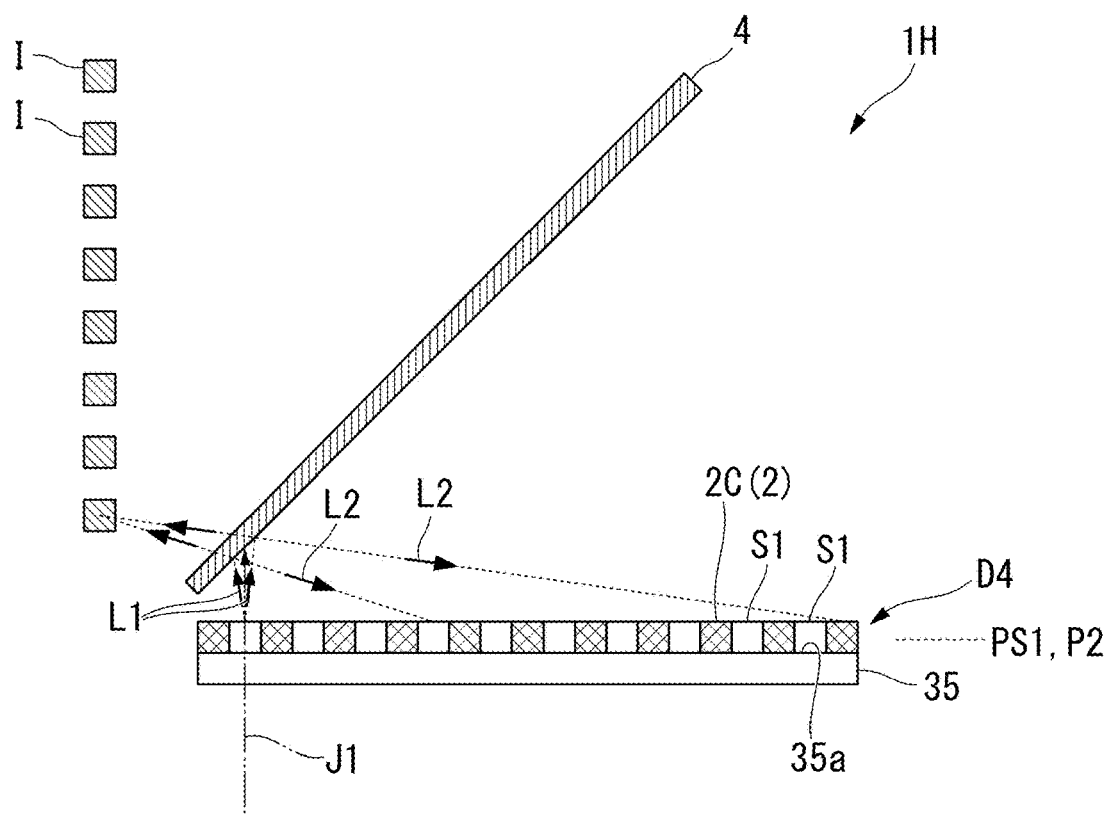
FIG. 11 is a schematic diagram showing a configuration of a display device as a first modified example of the sixth embodiment according to the present invention.

In a display device 1H as a first modified example of the display device 1G of the sixth embodiment, as shown in FIG. 11, the first light-separating part 4 is disposed so that it is inclined at about 45° with respect to a surface of the fourth display D4 (that is, the first light source S1 and the first retro-reflective part 2C).

According to the display device 1H as the first modified example of the sixth embodiment, it is possible to obtain the same operations and effects as in the display device 1G of the sixth embodiment, and additionally, the aerial image I can be formed in a direction substantially perpendicular to a surface of the fourth display D4.

Here, an angle formed by surfaces of the first light-separating part 4 and the fourth display D4 is not limited to about 45 degrees, and can be set to an arbitrary angle, and the aerial image I is formed at a position corresponding to the angle.

Figure 12:
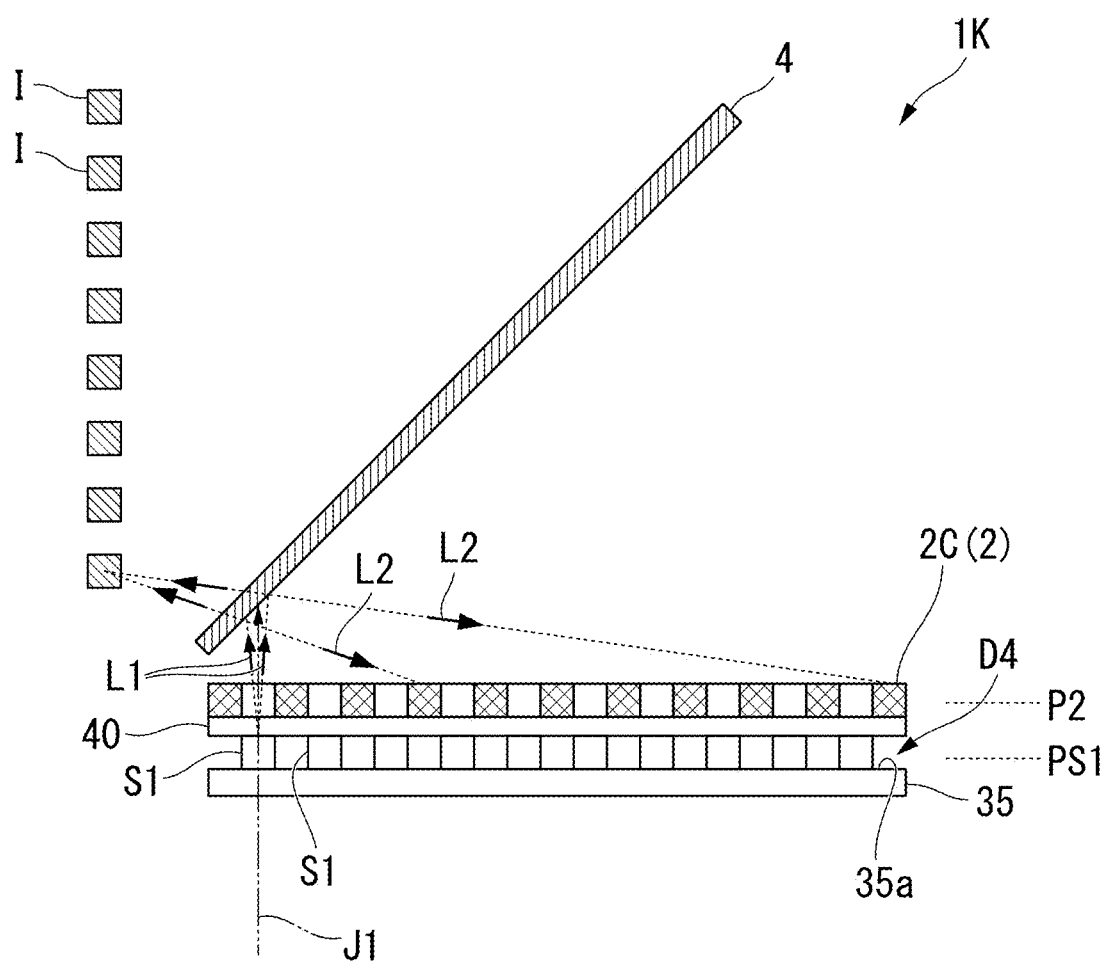
FIG. 12 is a schematic diagram showing a configuration of a display device as a second modified example of the sixth embodiment according to the present invention.

A display device 1K as a second modified example of the display device 1G of the sixth embodiment includes a polarizing plate 40 in addition to the configuration of the display device 1H as shown in FIG. 12. However, the first retro-reflective part 2C maintains a relative relationship in which it is spatially separated from the first light source S1 in the horizontal direction, and is disposed at the position PS1 in the emission direction E1 of the first light L1 with respect to the first light source S1 on the first emission axis J1.

The polarizing plate 40 is disposed between the first light source S1 on the first emission axis J1 and the first retro-reflective part 2C.

In the display device 1K as the second modified example of the sixth embodiment, only predetermined polarized light within the first light L1 emitted from the first light source S1 passes through the polarizing plate 40, and the first light L1 that has passed through the polarizing plate 40 is reflected by the first light-separating part 4 as first reflected light L2. The first reflected light L2 incident on the first retro-reflective part 2C is reflected by the first retro-reflective part 2C in the same direction as the incident direction and passes through the first light-separating part 4, and forms an aerial image I at a position Q1 symmetrical to the first light source S1 with respect to a plate surface (that is, a reflective surface) of the first light-separating part 4.

According to the display device 1K as the second modified example of the sixth embodiment, it is possible to obtain the same operations and effects as in the display device 1H as the first modified example of the sixth embodiment. In addition, according to the display device 1K as the second modified example of the sixth embodiment, the polarizing plate 40 is provided and a reflective polarizing film, a polarizing plate or a half mirror on which a polarizing film is provided, or the like is used as the first light-separating part 4. Therefore, since light directly transmitted is blocked by the first light-separating part 4, the user cannot see the first light source S1 (that is, light directly transmitted) and the fourth display D4. Accordingly, it is possible to prevent visibility of the aerial image I from deteriorating due to mixing of the aerial image I and the first light source S1.

Here, also in the display device 1G of the sixth embodiment shown in FIG. 9, when the first retro-reflective part 2C is disposed at the position PS1 in the emission direction E1 of the first light L1 with respect to the first light source S1 on the first emission axis J1 and the polarizing plate 40 is disposed between the first light source S1 on the first emission axis J1 and the first retro-reflective part 2C, light directly transmitted is blocked as described above and only the aerial image I is observed.

Seventh Embodiment

Next, a display device 1V according to a seventh embodiment of the present invention will be described. Here, in components of the display device 1V of the seventh embodiment shown in FIG. 13, components the same as those of the display device 1A of the first embodiment shown in FIG. 1 and the like are denoted with the same reference numerals, and description thereof will be omitted.

Figure 13:
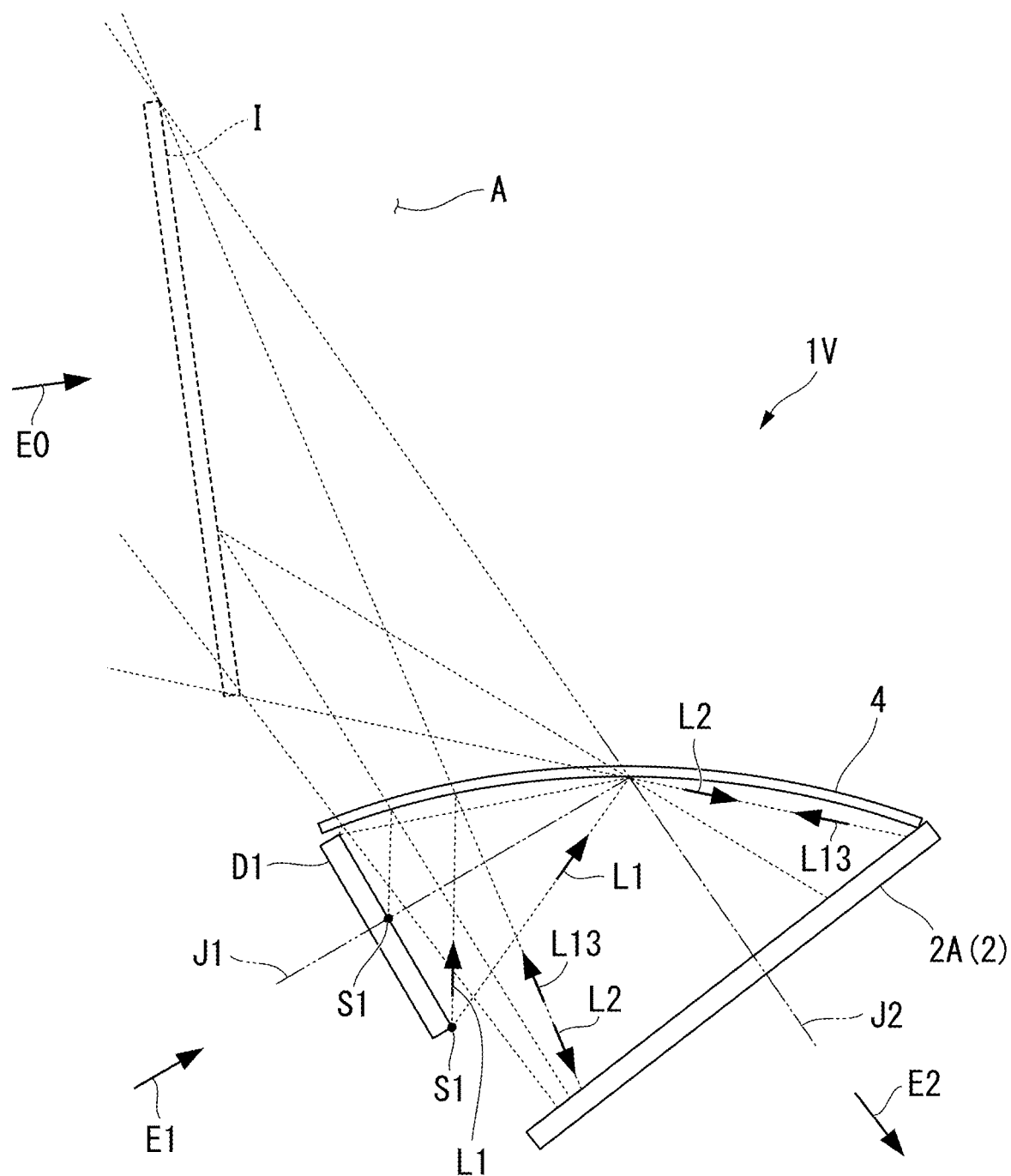
FIG. 13 is a schematic diagram showing a configuration of a display device according to a seventh embodiment of the present invention.

As shown in FIG. 13, the display device 1V includes the first display D1 including the first light source S1, the first light-separating part 4, and the first retro-reflective part 2A.

In the display device 1V, the first retro-reflective part 2A is disposed at a position on a second reflection axis J2 that indicates the emission direction E2 of first reflected light L2.

In addition, the first light-separating part 4 is convexly curved on the side opposite to the side on which the first light source S1 and the first retro-reflective part 2A are disposed with respect to the first light-separating part 4 from the outer circumferential edge toward the center.

According to the display device 1V of the seventh embodiment described above, like the display device 1A of the first embodiment, the user can observe the aerial image I in the space A (that is, a space in which the user is present with respect to the first light-separating part 4). In addition, according to the display device 1V of the seventh embodiment, since the second retro-reflective part 6 is not used, it is possible to simplify the configuration of the device compared to the display device 1A of the first embodiment. In addition, in the display device 1V of the seventh embodiment, the aerial image I is easily disposed at substantially a right angle with respect to the tangent line that passes through an apex of the first light-separating part 4 that is curved. Therefore, when the first light source S1 and the first retro-reflective part 2A are removed in the observation direction E0 and the aerial image I is viewed from the observation direction E0, virtual images of the first light source S1 and the first light source S1 are not visible and the aerial image I can be visually observed.

Here, when a transparent retro-reflective element is disposed on the first light source S1, a field of view of the aerial image I widens.

Eighth Embodiment

Next, a display device 1W according to an eighth embodiment of the present invention will be described. Here, in components of the display device 1W of the eighth embodiment shown in FIG. 14, components the same as those of the display device 1A of the first embodiment shown in FIG. 1 and the like are denoted with the same reference numerals, and description thereof will be omitted.

Figure 14:
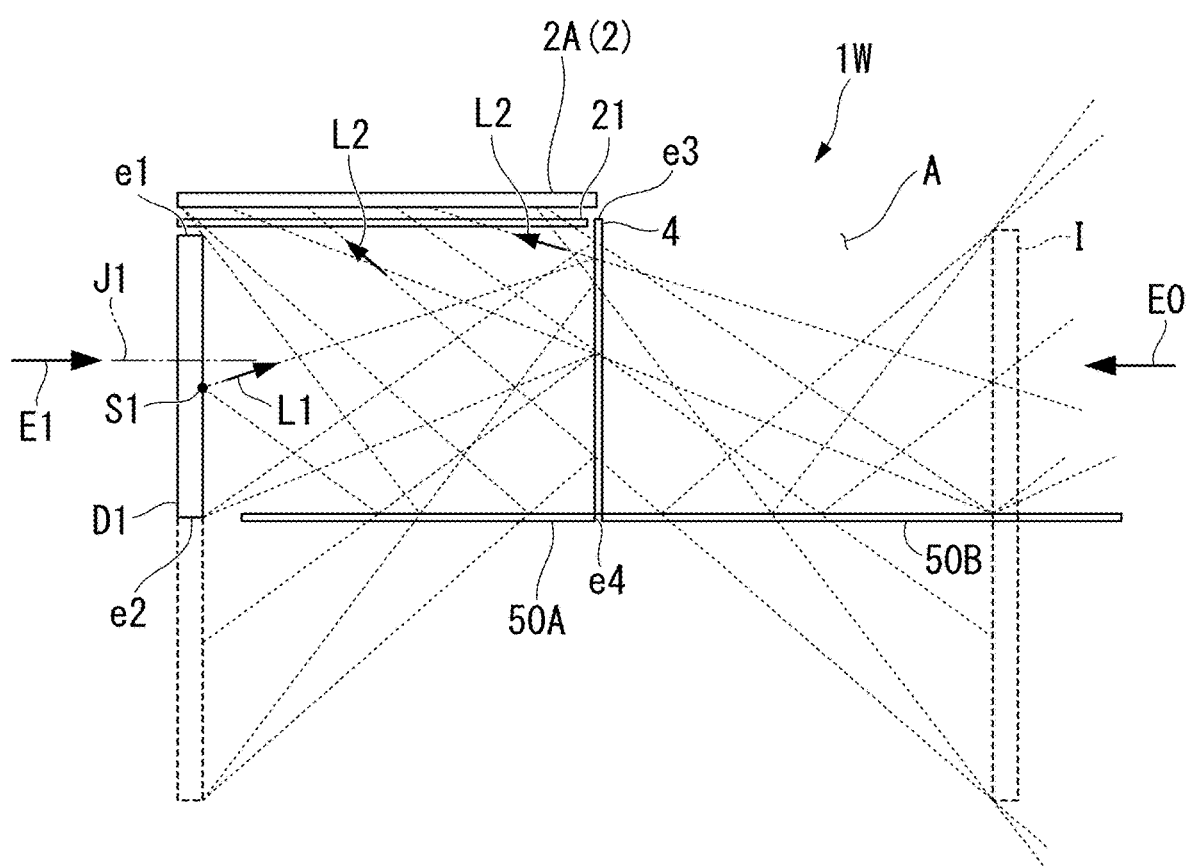
FIG. 14 is a schematic diagram showing a configuration of a display device according to an eighth embodiment of the present invention.

As shown in FIG. 14, the display device 1W includes the first display D1 including the first light source S1, the first wavelength plate 21, the first retro-reflective part 2A, a first reflection plate 50A, the first light-separating part 4, and a second reflection plate 50B.

In the display device 1W, the first wavelength plate 21 extends from a side end e1 (one side of the first light source) of the first display D1 along the first emission axis J1 that indicates the emission direction E1 of the first light L1. The first retro-reflective part 2A is disposed on the side opposite to the side that faces the first display D1 in the first wavelength plate 21 and along the first wavelength plate 21. The first reflection plate 50A extends from a side end e2 (the other side of the first light source) from the first display D1 along the first emission axis J1.

The first reflection plate 50A corresponds to, for example, a known total reflection mirror, but it is not particularly limited as long as it can reflect the first light L1. The first light-separating part 4 is disposed to connect a tip e3 of the first wavelength plate 21 and a tip e4 of the first reflection plate 50A.

The second reflection plate 50B extends from the tip e4 of the first reflection plate 50A in the same direction as the extension direction of the first reflection plate 50A with the first light-separating part 4 therebetween and is flush with the first reflection plate 50A. In addition, the second reflection plate 50B reflects at least some of the first reflected light L2 reflected by the first retro-reflective part 2A and allows the other light to pass therethrough. The second reflection plate 50B corresponds to, for example, a known half mirror, but it is not particularly limited as long as it can reflect first reflected light L2. Here, the second reflection plate 50B may be a total reflection mirror that reflects all of the first reflected light L2 reflected by the first retro-reflective part 2A. In addition, the second reflection plate 50B only needs to reflect at least some of first reflected light L2, and may be a transparent plate (a glass desk mat, etc.). For example, when a desk mat is used as the second reflection plate 50B, a wood grain of the desk can be seen and the aerial image I appears to float thereon.

In the display device 1W of the eighth embodiment described above, within the first light L1 emitted from the first light source S1 of the first display D1, light directed to the first reflection plate 50A is reflected by the first reflection plate 50A, and additionally, is reflected by the first light-separating part 4 made of a reflective polarizing plate or the like toward the first wavelength plate 21. One of P-polarized light and S-polarized light of the first light L1 passes through the first wavelength plate 21, and is retro-reflected by the first retro-reflective part 2A as first reflected light L2 and passes through the first light-separating part 4. The first reflected light L2 that has passed through the first light-separating part 4 is reflected by the second reflection plate 50B as retro-reflective light (reflected light) L13, and forms the aerial image I together with the first reflected light L2 that is directly emitted from the first retro-reflective part 2A. In addition, as shown in FIG. 14, a virtual image of the first display D1 is generated on the side opposite to the first display D1 with the first reflection plates 50A and 50B therebetween.

Therefore, according to the display device 1W of the eighth embodiment, like the display device 1A of the first embodiment, the user can observe the aerial image I in the space A (that is, a space in which the user is present with respect to the first light-separating part 4). For example, when the first reflection plate 50A and the second reflection plate 50B are provided on a stand such as a table, the aerial image I that substantially vertically rises from the stand is obtained and the aerial image I is easily observed. In addition, when a half mirror is used as the second reflection plate 50B and a transparent stand is used, it is possible to observe the aerial image I and also a virtual image at the same time.

Ninth Embodiment

Next, a display device 1P according to a ninth embodiment of the present invention will be described. Here, in components of the display device 1P of the ninth embodiment shown in FIG. 15, components the same as those of the display device 1A of the first embodiment shown in FIG. 1 and the like are denoted with the same reference numerals, and description thereof will be omitted.

Figure 15:
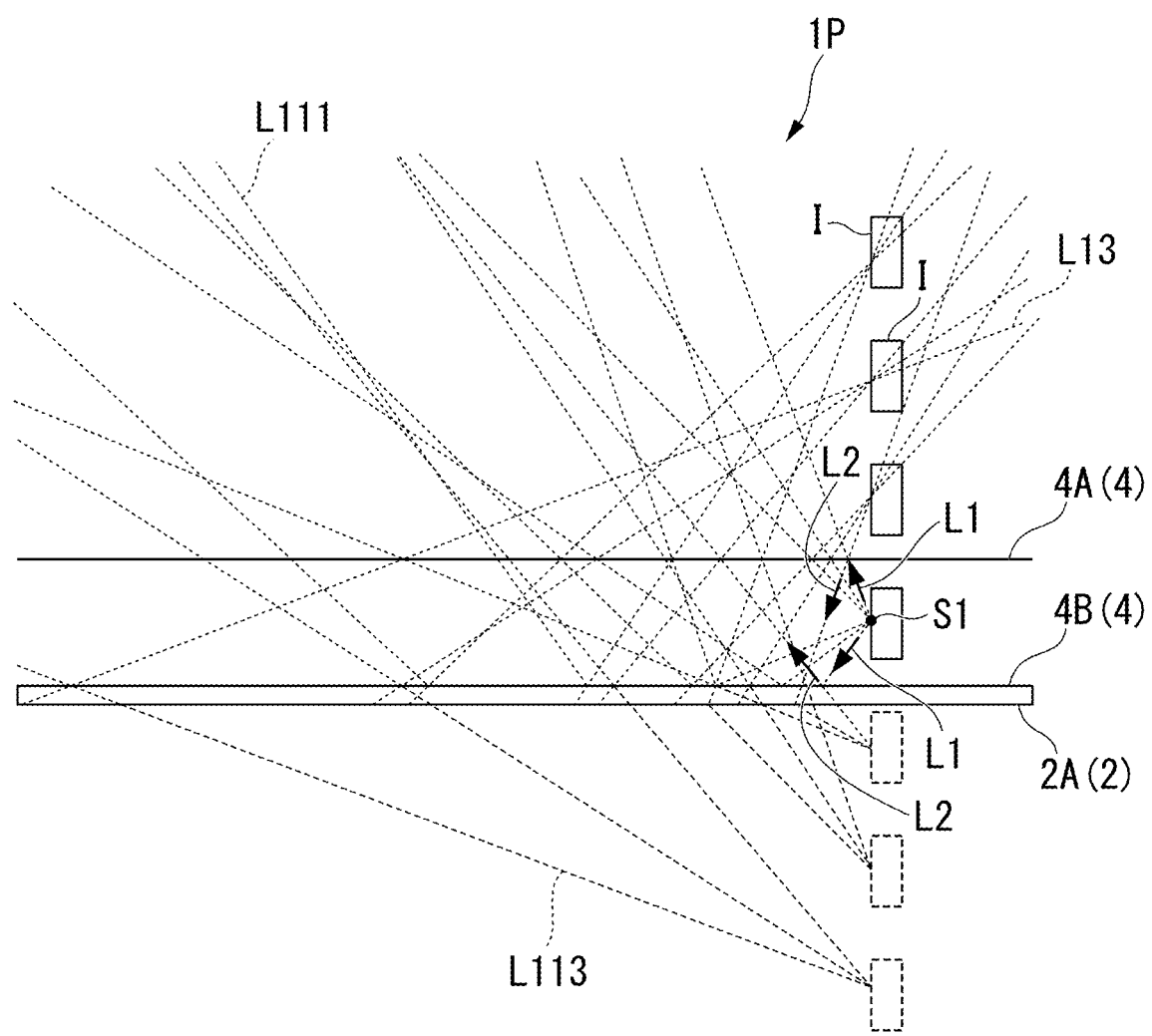
FIG. 15 is a schematic diagram showing a configuration of a display device according to a ninth embodiment of the present invention.

As shown in FIG. 15, the display device 1P includes the first light source S1, a first light-separating part 4A, a second light-separating part 4B, and the first retro-reflective part 2A.

In the display device 1P, the first light-separating part 4A and the second light-separating part 4B are disposed to face each other with the first light source S1 therebetween. In other words, the first light source S1 is disposed between the first light-separating part 4A and the second light-separating part 4B that are disposed to face each other. An emission part (not shown) of the first light source S1 is directed to a space that is formed between the first light-separating part 4A and the second light-separating part 4B. The first light-separating part 4A and the second light-separating part 4B reflect at least some of the first light L1 as first reflected light L2 and also reflect at least some of the first reflected light L2. On a surface side opposite to a surface (side) that faces the first light-separating part 4A in the second light-separating part (one light-separating part) 4B, the first retro-reflective part 2A is provided.

In the display device 1P of the ninth embodiment, the first light L1 emitted from the first light source S1 passes through a space formed between the first light-separating part 4A and the second light-separating part 4B, and strikes the first light-separating part 4A or the second light-separating part 4B, and passes therethrough. When the first light L1 is emitted to the first retro-reflective part 2A, it is returned toward the first light source S1 as retro-reflective light 13 in a direction along the surface of the second light-separating part 4B. Therefore, a plurality of aerial images I are formed in a direction substantially perpendicular to a surface of the first light-separating part 1A at positions that face the first light source S1 with the first light-separating part 1A therebetween.

Here, a virtual image is formed on an imaginary line L113 in which light L111 reflected by the second light-separating part 4B extends toward the first retro-reflective part 2A. That is, a plurality of virtual images are formed at positions that face the first light source S1 with the second light-separating part 1B therebetween.

Therefore, according to the display device 1P of the ninth embodiment, like the display device 1A of the first embodiment, the user can observe a plurality of aerial images I in the space A (that is, a space on the side opposite to the side on which the first light source S1 is provided with respect to the first light-separating part 4). Therefore, it is possible to easily form the aerial images I in multiple stages using the display device 1P, and a range of application development of the display device 1P is expanded.

Here, when a transparent retro-reflective element is used as the first retro-reflective part 2A and a transparent retro-reflective element (not shown) is provided on a side opposite to the first light source S1 of the first light-separating part 4A, the aerial image I can be observed in all directions.

Figure 16:
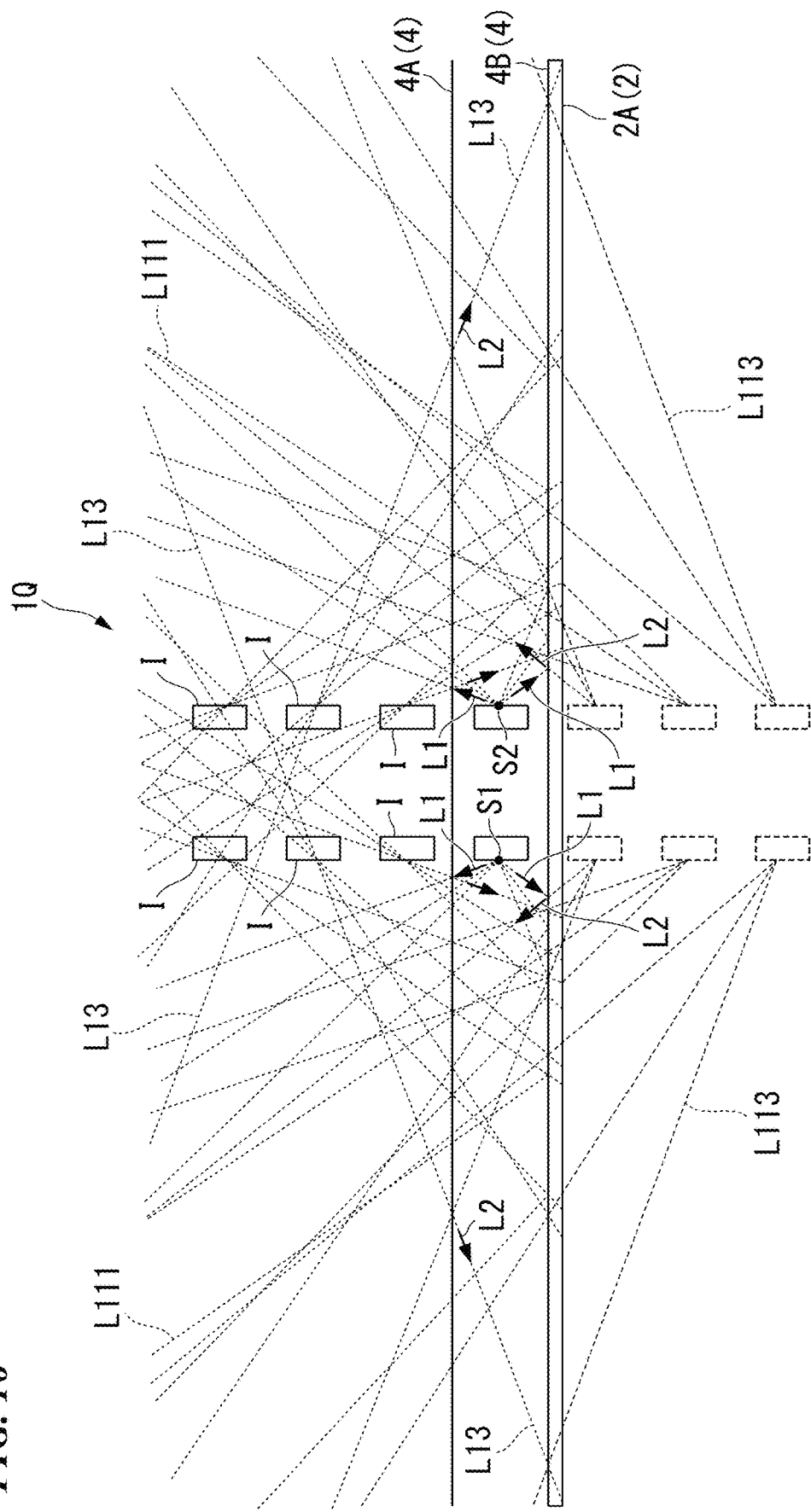
FIG. 16 is a schematic diagram showing a configuration of a display device as a first modified example of the ninth embodiment according to the present invention.

FIG. 16 shows a display device 1Q as a first modified example of the display device 1P of the ninth embodiment. The display device 1Q has a configuration in which the second light source S2 is disposed at an interval from the first light source S1 in a space formed between the first light-separating part 4A and the second light-separating part 4B in the display device 1P. An emission part (not shown) of the second light source S2 is directed to a space that is formed between the first light-separating part 4A and the second light-separating part 4B, and is directed in a direction opposite to a direction in which the emission part of the second light source S2 is directed. In other words, the display device 1Q is obtained by inverting a display device 1N with respect to a direction perpendicular to surfaces of the first light-separating part 4A and the second light-separating part 4B on the side of the first light source S1 of the display device 1P and connecting it.

According to the display device 1Q of the first modified example of the display device 1P of the ninth embodiment, when the first light source S1 and the second light source S2 are used, aerial images I are generated from respective light sources and it is possible to easily increase the number of aerial images I. If virtual images of respective light sources are used, it is possible to further increase the number of aerial images I.

Figure 17:
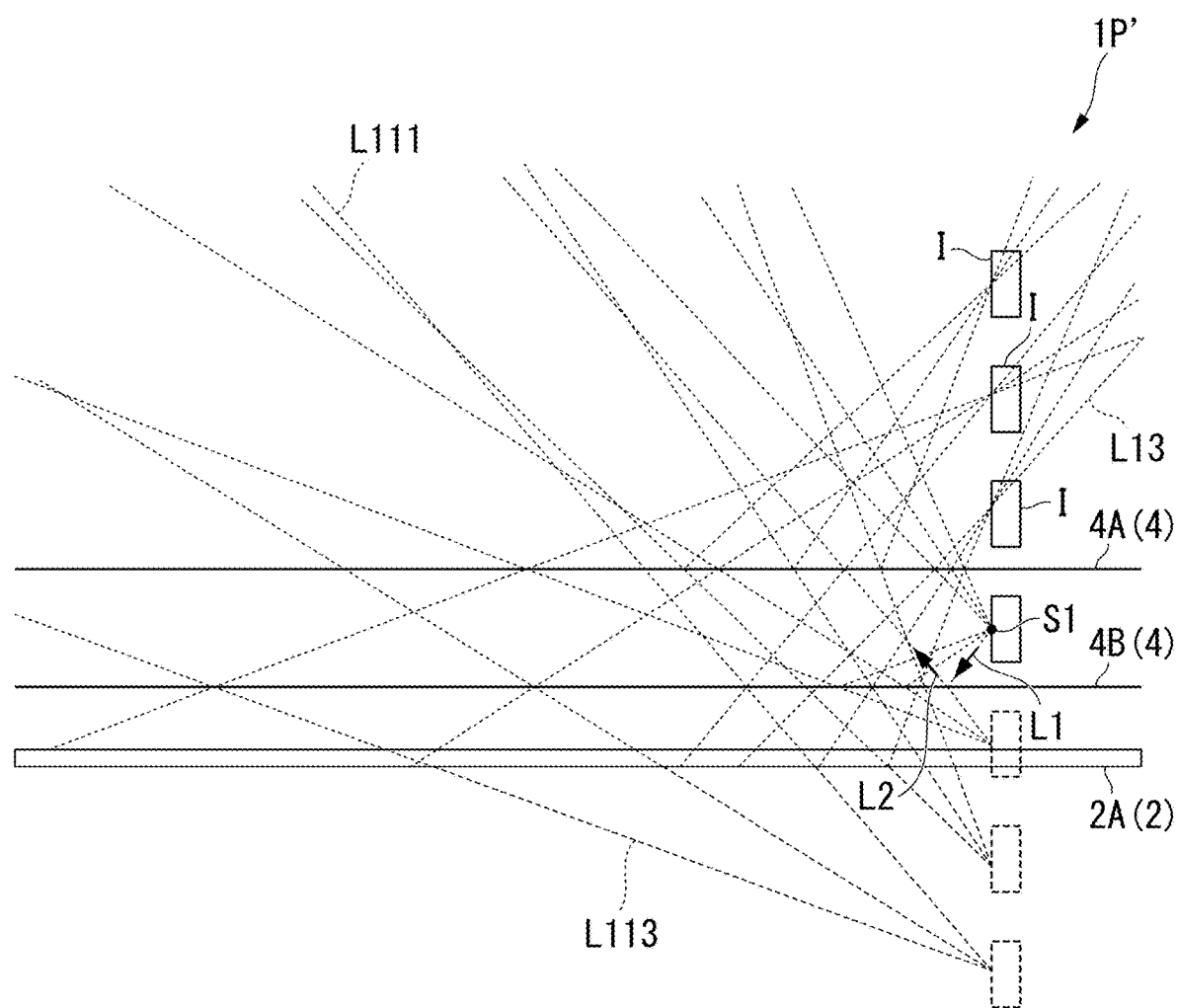
FIG. 17 is a schematic diagram showing a configuration of a display device as another modified example of the ninth embodiment according to the present invention.

Here, in the display device 1P, the first retro-reflective part 2A is in contact with the second light-separating part 4B. However, as in the display device 1P' shown in FIG. 17, the first retro-reflective part 2A may be disposed at a predetermined interval from the second light-separating part 4B. In this manner, the display device 1P has a degree of freedom when components are disposed. In addition, in the display device 1P, both surfaces of one transparent acrylic plate or transparent glass plate can be used as the first light-separating part 4A and the second light-separating part 4B. For example, when an LED is disposed on a glass window sash, and a retro-reflective sheet curtain is attached to the glass window, the multiplexed aerial image I can be observed from the outside. In addition, when another retro-reflective part is disposed in a part that does not interfere with observation of the aerial image I on the side of the first light-separating part 4A, light L111 also forms the aerial image I.

Figure 18:
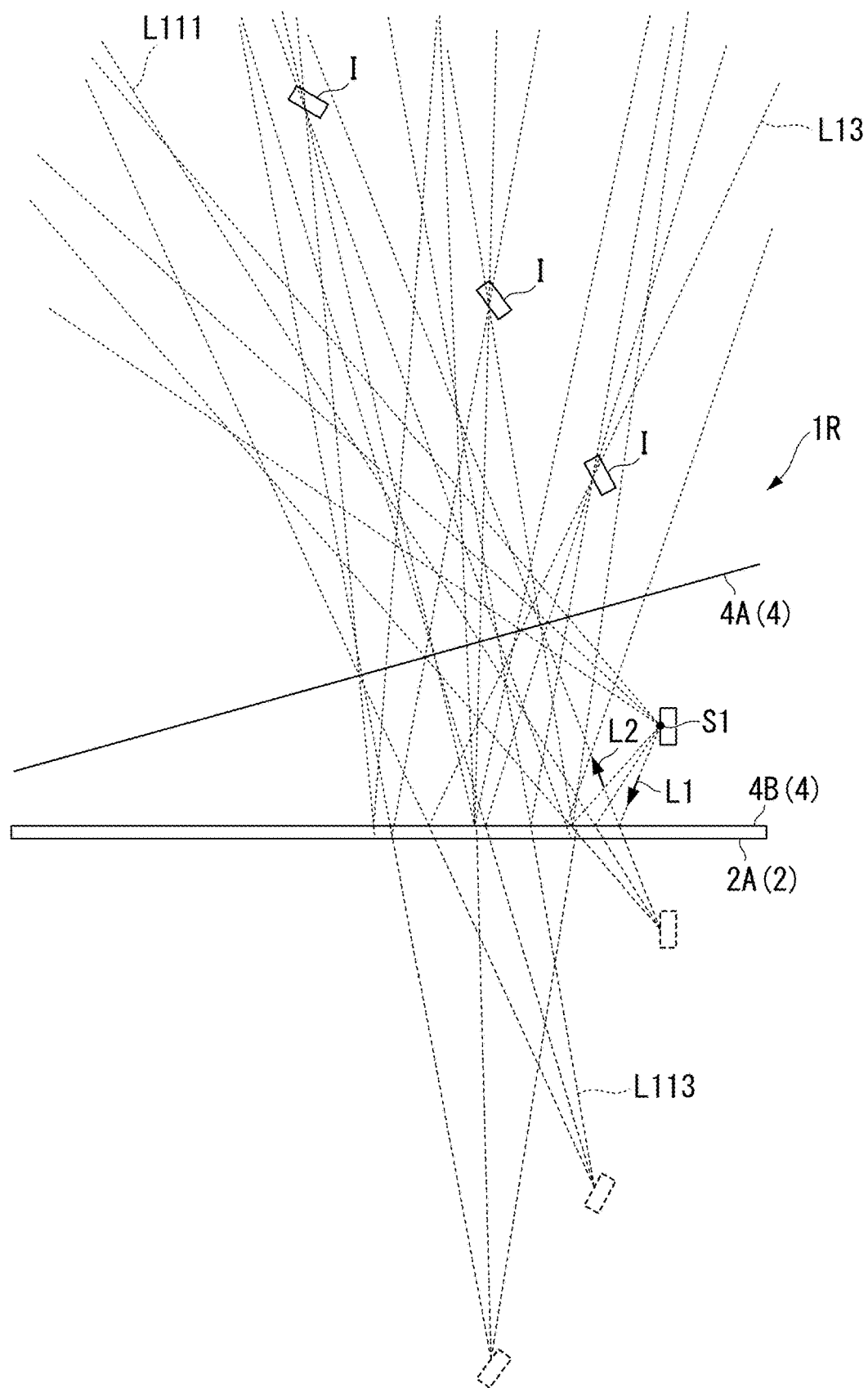
FIG. 18 is a schematic diagram showing a configuration of a display device as a second modified example of the ninth embodiment according to the present invention.

FIG. 18 shows a display device 1R as a second modified example of the display device 1P of the ninth embodiment. In the display device 1R, a surface of the first light-separating part 4A of the display device 1N is inclined in a direction along a surface of the second light-separating part 4B. In the configuration example shown in FIG. 18, the first light-separating part 4A moves away from the second light-separating part 4B from the left side to the right side of the plane of the paper.

According to the display device 1R of the second modified example of the display device 1P of the ninth embodiment, a plurality of real images and virtual images of the first light source S1 are formed on a virtual circumference with respect to a virtual intersection in which extension lines of surfaces of the first light-separating part 4A and the second light-separating part 4B cross each other. The display device 1R is an example. However, in this manner, with a disposition in which the first light-separating part 4A and the second light-separating part 4B face each other and an angle thereof is adjusted, it is possible to easily change the position of the aerial image I, that is, positions at which a plurality of real images and virtual images of the first light source S1 are formed. Here, in the display device 1P of the ninth embodiment, an adjustment part that can adjust dispositions and angles of the first light-separating part 4A and the second light-separating part 4B may be provided.

In addition, although not shown, since the display device 1P and the display devices 1Q, 1P', and 1R which are modified examples thereof can form a plurality of aerial images I using a light source (for example, a point light source, an LED, etc.) that can emit spot-like first light L1, they can be applied as a kaleidoscope. In the related art, in order to realize a kaleidoscope for a plurality of persons, it is necessary to increase the size of the kaleidoscope itself to an extent that a plurality of persons can look into it at the same time. However, when the aerial image I is provided as a pattern that can be observed through the kaleidoscope using the display device 1P or the like, a kaleidoscope pattern is formed in the air and a plurality of persons can observe the kaleidoscope pattern at the same time from a wide range regardless of a positioning of the persons.

Tenth Embodiment

Next, a display device 1T according to a tenth embodiment of the present invention will be described. Here, in components of the display device 1T of the tenth embodiment shown in FIG. 20 to FIG. 23, components the same as those of the display device 1A of the first embodiment shown in FIG. 1 and the like are denoted with the same reference numerals, and description thereof will be omitted.

Figure 19:
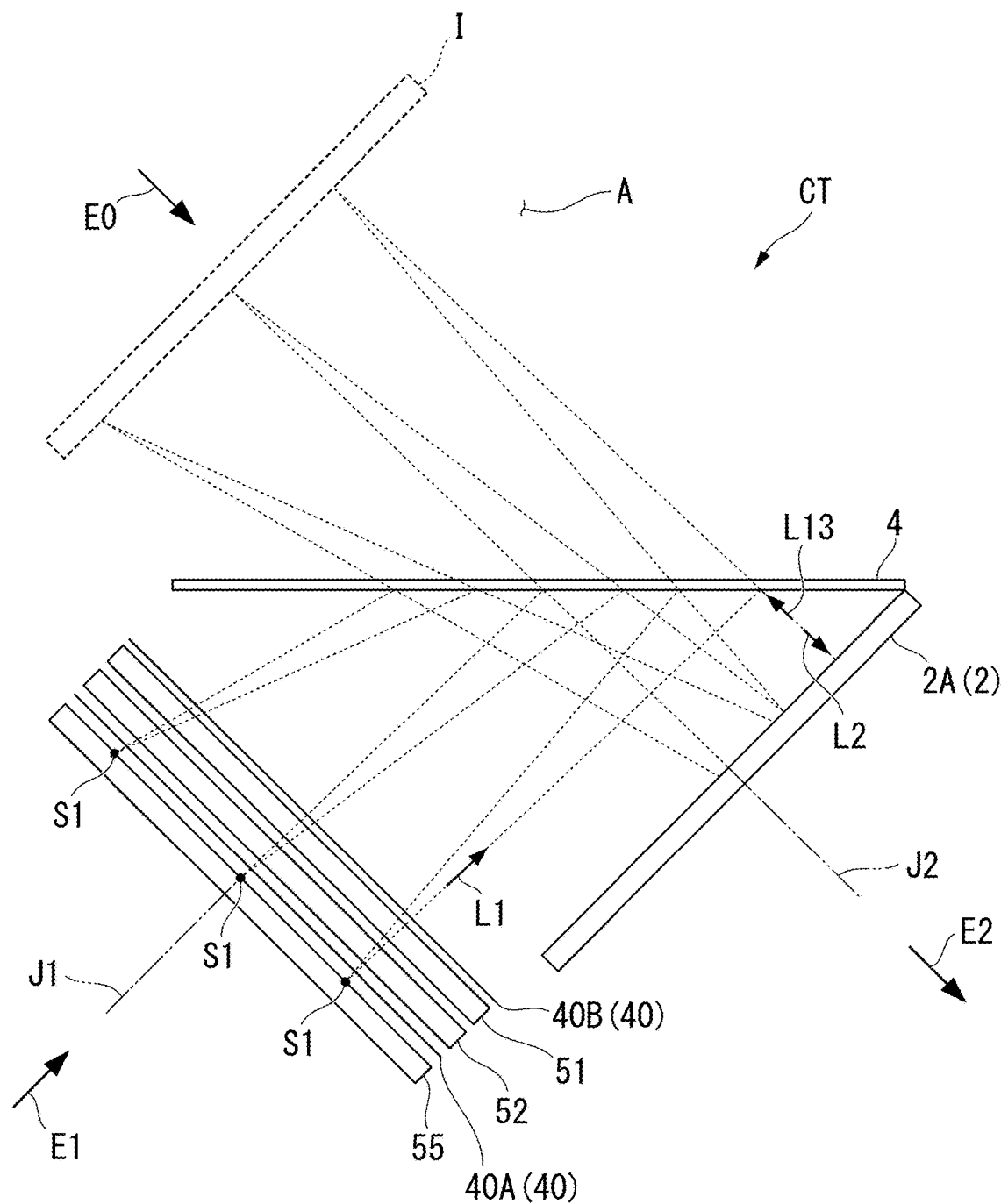
FIG. 19 is a schematic diagram showing a configuration of a display device according to a tenth embodiment of the present invention.

FIG. 19 shows a known display device CT.

The display device 1T of the tenth embodiment includes a backlight 55 including a plurality of first light sources S1, a first liquid crystal panel 51, a first polarizing plate 40A, the first light-separating part 4, and the first retro-reflective part 2A.

In the display device 1T, the backlight 55 illuminates the first liquid crystal panel 51 and a second liquid crystal panel 52 from behind the first emission axis J1 that indicates the emission direction E1 of the first light L1. In the backlight 55, the first light source S1 is disposed so that an emission part faces toward the first polarizing plate 40A. However, the number of liquid crystal panels laminated along the first emission axis J1 is not limited to two, and may be three or more. In addition, a phase difference film may be included between liquid crystal panels laminated along the first emission axis J1.

The first liquid crystal panel 51 is disposed at a position on the first emission axis J1. The first polarizing plate 40A is disposed between the first display D1 on the first emission axis J1 and the first liquid crystal panel 51.

The first light-separating part 4 reflects at least some of the first light L1 as first reflected light L2 and allows at least some of the retro-reflective light L13 retro-reflected by the first retro-reflective part 2A to pass therethrough. The first retro-reflective part 2A is disposed at a position on the second emission axis J2 that indicates the emission direction E2 of first reflected light L2.

As shown in FIG. 19, in the conventional display device CT, in addition to the above configuration, the second liquid crystal panel 52 is disposed between the first polarizing plate 40A on the first emission axis J1 and the first liquid crystal panel 51, and a second polarizing plate 40B is disposed in front of the first liquid crystal panel 51 on the first emission axis J1. The second liquid crystal panel 52 is a so-called rear liquid crystal panel. In the display device CT, a first polarizing plate 21 and a second polarizing plate 22 are disposed on the side of the backlight 55 with respect to the first light-separating part 4. That is, the backlight 55, the first polarizing plate 21, the first liquid crystal panel 51, the second liquid crystal panel 52, and the second polarizing plate 22 constitute a multi-layer liquid crystal (or a laminated liquid crystal). A half mirror can be used as the first light-separating part 4.

In the display device CT, within the first light L1 emitted from the first light source S1 of the first display D1 through the backlight 55, one of P-polarized light and S-polarized light passes through the first polarizing plate 40A and illuminates the first liquid crystal panel 51 and the second liquid crystal panel 52. The first light L1 that has passed through the second polarizing plate 40B and is emitted from the first liquid crystal panel 51 is reflected by the first light-separating part 4 as first reflected light L2. The first reflected light L2 is retro-reflected by the first retro-reflective part 2A as retro-reflective light L13, passes through the first light-separating part 4, and forms the aerial image I with the first light-separating part 4 therebetween.

Figure 20:
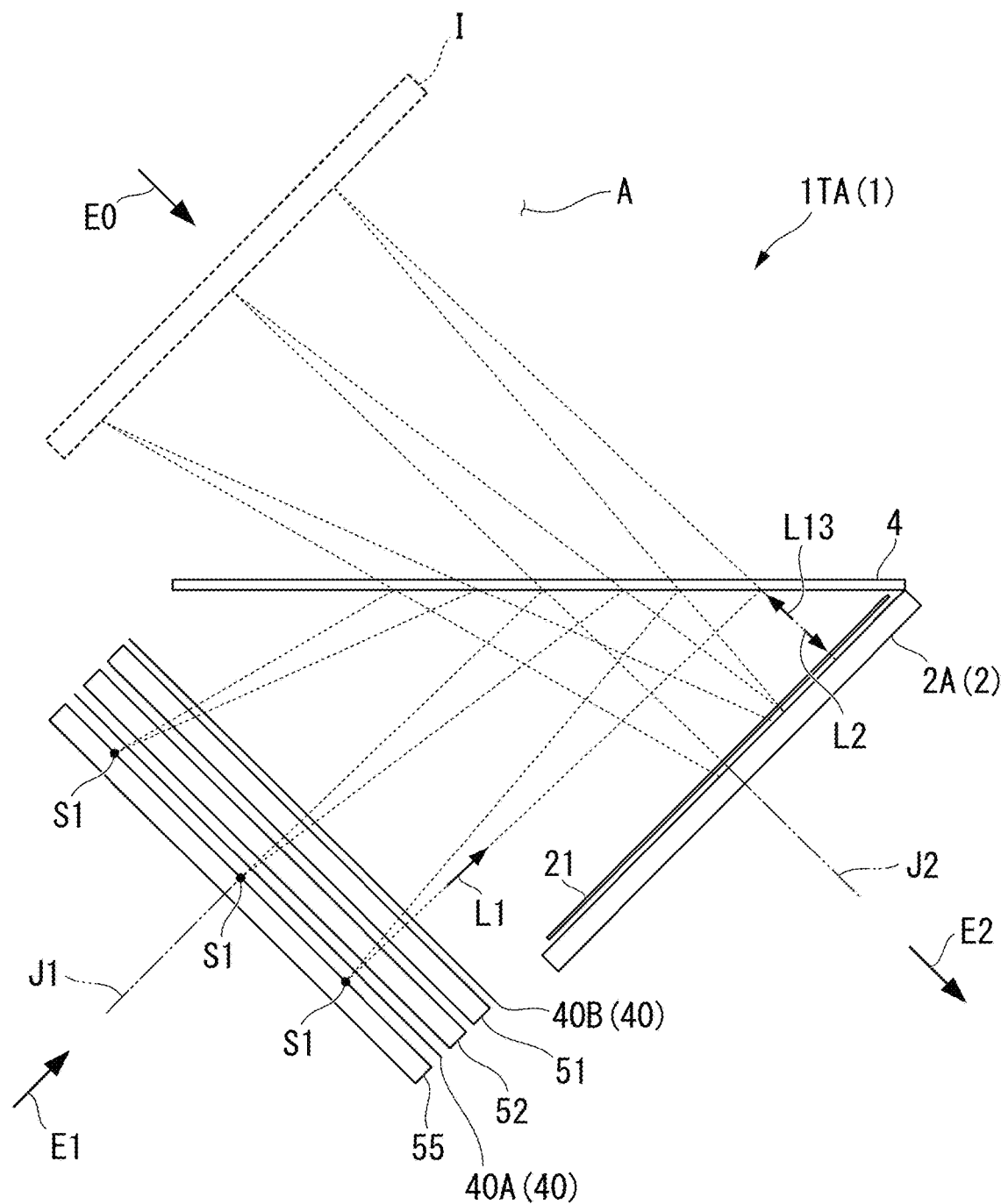
FIG. 20 is a schematic diagram showing another configuration of the display device according to the tenth embodiment of the present invention.

Unlike the above display device CT, as shown in FIG. 20, in a display device 1TA of the tenth embodiment, the first wavelength plate 21 is disposed behind the first retro-reflective part 2A on the second emission axis J2. The first wavelength plate 21 is a so-called λ/4 plate, and a reflective polarizing plate is used as the first light-separating part 4. A direction of the reflective polarizing plate constituting the first light-separating part 4 is parallel to a direction of the first polarizing plate 40A. That is, the first light-separating part 4 and the first polarizing plate 40B are disposed to form a parallel nicol (or parallel nicol) relationship. According to such disposition, the first light L1 emitted from the second polarizing plate 40B has a crossed nicol relationship with respect to the first light-separating part 4, and does not easily pass through the first light-separating part 4, and is reflected by the first light-separating part 4 as first reflected light L2. Retro-reflective light L13 that is reflected by the first retro-reflective part 2A after it passes through the first wavelength plate 21 and is incident on the first retro-reflective part 2A has a parallel nicol relationship with respect to the first light-separating part 4, passes through the first light-separating part 4, and forms the aerial image I.

Figure 21:
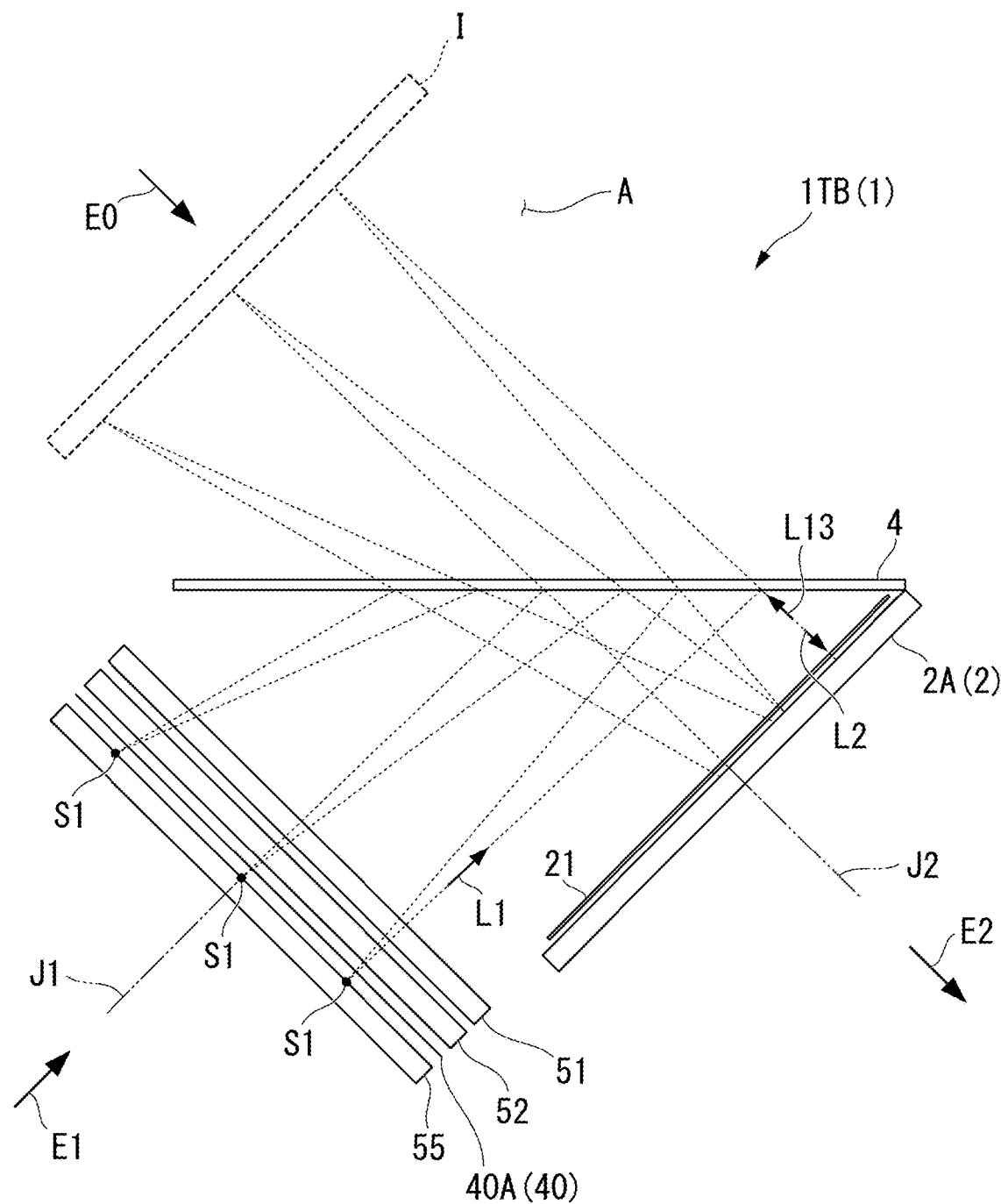
FIG. 21 is a schematic diagram showing still another configuration of the display device according to the tenth embodiment of the present invention.

As shown in FIG. 21, in a display device 1TB as another example of the tenth embodiment, the second polarizing plate 40B is omitted, and an optical axis of the first wavelength plate 21 is set to be parallel to a width direction of the backlight 55 including the first light source S1, that is, disposed in a direction of 45° with respect to a polarization direction of the first polarizing plate 40A in the configuration of the above display device 1TA. Therefore, in the display device 1TB, the first light-separating part 4 and the first polarizing plate 40A are disposed to form a parallel nicol relationship. The first light L1 emitted from the first liquid crystal panel 51 maintains a parallel nicol relationship with respect to the first light-separating part 4. First reflected light L2 reflected by the first light-separating part 4 passes through the first wavelength plate 21 and is incident on the first retro-reflective part 2A. Then, retro-reflective light L13 reflected by the first retro-reflective part 2A forms a parallel nicol relationship with respect to the first light-separating part 4 again, passes through the first light-separating part 4, and forms the aerial image I.

Figure 22:
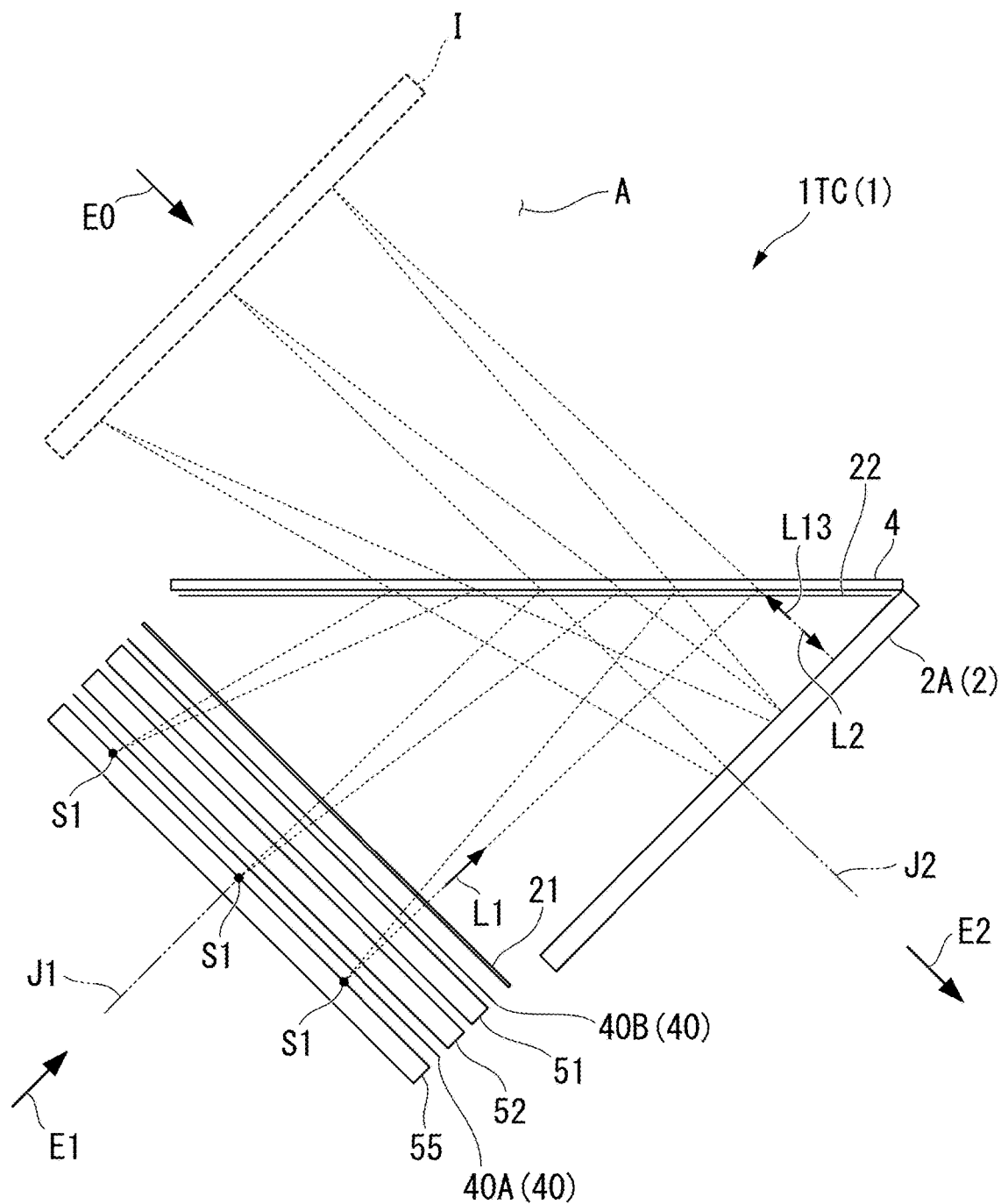
FIG. 22 is a schematic diagram showing another configuration of the display device according to the tenth embodiment of the present invention.

As shown in FIG. 22, in a display device 1TC as another example of the tenth embodiment, the first wavelength plate 21 is disposed in front of the second polarizing plate 40B on the first emission axis J1 in the configuration of the above display device 1TA. In addition, the second wavelength plate 22 is disposed behind the first retro-reflective part 2A on the second emission axis J2. In the configuration example in FIG. 22, the first wavelength plate 21 is disposed in the vicinity of a surface on the side of the first light-separating part 4 of the second polarizing plate 40B, and the second wavelength plate 22 is disposed in the vicinity of a surface on the side of the first retro-reflective part 2A of the first light-separating part 4. In addition, a direction of the reflective polarizing plate constituting the first light-separating part 4 is perpendicular to a direction of the first polarizing plate 40A. That is, the first light-separating part 4 and the first polarizing plate 40A are disposed to form a crossed nicol (or perpendicular nicol) relationship. That is, optical axes of the first wavelength plate 21 and the second wavelength plate 22 are disposed at 45° with respect to a polarization direction of the second polarizing plate 40B.

Therefore, in the display device 1TC, the first light L1 emitted from the first liquid crystal panel 51 passes through the second polarizing plate 40B, the first wavelength plate 21, and the second wavelength plate 22, and forms a crossed nicol relationship with respect to the first light-separating part 4. First reflected light L2 reflected by the first light-separating part 4 passes through the second wavelength plate 22 and is incident on the first retro-reflective part 2A. Then, retro-reflective light L13 reflected by the first retro-reflective part 2A passes through the second wavelength plate 22 again, forms a parallel nicol relationship with respect to the first light-separating part 4, passes through the first light-separating part 4, and forms the aerial image I.

Figure 23:
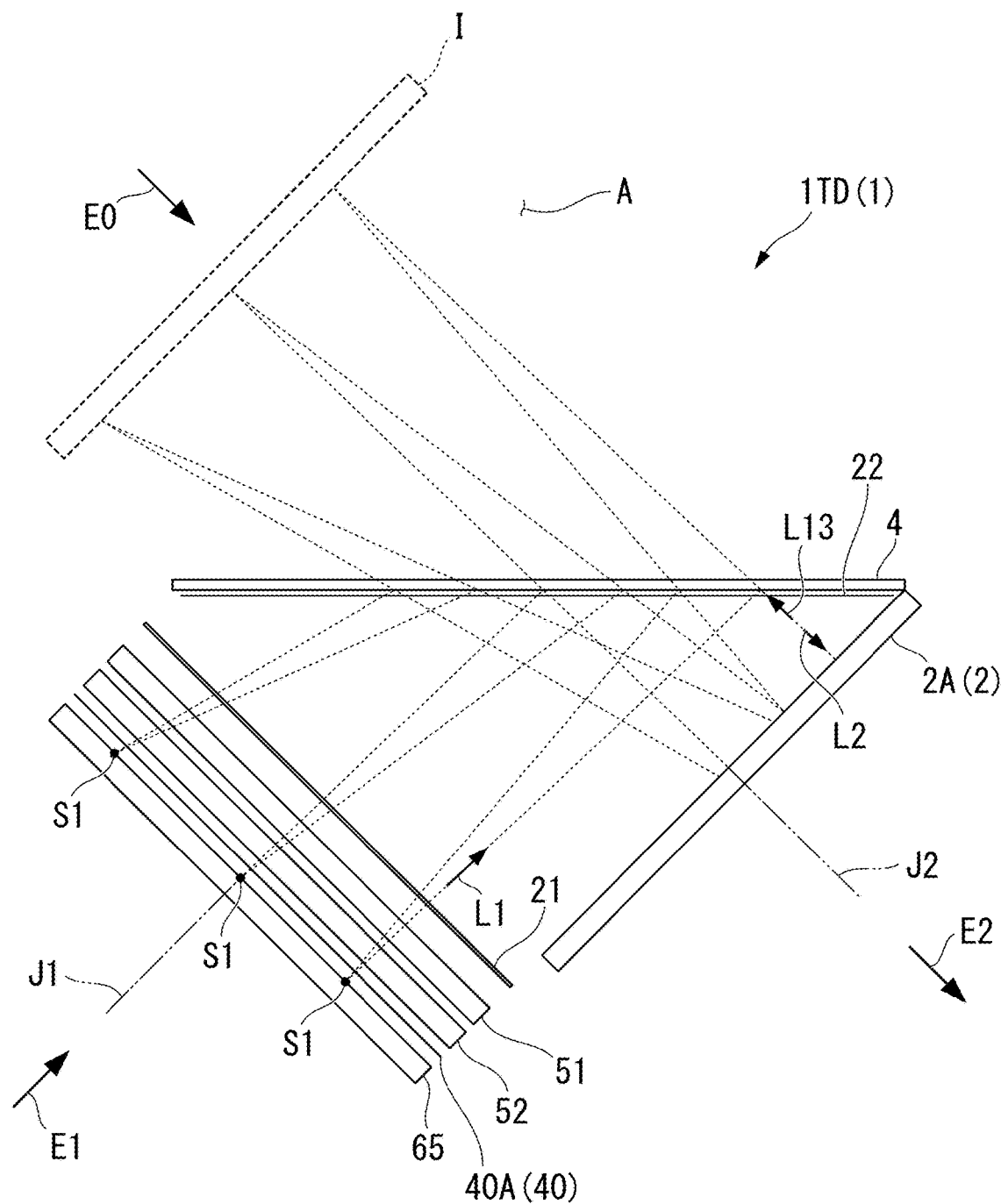
FIG. 23 is a schematic diagram showing still another configuration of the display device according to the tenth embodiment of the present invention.

As shown in FIG. 23, in a display device 1TD as another example of the tenth embodiment, the second polarizing plate 40B is omitted and the first wavelength plate 21 is disposed in front of the first liquid crystal panel 51 on the first emission axis J1 in the configuration of the above display device 1TC. In addition, a direction of a reflective polarizing plate constituting the first light-separating part 4 is perpendicular to a direction of the first polarizing plate 40A, and the first light-separating part 4 and the first polarizing plate 40A are disposed to form a crossed nicol (or perpendicular nicol) relationship.

On the other hand, the first wavelength plate 21 and the second wavelength plate 22 are disposed so that optical axes of the first wavelength plate 21 and the second wavelength plate 22 are at 45° with respect to an optical axis of the first liquid crystal panel 51.

Therefore, in the display device 1TD, the first light L1 emitted from the first liquid crystal panel 51 passes through the first wavelength plate 21 and the second wavelength plate 22 and forms a parallel nicol relationship with respect to the first light-separating part 4. First reflected light L2 reflected by the first light-separating part 4 passes through the second wavelength plate 22 and is incident on the first retro-reflective part 2A. Then, retro-reflective light L13 reflected by the first retro-reflective part 2A passes through the second wavelength plate 22 again, forms a parallel nicol relationship with respect to the first light-separating part 4, passes through the first light-separating part 4, and forms the aerial image I.

According to the display devices 1TA, 1TB, 1TC, and 1TD of the tenth embodiment described above, like the display device 1A of the first embodiment, the user can observe the aerial image I in the space A (that is, a space in which the user is present with respect to the first light-separating part 4). In addition, in a general liquid crystal display, a polarizing plate is disposed on the side of the user, and some of light is absorbed in the polarizing plate. In particular, according to the display devices 1TB and 1TD of the tenth embodiment, it is possible to realize a configuration in which the polarizing plate (that is, the second polarizing plate 40B) disposed on the side of the user is omitted in the general liquid crystal display.

Accordingly, since attenuation of light due to absorption by the polarizing plate disappears, the brightness of the aerial image I is improved. Therefore, the user can easily visually observe the aerial image I, and it is possible to realize a secure aerial display or multi-layer display that is easy on the user's eyes.

Here, when a transparent retro-reflective element (not shown) is provided on the side of the first light-separating part 4 (for example, in the display device 1TA, a surface on the side of the first light-separating part 4 in the second polarizing plate 40B) in a laminated structure including the first light source S1, it is possible to observe the aerial image I from a wide range.

As described above, a display method for an aerial image to which the present invention is applied includes a step of emitting the first light L1 from the first light source S and allowing the first light L1 to pass through the first retro-reflective part 2 at a position on the first emission axis J1, a step of reflecting at least some of the first light L1 that has passed through the first retro-reflective part 2 by the first light-separating part 4 toward the first retro-reflective part 2 as first reflected light L2, and a step of allowing at least some of the first reflected light L2 retro-reflected by the first retro-reflective part 2 to pass through the first light-separating part 4.

According to the above display method for an aerial image, it is possible to observe the aerial image I at a wider angle.

While preferable embodiments of the present invention have been described above in detail, the present invention is not limited to such specific embodiments, and various modifications and alternations can be made within the spirit and scope of the present invention described in the claims of the invention.

Figure 24:
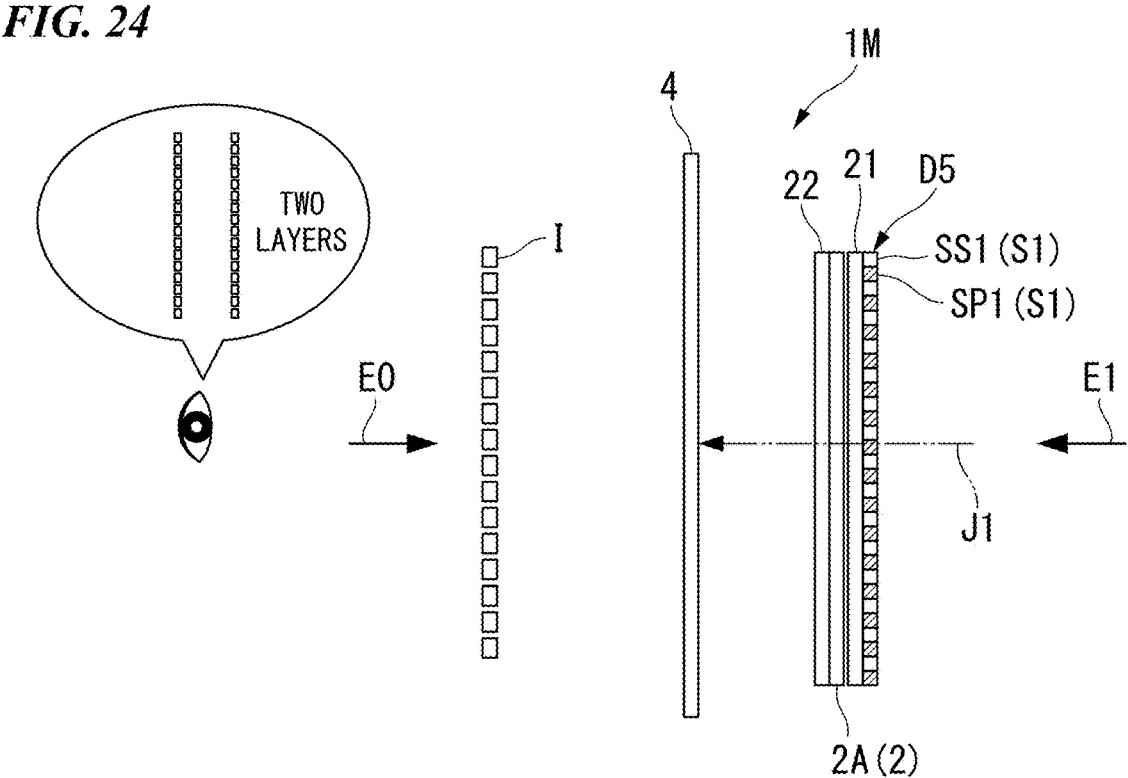
FIG. 24 is a schematic diagram showing a configuration of a first modified example of the display device according to the present invention.

For example, the configuration of the display device 1B shown in FIG. 4 may be changed as shown in FIG. 24. That is, the first polarization branching part 25 of the display device 1B may be omitted and a fifth display D5 may be used in place of the first display D1. For example, a reflective polarizing film can be used as the first light-separating part 4.

The plane of the fifth display D5 is partitioned into an S wave light-emitting part SS1 configured to emit S-wave-polarized first light L1 and a P wave light-emitting part SP1 configured to emit P-wave-polarized first light L1. For example, a combination of an LED light source and a polarizing plate that can emit S-polarized light can be used as the S wave light-emitting part SS1, but the present invention is not particularly limited. In addition, for example, a combination of an LED light source and a polarizing plate that can emit P-polarized light can be used as the P wave light-emitting part SP1, but the present invention is not particularly limited. In addition, in the fifth display D5, polarized light (S wave or P wave) emitted for each predetermined area in the plane of the fifth display D5 can be adjusted by a control part (not shown).

According to the above display device 1M, polarization of the first light L1 is adjusted to S waves or P waves for each predetermined area in the plane of the fifth display D5, and as shown in FIG. 24, the user can see the aerial image I due to S-wave-polarized light or the aerial image I due to P-wave-polarized light and also a direct image by P-wave-polarized light or S-wave-polarized light on the fifth display D5. Since the aerial image and the direct image are separated for each pixel, it is possible to independently display images of two layers using a single display D5. Therefore, the display device 1M can be applied to a depth-fused 3D (DFD) display in which depth is perceived at positions corresponding to brightness levels of the S wave light-emitting part SS1 and the P wave light-emitting part SP1.

Figure 25:
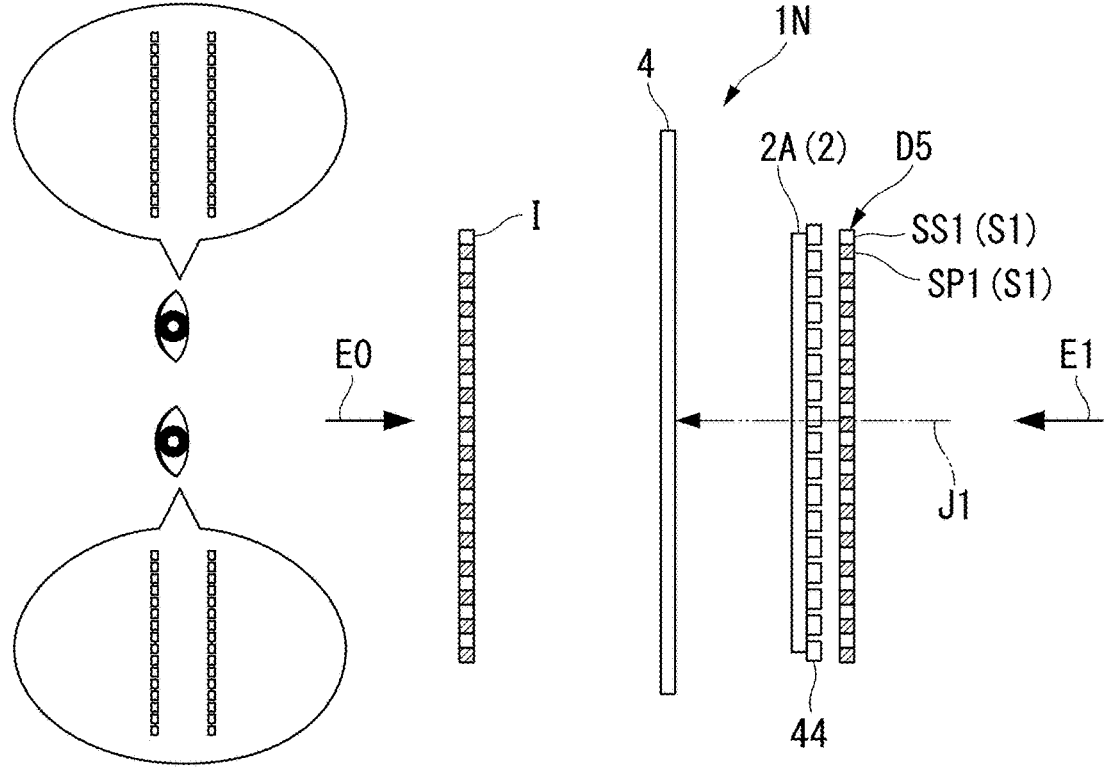
FIG. 25 is a schematic diagram showing a configuration of a second modified example of the display device according to the present invention.

In addition, as a modified example of the display device 1M, the display device 1N shown in FIG. 25 may be exemplified. In the display device 1N, the first wavelength plate 21 and the second wavelength plate 22 are omitted in the configuration of the display device 1M, and in place thereof, a 3D film 44 is disposed between the fifth display D5 (the first light source S1) on the first emission axis J1 and the first retro-reflective part 2A. As the 3D film 44, for example, a parallactic barrier, a parallax barrier, or a lenticular lens may be exemplified.

According to the above display device 1N, polarization of the first light L1 is adjusted to S waves or P waves for each predetermined area in the plane of the fifth display D5, and as shown in FIG. 25, the user can see the aerial image I due to one of S-wave-polarized light and P-wave-polarized light with the right eye and the aerial image I due to the other of S-wave-polarized light and P-wave-polarized light with the left eye. Therefore, the display device 1N can be applied to a DFD display in which depth is perceived at positions corresponding to brightness levels of the S wave light-emitting part SS1 and the P wave light-emitting part SP1.

In addition, in the display device according to the present invention, an imaging element may be disposed between the first light source S1 on the first emission axis J1 and the first retro-reflective part 2. As the imaging element, for example, a lenticular lens and a fly's eye lens may be exemplified. As a display including the first light source S1 and the second light source S2, a 3D display may be used.

Figure 26:
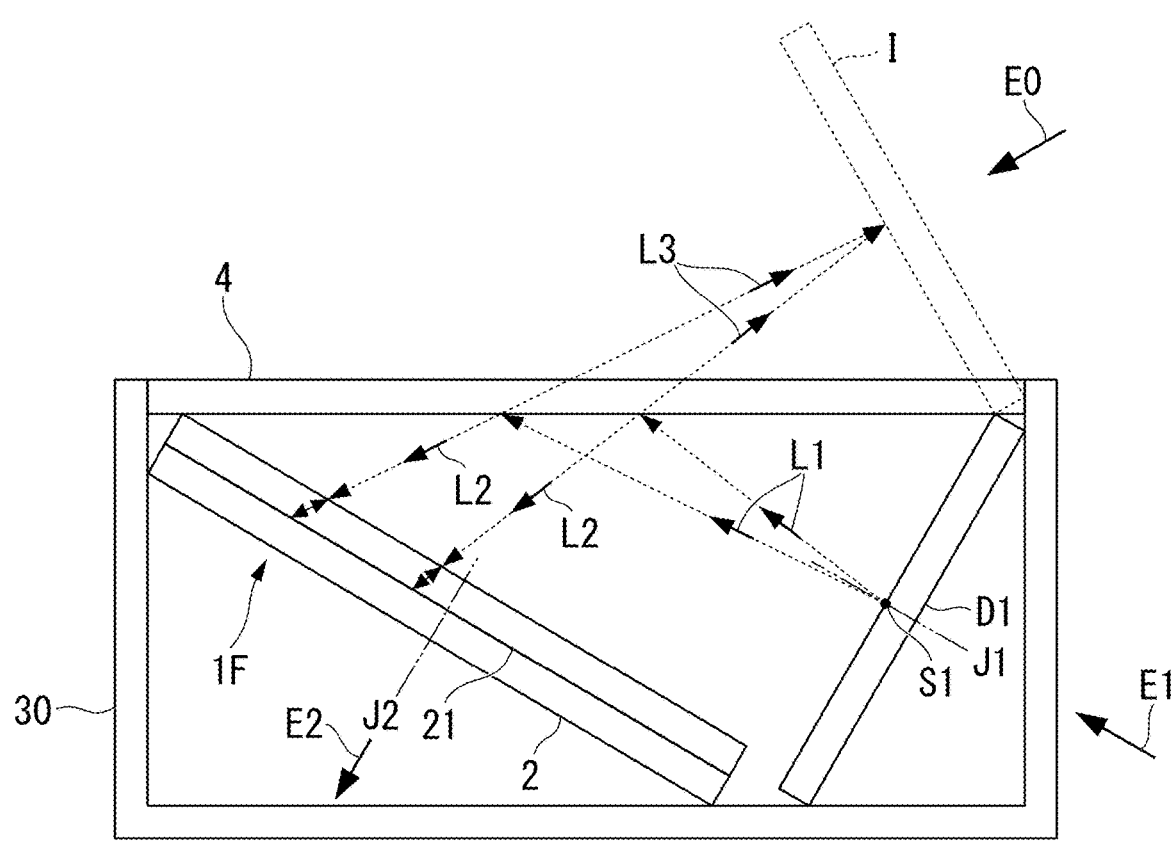
FIG. 26 is a schematic diagram showing a configuration of a display device which is accommodated in a housing and which is the display device according to the present invention.

In addition, the display device according to the present invention may be accommodated in a housing or the like. In FIG. 26, a configuration in which a part of the configuration of the display device according to the present invention 1B is accommodated in a housing 30 is illustrated. Specifically, the first light source S1, the first display D1, the first retro-reflective part 2, and the first wavelength plate 21 of the display device 1B are accommodated inside the housing 30. The first wavelength plate 21 is provided in contact with an upper surface side of the first retro-reflective part 2. A reflective polarizing plate (or a reflective polarization sheet, etc.) is provided as the first light-separating part 4 on the upper surface of the housing 30.

One of P-polarized light and S-polarized light of the first light L1 emitted from the first light source S1 is reflected by the first light-separating part 4, passes through the first wavelength plate 21, is retro-reflected by the first retro-reflective part 2, and passes through the first wavelength plate 21 again. In this case, the first light L1 of which polarization varies is incident on the first light-separating part 4 as the other of P-polarized light and S-polarized light, and also passes therethrough and forms the aerial image I. Therefore, the user can observe the aerial image I from a certain direction E0. Such a display device is portable, and can flexibly cope according to place and installation conditions, and can show the aerial image I to the user.

In addition, in the display device according to the present invention, a prism sheet may be disposed in front of a display including the first light source S1 on the first emission axis J1 and the above light source or the like. Here, in the prism sheet (not shown), a plurality of prism structures having a triangular cross section are arranged in a predetermined direction of a base part (substrate). As the prism structure, for example, a prism structure having a right-angled triangle cross section in which a right angle part is in contact with the side of the substrate, a prism structure having a right-angled triangle cross section in which the long side is in contact with the substrate, and a prism structure of an isosceles triangle may be exemplified. However, the prism structure is not particularly limited as long as it can exhibit a function as a prism. Such a prism sheet can be provided on the first light source S1, the second light source S2, a display, or the like so that a plurality of prisms are disposed in a direction perpendicular to the first emission axis J1.

When a prism sheet is disposed in front of a display including the first light source S1 on the first emission axis J1 and the above light source, the first light L1 is refracted in a predetermined direction on the surface of the prism. Therefore, when an angle of the surface of the prism structure protruding from the substrate is appropriately set, it is possible to collect light at a position at which the aerial image I is formed and improve the brightness of the aerial image I compared to when no prism sheet is provided. In addition, it is assumed that an edge part of the aerial image I may become blurred due to an influence of light scattering or diffraction. However, when the prism sheet is used, it is possible to make the edge of the aerial image I sharp.

In addition, in front of a display including the first light source S1 on the first emission axis J1 and the above light source or the like, a lamination of a plurality of prism sheets of the same type and prism structure pitch or of different types and prism structure pitches may be provided. Thereby, a refraction direction of the first light L1 can be finely set.

Figure 27:
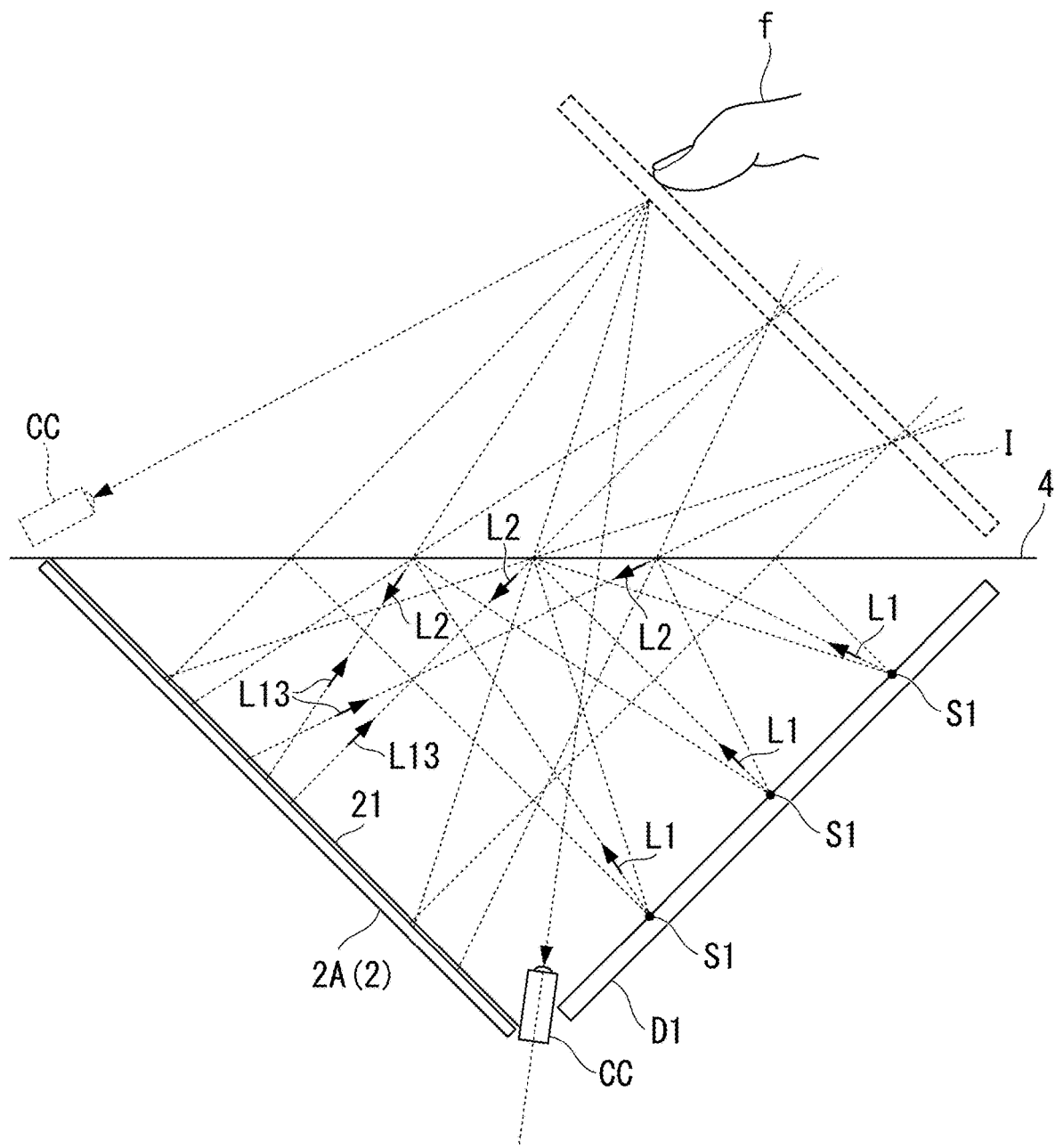
FIG. 27 is a schematic diagram showing a usage example of the display device according to the present invention.

In addition, in the display device according to the present invention, for example, as exemplified in FIG. 27, the housing 30 within the display device shown in FIG. 26 can be omitted. In this configuration, when there is a finger (a finger f in FIG. 24) at any part in the aerial image, the display device according to the present invention can be used as a contact determination device based on a large amount of scattered light detected. In the related art, in order to detect scattered light, a camera CC is disposed at a position indicated by a dashed line in FIG. 24 and capturing is performed. However, when the camera CC is disposed at a position indicated by a solid line in FIG. 24, it is possible to sensitively detect and determine contact of a certain object with the aerial image I.

In addition, in the display device according to the present invention, as an example, a display for displaying in which a plurality of light sources are arranged on the surface has been exemplified. However, the light source of the display device according to the present invention is not limited to light sources that are arranged on the display.

Figure 28:
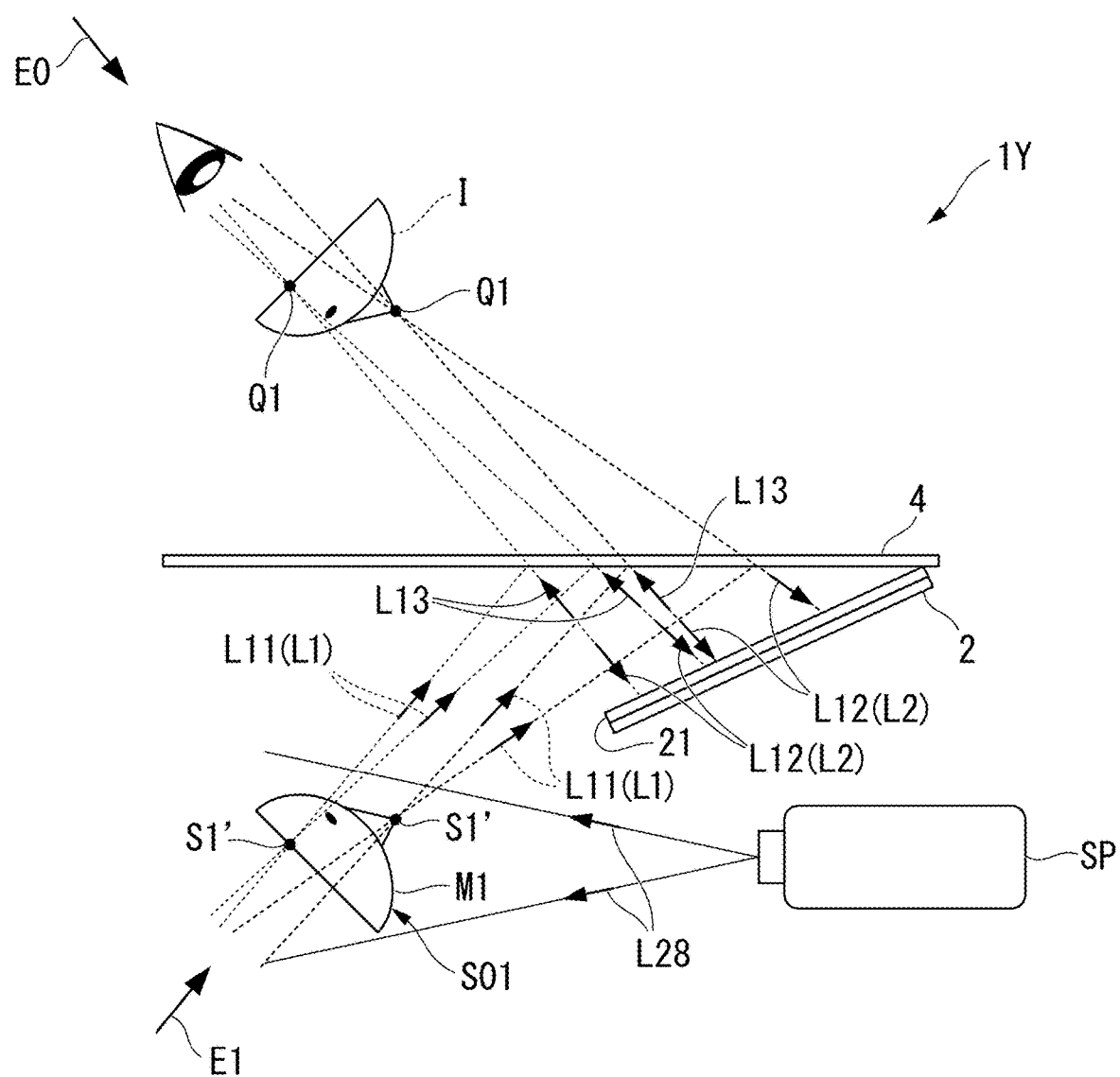
FIG. 28 is a schematic diagram showing a configuration of a third modified example of the display device according to the present invention.

For example, at a position at which the first display D1 for displaying in the display device 1A shown in FIG. 1 is disposed, as shown in FIG. 28, a three-dimensional object SO1 may be disposed, light L28 emitted from a light source such as a projector SP is emitted to the three-dimensional object SO1, and reflected light from a surface (that is, an uneven surface M1) of the three-dimensional object SO1 can be directed toward the first light-separating part 4. Here, the first wavelength plate 21 is disposed on the side of the first light-separating part 4 in the first retro-reflective part 2.

FIG. 28 shows the behavior of light in a display device 1Y with an example of two positions S1' on the uneven surface M1 of the three-dimensional object 501. However, in the display device 1Y, the state becomes close to a state in which numerous point light sources are disposed along the uneven surface M1, and reflected light from the uneven surface M1 acts as the first light L1. Within the first light L1, some of the light L11 is reflected by the first light-separating part 4 as reflected light L12, is incident on the first retro-reflective part 2, is reflected by the second retro-reflective part 6 in the same direction as the incident direction, passes through the first light-separating part 4, and forms the aerial image I at the position Q1 symmetrical to a reflection position of light 28 on the uneven surface M1 with respect to a plate surface (that is, a reflective surface) of the first light-separating part 4.

In the display device 1Y, while irregularities of the aerial image I (real image) are inverted with respect to irregularities of the three-dimensional object SO1 when viewed from the front side (side opposite to the emission direction E1), the user perceives irregularities as being correct, that is, perceives irregularities of the three-dimensional object SO1 when viewed from the front side as being correct. Such an optical illusion is called a hollow face optical illusion. According to the display device 1Y, for example, it is possible to form an aerial image in which irregularities when viewed from the front side of a three-dimensional object having a complex shape that cannot be realized in origami or work using paper are inverted. Examples of the three-dimensional object SO1 include a stuffed toy, a skeletal model, and a game controller, but the present invention is not particularly limited. Here, when a three-dimensional object having a complex shape or a three-dimensional object having large differences in height of irregularities is used, the user experiences the illusion reliably, and an aerial image I in which irregularities of the three-dimensional object are inverted stably is likely to be perceived "correctly" like irregularities when viewed from the front side of three-dimensional object. As a result of an observation experiment, it was found that correct irregularities are perceived, and also, even if the aerial image I is stationary, an illusion that the aerial image I is moving is perceived according to a movement of the user. This effect is beneficial for a digital signage display and a display configured to display aerial images of which lines of sight coincide with each other for many and unspecified users in remote conferences.

In the display device 1Y configured as described above, the shape of the three-dimensional object SO1 is measured in advance, a 3D image sensor is disposed near a projector SP, a state in which reflected light from the uneven surface M1 of the three-dimensional object SO1 is directed toward the first light-separating part 4 is simulated, and the aerial image I may be formed.

EXAMPLES

Next, examples conducted to verify effects of the display devices of the embodiments according to the present invention will be described. However, the present invention is not limited to the following examples.

Example 1

In order to construct the display device 1A shown in FIG. 1, an LED configured to emit visible light was used as the first light source S1. In addition, a special display in which a plurality of first light sources S1 were arranged on the surface of the first display D1 was prepared. As the first retro-reflective part 2, a retro-reflective sheet (product name: high gloss reflective Trim 6160R, manufacturer: 3M) having a size of the unit structure 10 of about 180 μm and made of a transparent plastic was used. A half mirror was used as the first light-separating part 4.

Figure 29:
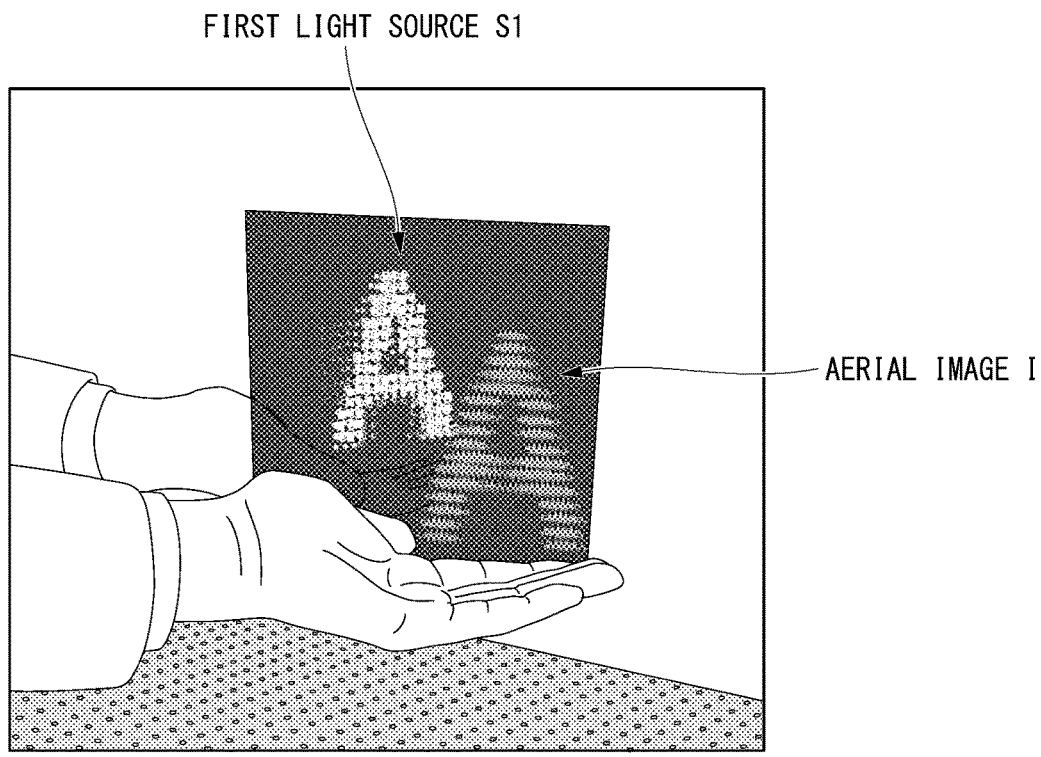
FIG. 29 is a photograph of an aerial image displayed by a display device 1A of Example 1 and light directly transmitted by a light source.

In the constructed display device 1A, when, for example, the letter "A" was displayed on the first display D1, as shown in FIG. 29, it was confirmed that the first light source S1 of the letter "A" and the aerial image I were observed.

Example 2

In order to construct the display device 1E shown in FIG. 7, two first displays D1 as in Example 1 were used. In the second retro-reflective part 6, the same retro-reflective sheet as in the first retro-reflective part 2 was used.

Figure 30:
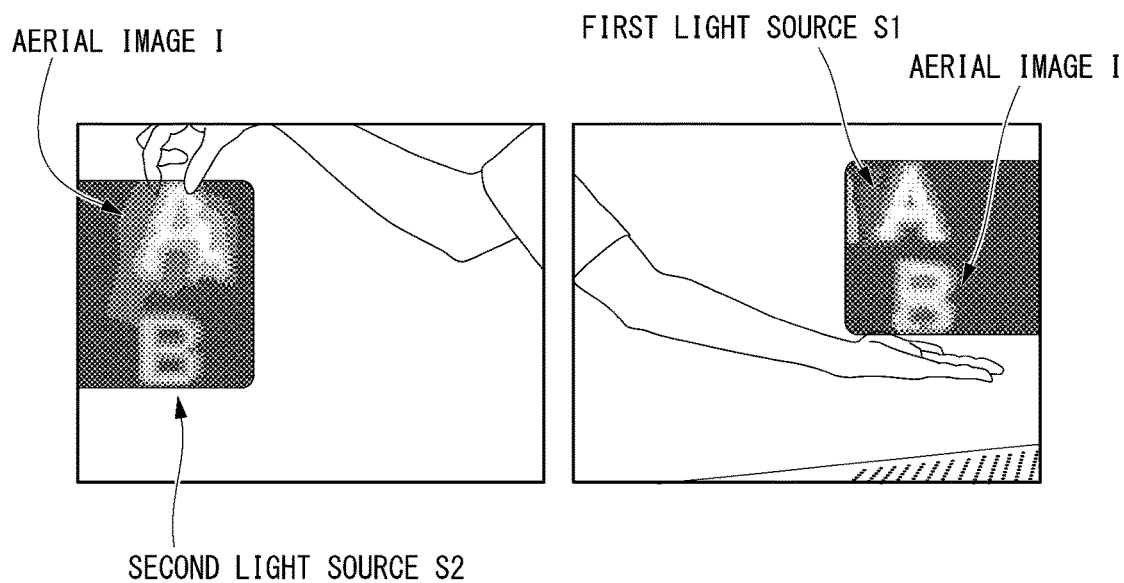
FIG. 30 is a photograph of an aerial image displayed by a display device 1E of Example 2 and light directly transmitted by a light source.

In the constructed display device 1E, it was confirmed that, when, for example, the letter "A" was displayed on the first display D1 and, for example, the letter "B" was displayed on the first display D1, as shown in FIG. 30, when viewed from the observation direction E0, the aerial image I of the letters "A" and "B" from the second light source S2 of the second display D2 was visible, and when viewed from the observation direction E10, the aerial image I of the letter "B" and "B" from the first light source S1 of the first display D1 were observed.

Example 3

In order to construct the display device 1G shown in FIG. 9, an LED configured to emit visible light as in Example 1 was used as the first light source S1. As the first retro-reflective part 2C, a corner cube type retro-reflective sheet (product name: retro-reflective sheet with a phase difference film QR-1, manufacturer: SN Partners) having the retro-reflective structure 3A was used. As the first light-separating part 4, a reflective polarizing film (product name: SHM-2, manufacturer: SN Partners) attached to a transparent acrylic plate was used.

Figure 31:
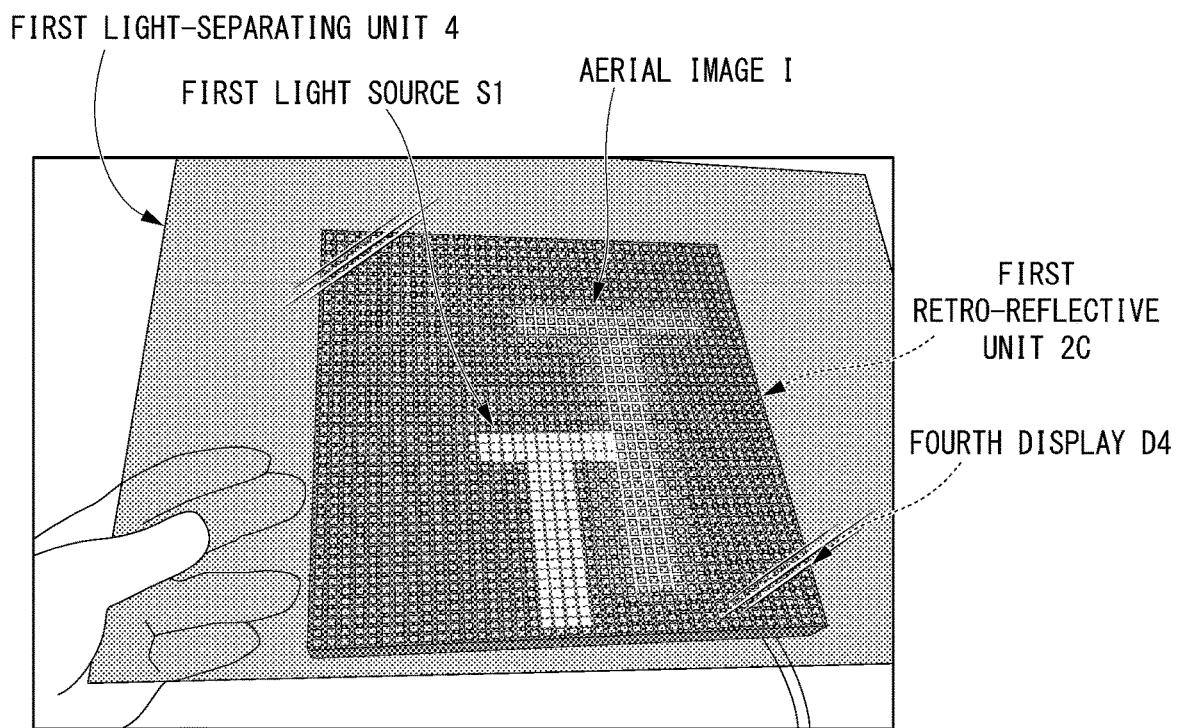
FIG. 31 is a photograph of an aerial image displayed by a display device 1G of Example 3 and light directly transmitted by a light source.

In the constructed display device 1G, it was confirmed that, when, for example, the letter "T" was displayed on the fourth display D4, as shown in FIG. 31, the first light source S1 of the letter "T" and the aerial image I were observed.

In addition, a bead type retro-reflective sheet (product name: ultra high brightness reflective sheet 7610, manufacturer: 3M Corporation) having the retro-reflective structure 3B was used in place of a retro-reflective sheet having the retro-reflective structure 3A to form the display device 1G'.

Figure 32:
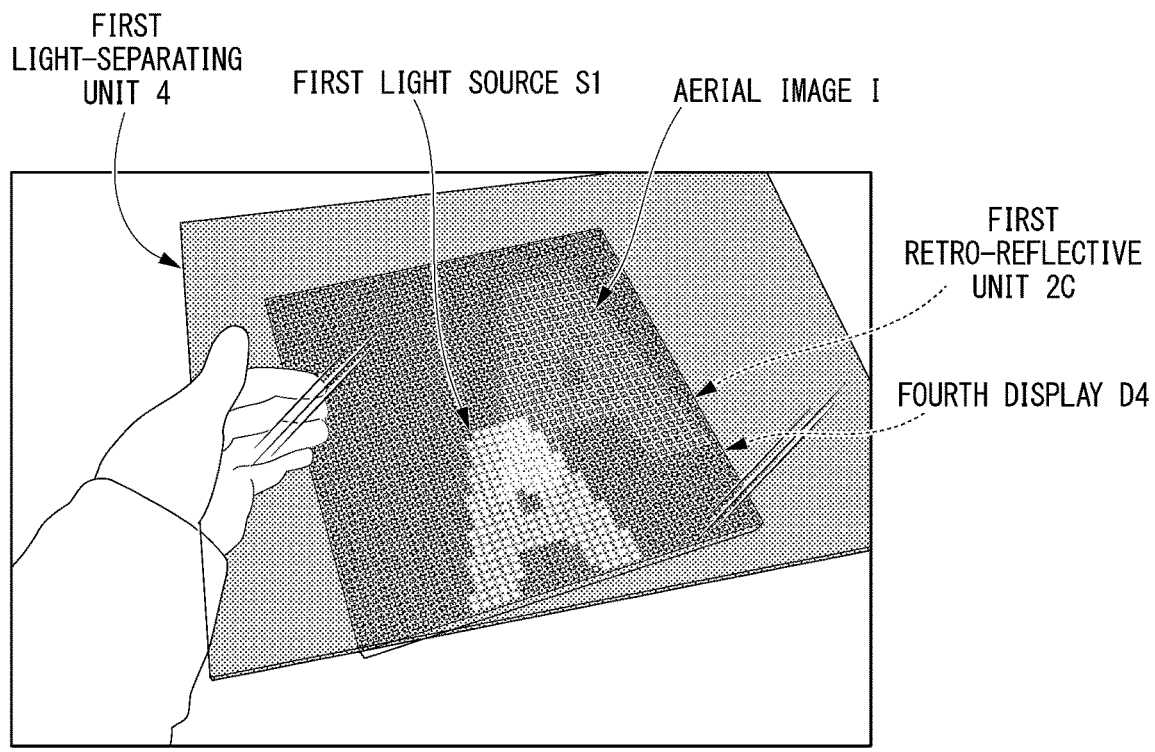
FIG. 32 is a photograph of an aerial image displayed by a display device 1G' of Example 3 and light directly transmitted by a light source.

In the constructed display device 1G', it was confirmed that, when, for example, the letter "A" was displayed on the fourth display D4, as shown in FIG. 32, the first light source S1 of the letter "A" and the aerial image I were observed.

Example 4

In the display device 1G of Example 3, the first light-separating part 4 was disposed so that it was inclined at about 45° with respect to a surface of the fourth display D4 (that is, the first light source S1 and the first retro-reflective part 2C), and thereby the display device 1H shown in FIG. 11 was formed.

Figure 33:
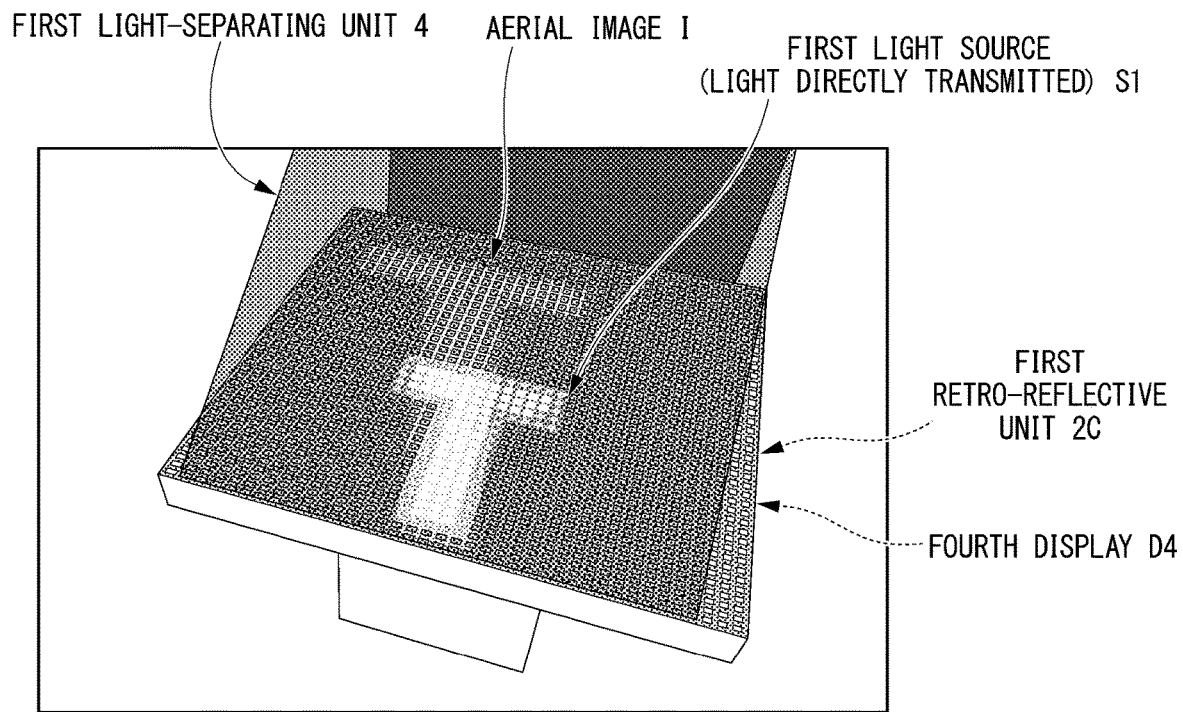
FIG. 33 is a photograph of an aerial image displayed by a display device 1H of Example 4 and light directly transmitted by a light source.

In the constructed display device 1H, it was confirmed that, when, for example, the letter "T" was displayed on the fourth display D4, as shown in FIG. 33, the first light source S1 of the letter "T" and the aerial image I were observed.

Example 5

In the display device 1H of Example 4, when the first retro-reflective part 2C was moved to the position P2 in the emission direction E1 of the first light L1 with respect to the first light source S1 on the first emission axis J1 and the polarizing plate 40 was disposed between the first light source S1 on the first emission axis J1 and the first retro-reflective part 2C, the display device 1H shown in FIG. 11 was formed. As the polarizing plate 40, a polarizing film (product name: polarizing film HN42, manufacturer: Polaroid Corporation) was used.

Figure 34:
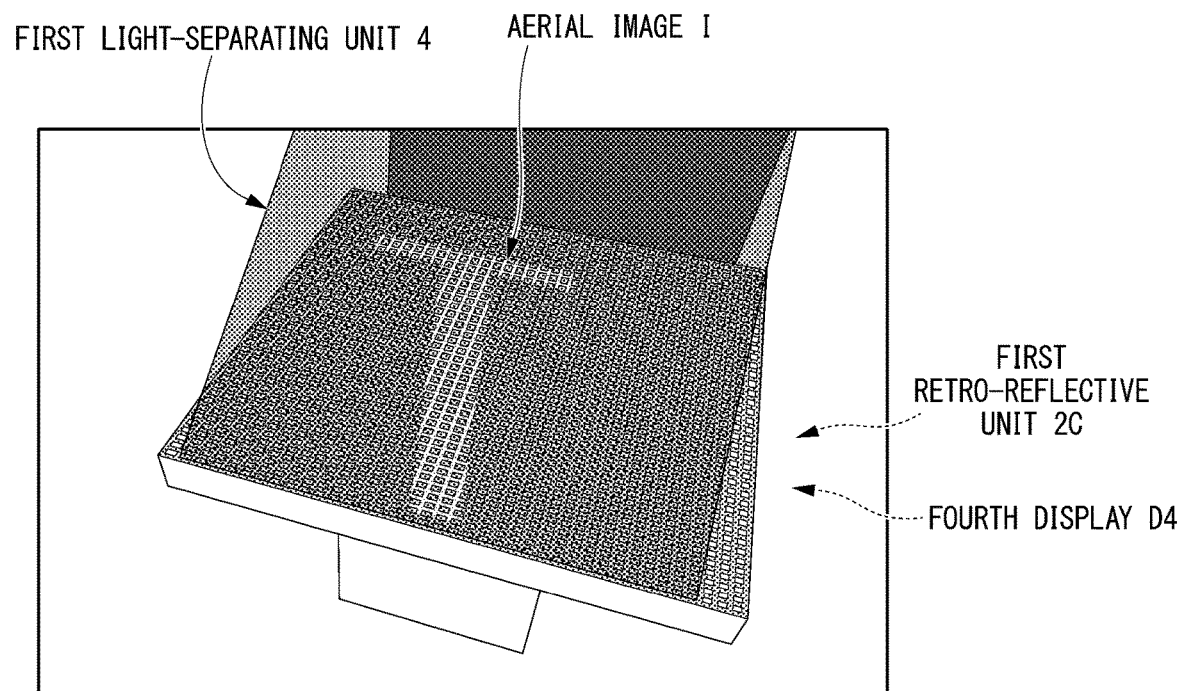
FIG. 34 is a photograph of an aerial image displayed by a display device 1K of Example 5 and light directly transmitted by a light source.

In the constructed display device 1H, it was confirmed that, when, for example, the letter "T" was displayed on the fourth display D4, as shown in FIG. 34, since the first light source S1 (that is, light directly transmitted) of the letter "T" was blocked by the first light-separating part 4 and the polarizing plate 40, only the aerial image I of the letter "T" was observed.

Example 6

In order to construct the display device 1P shown in FIG. 15, an LED configured to emit visible light as in Example 1 was used as the first light source S1. An LED tape in which a plurality of groups of three LEDs disposed at intervals in the width direction were arranged at predetermined intervals in the length direction was used. As the first retro-reflective part 2C, a corner cube type retro-reflective sheet (product name: Nikkalite crystal grade, manufacturer: Nippon Carbide Industries) having the retro-reflective structure 3A was used. As the first light-separating part 4, a reflective polarizing film (product name: SHM-2, manufacturer: SN Partners) attached to a transparent acrylic plate was used.

Figure 35:
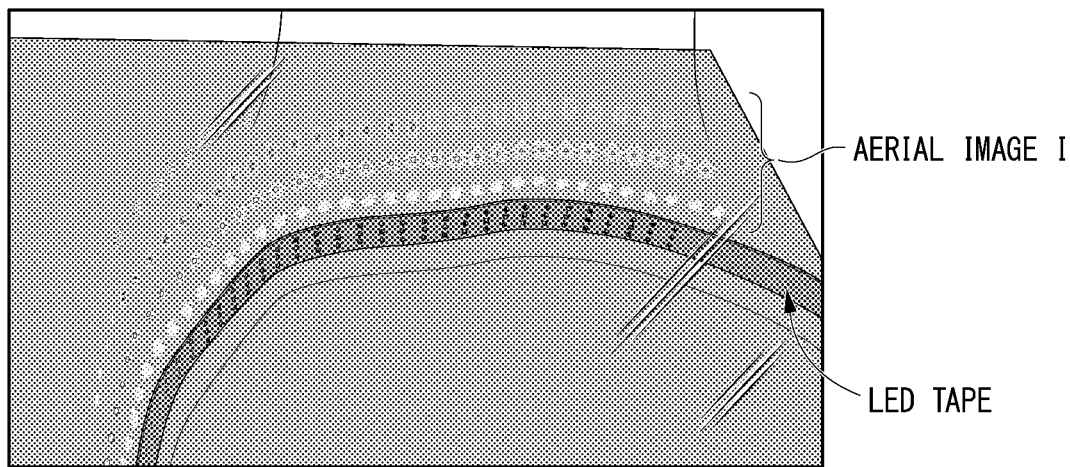
FIG. 35 is a photograph of an aerial image displayed by a display device 1P of Example 6.

In the constructed display device 1P, as shown in FIG. 35, it was confirmed that the aerial images I and virtual images of a plurality of spotlights corresponding to the LEDs arranged in the LED tape were observed.

Figure 36:
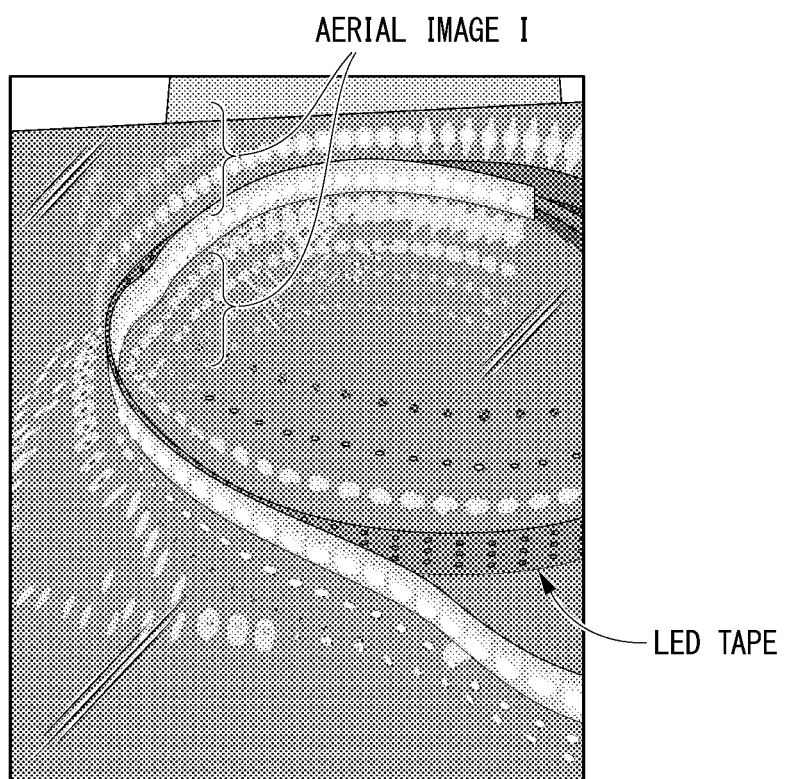
FIG. 36 is a photograph of an aerial image displayed by a display device 1Q of Example 6.

In addition, as shown in FIG. 16, in order to construct the display device 1Q including the first light source S1 and the second light source S2, an LED tape having both surfaces on which LEDs were arranged was used. Such a dual-sided LED tape corresponded to a tape in which the first light source S1 and the second light source S2 shown in FIG. 16 were disposed apart from each other by a thickness of the substrate of the tape. It was confirmed that, when light sources were disposed on both surfaces of the tape in this manner, as shown in FIG. 36, the aerial image I and the virtual image were observed from both sides of the LED tape.

Comparative Example 1 and Example 7

In order to construct the display devices 1TA, 1TB, 1TC, and 1TD shown in FIG. 20 to FIG. 23, special color displays (a first liquid crystal display 51 and a second display 52) including a plurality of LEDs configured to emit visible light as the first light sources S1 were prepared. Specifically, as the backlight 55, the first liquid crystal display 51 and the second display 52, a high-definition high-brightness LED panel (pitch of 4 mm, surface mount package type, product name: P4-LED panel, selling source: WAN Color) and a polysilicon TFT liquid crystal panel (product name: LTM10C348S, manufacturer: Toshiba Corporation) that were disassembled were used. As the first retro-reflective part 2A, a retro-reflective sheet (product name: Nikkalite crystal grade, manufacturer: Nippon Carbide Industries) having a size of the unit structure 10 of about 180 μm and made of a transparent plastic was used. As the first light-separating part 4, a commercially available half mirror (reflectivity and transmittance were both about 50%) or a reflective polarizing film (product name: SHM-2, manufacturer: SN Partners) attached to a transparent acrylic plate was used. As the first polarizing plate 40A and the second polarizing plate 40B, a polarizing plate obtained by disassembling the above polysilicon TFT liquid crystal panel or a single commercially available polarizing plate (product name: HN42, manufacturer: Polaroid Corporation) was used. A commercially available λ/4 plate was used as the first wavelength plate 21 and the second wavelength plate 22.

The display device CT shown in FIG. 19 and the display device 1T shown in FIG. 20 to FIG. 23 were constructed using the above components. Respective aerial images I formed from the color image shown in FIG. 36 displayed on the special color display were captured using a lens (product name: F-S DX NIKKOR 18-140 mm, f/3.5-5.6G ED VR, manufacturer: Nikon Corporation) of an imaging camera (product name: D5500, manufacturer: Nikon Corporation). An F value of the imaging camera was 4.8 and a shutter speed during capturing was 1/10 (ISO: 400).

Figure 37:
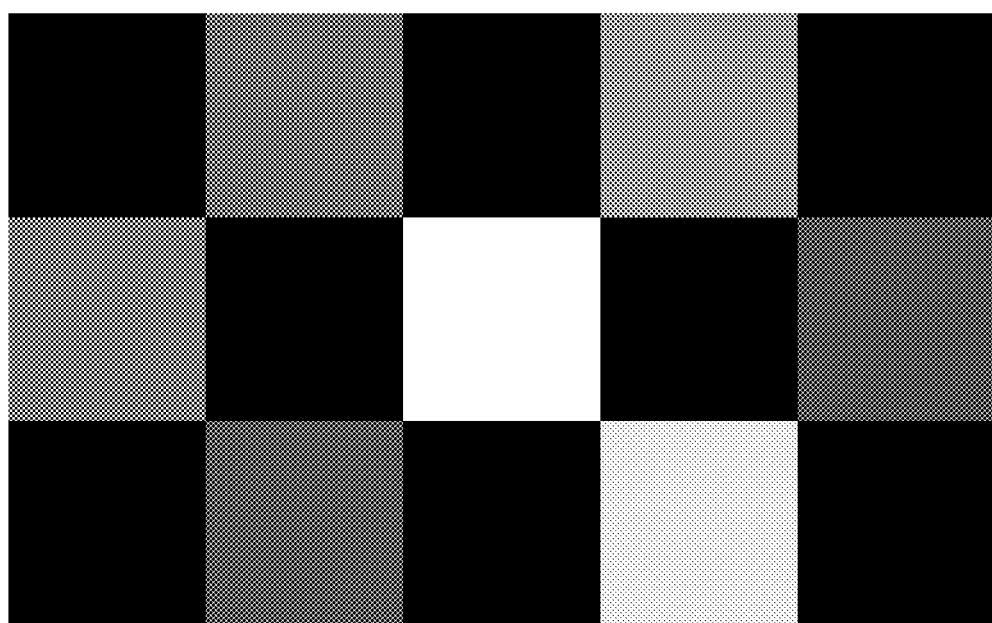
FIG. 37 is an exit image of a special color display used in Example 7 and Comparative Example 1.
Figure 42:
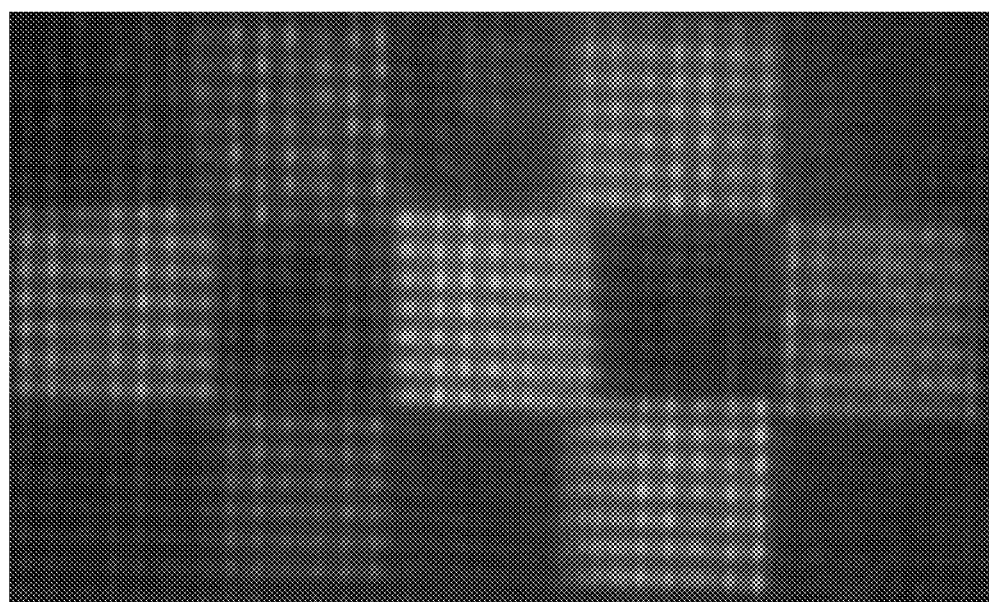
FIG. 42 is a photograph of an aerial image displayed by a display device 1T(4) of Example 7.

Here, both FIG. 37 and FIG. 42 show grayscale images in which grayscale information was used in place of color information.

Figure 38:
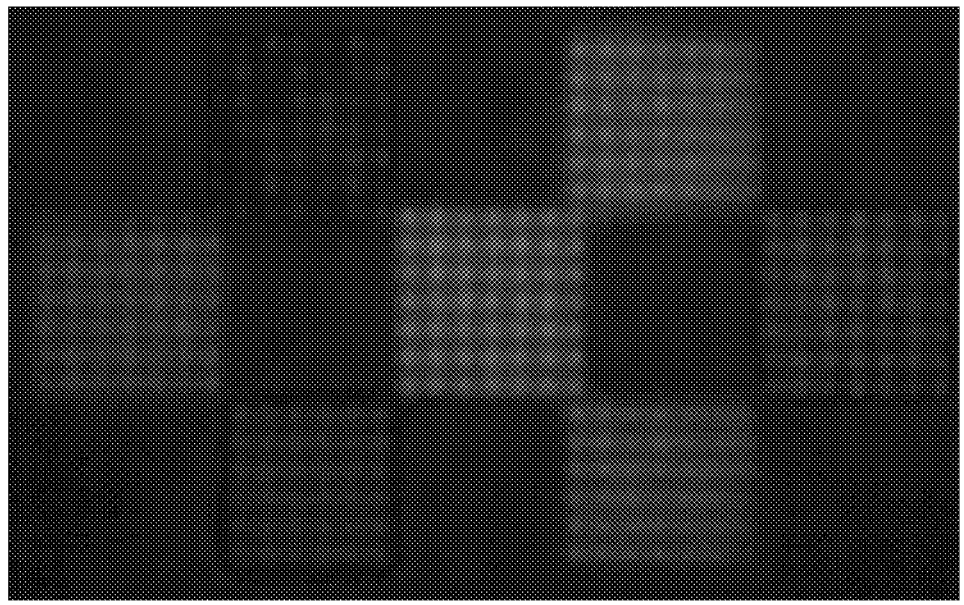
FIG. 38 is a photograph of an aerial image displayed by a display device CT of Comparative Example 1.

As a comparative example, in the constructed display device CT, a half mirror was used as the first light-separating part 4, and as shown in FIG. 38, the aerial image I corresponding to an image of the special color display was captured.

As an example, in the constructed display device 1TA, a reflective polarizing plate was used in place of a half mirror as the first light-separating part 4. According to the above disposition configuration, as shown in FIG. 39, a brighter aerial image I than the aerial image I shown in FIG. 38 was captured.

In addition, in the constructed display device 1TB, a reflective polarizing film (product name: SHM-2, manufacturer: SN Partners) attached to a transparent acrylic plate was used as the first polarizing plate 40A, and the second polarizing plate 40B was not used. Therefore, loss of the first light L1 was prevented, and a clearer aerial image I than that in FIG. 39 was captured as shown in FIG. 40.

Figure 39:
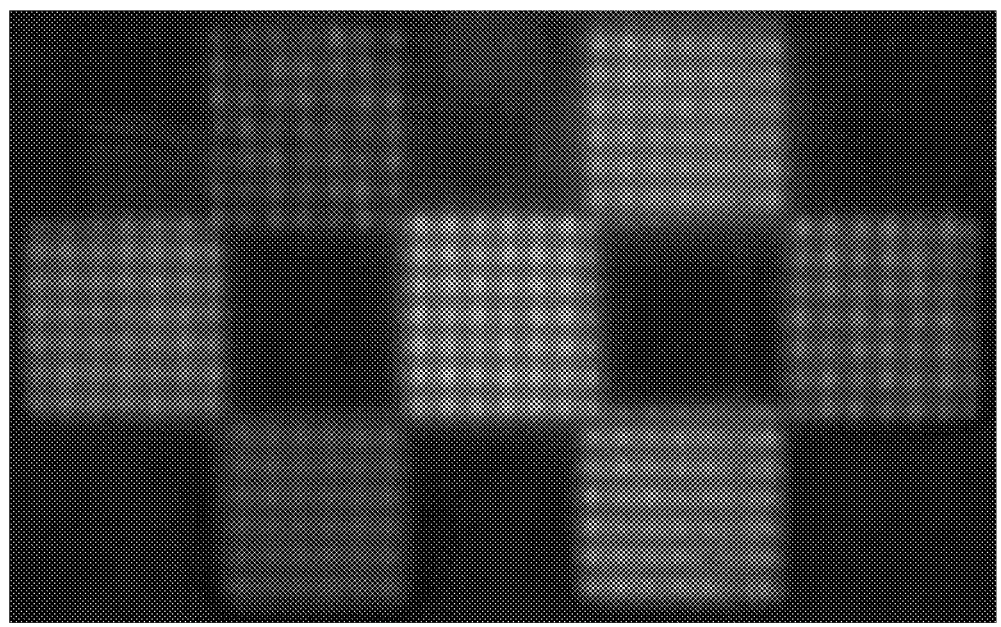
FIG. 39 is a photograph of an aerial image displayed by a display device 1T(1) of Example 7.
Figure 40:
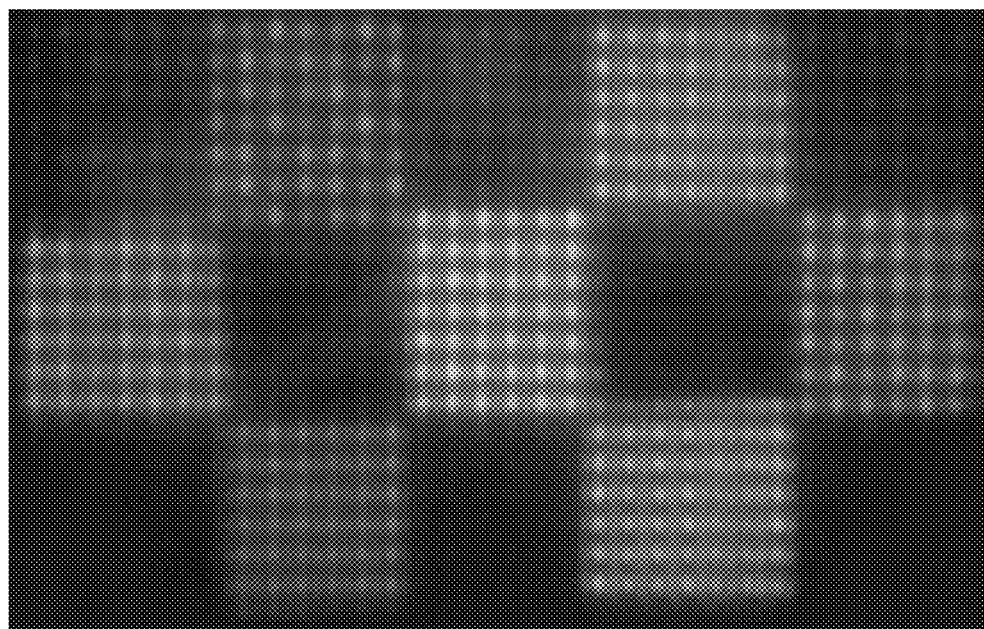
FIG. 40 is a photograph of an aerial image displayed by a display device 1T(2) of Example 7.
Figure 41:
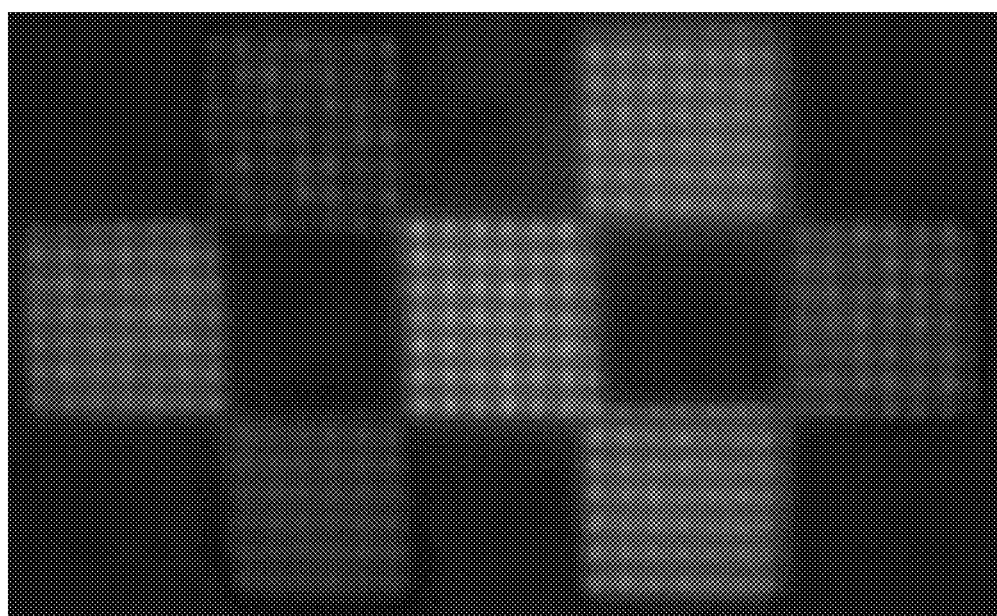
FIG. 41 is a photograph of an aerial image displayed by a display device 1T(3) of Example 7.

In addition, in the constructed display device 1TC, as shown in FIG. 41, the aerial image I having the same level of brightness as the display device 1TA shown in FIG. 39 was captured.

In addition, in the constructed display device 1TD, the above reflective polarizing film was used as the first polarizing plate 40A, the second polarizing plate 40B was not used, and the first wavelength plate 21 and the second wavelength plate 22 were used. Therefore, as shown in FIG. 42, an aerial image I which was brighter and had somewhat lower contrast than the aerial image I of the display device 1TC shown in FIG. 41 was captured.

Example 8

In the constructed display device 1TB in Example 7, an aerial image I when an image of the letter "F" in a single color was displayed on the first liquid crystal panel 51 and an image of the letter "B" in a single color was displayed on the second liquid crystal panel 52 was captured. An F value of the imaging camera was changed to 3.5, and a shutter speed during capturing remained at 1/10 (ISO: 400) without change.

Figure 43:
FIG. 43 is a photograph of an aerial image displayed by a display device 1T(2) of Example 8, which is captured on the left side in a direction that directly faces the aerial image.
Figure 44:
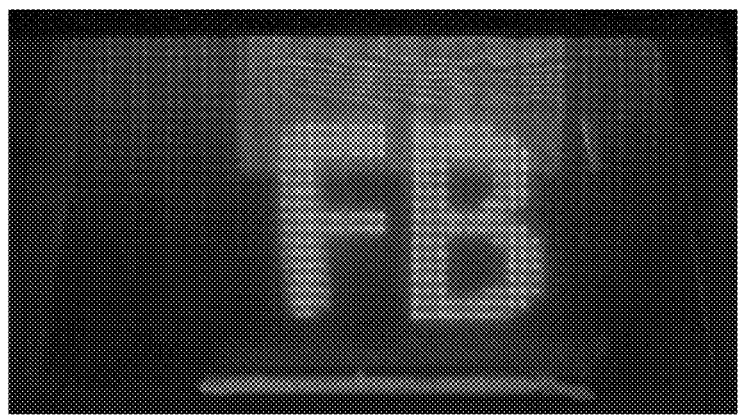
FIG. 44 is a photograph of an aerial image displayed by a display device 1T(2) of Example 8, which is captured in the front in a direction that directly faces the aerial image
Figure 45:
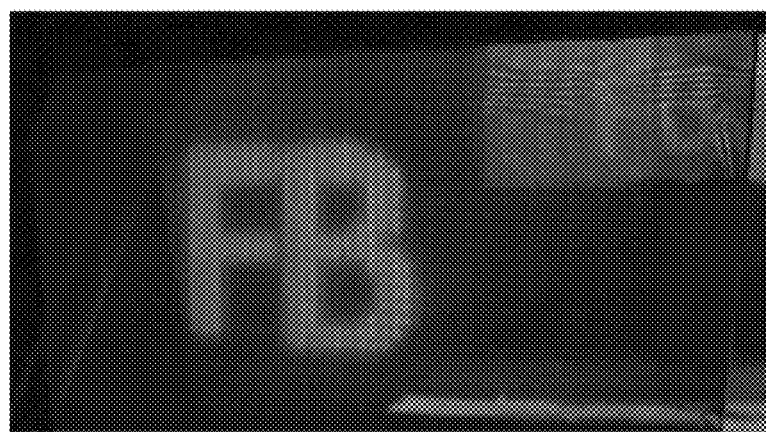
FIG. 45 is a photograph of an aerial image displayed by the display device 1T(2) of Example 8, which is captured on the right side in a direction that directly faces the aerial image.

Capturing was performed in a left direction, a front direction, and a right direction with respect to a direction that directly faces the aerial image I, and as a result, it was confirmed that respective aerial images I shown in FIG. 43, FIG. 44, and FIG. 45 were formed. It was confirmed that, while the aerial image I captured in the front direction was brightest and clear, even if capturing was performed in the left direction and the right direction, the aerial image I in which the letters "F" and "B" were able to be clearly read was obtained. A parallax corresponding to an interval of two layers was observed from the left and right, and it was confirmed that the aerial image I having a depth was formed.

Figure 46:
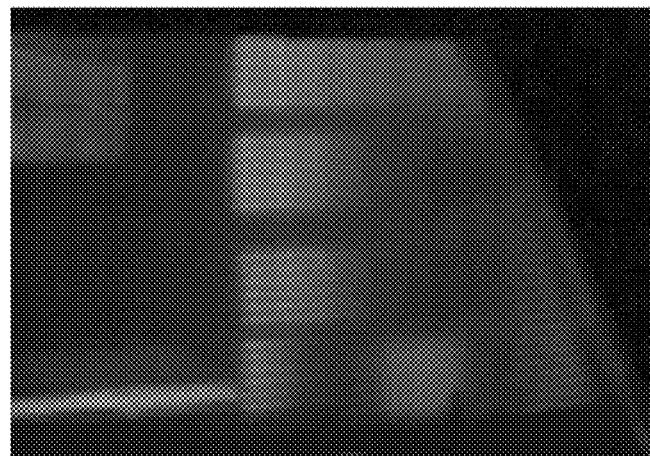
FIG. 46 is a photograph of another aerial image displayed by the display device 1T(2) of Example 8, which is captured on the left side in a direction that directly faces the aerial image.
Figure 47:
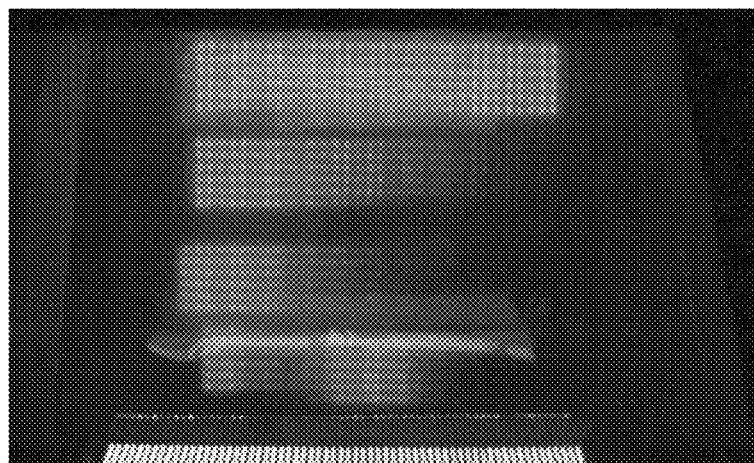
FIG. 47 is a photograph of another aerial image displayed by the display device 1T(2) of Example 8, which is captured in the front in a direction that directly faces the aerial image.
Figure 48:
FIG. 48 is a photograph of another aerial image displayed by the display device 1T(2) of Example 8, which is captured on the right side in a direction that directly faces the aerial image.

In the above configuration, a band-like single color dot pattern (drawing) in which the concentration continuously changed in the left-right direction with respect to a direction that directly faces the aerial image I was displayed in place of the letters "F" and "B," and the formed aerial image I was captured. It was confirmed that respective aerial images I shown in FIG. 46, FIG. 47, and FIG. 48 were formed. In addition, a single color dot pattern that had a depth in the oblique direction was observed.

Example 9

Figure 49:
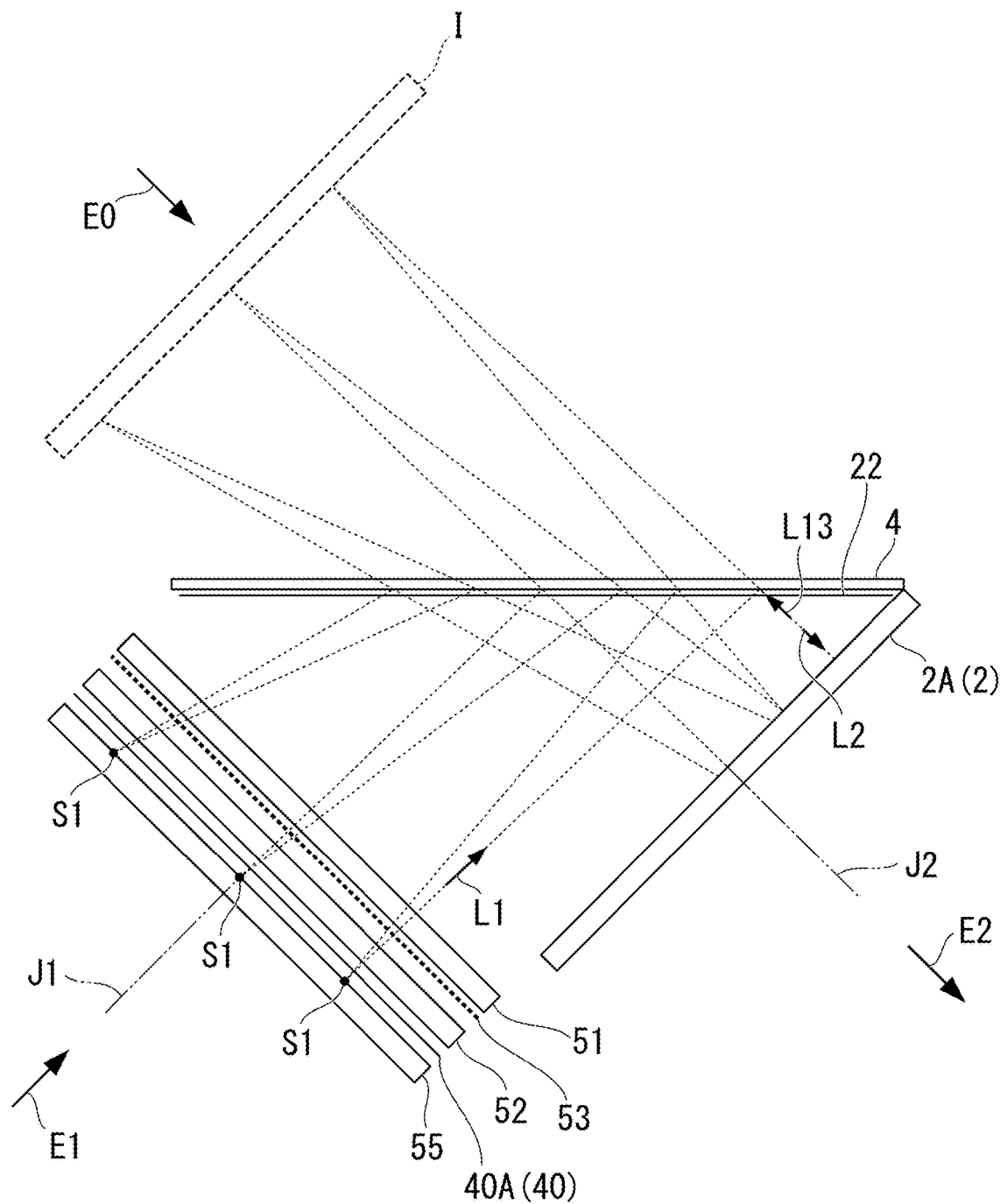
FIG. 49 is a schematic diagram showing a configuration of a display device of Example 9.

In the constructed display device 1TD in Example 7, as shown in FIG. 49, a wavelength plate 53 was disposed between the first liquid crystal panel 51 on the first emission axis J1 and the second liquid crystal panel 52 and then a color tone correction test was performed. The wavelength plate 53 was a so-called λ/2 plate and applied a phase difference of π in an electric field vibration direction of incident light.

Figure 50:
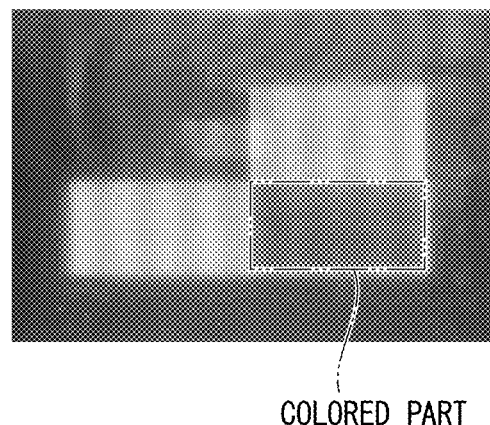
FIG. 50 is a photograph of an aerial image displayed before a wavelength plate 53 is disposed in the display device of Example 9.
Figure 51:
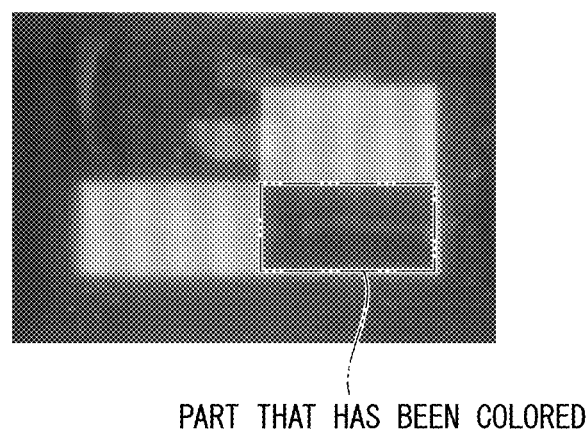
FIG. 51 is a photograph of an aerial image displayed when the wavelength plate 53 is disposed in the display device of Example 9.

FIG. 50 shows an image before the wavelength plate 53 was disposed, that is, the captured aerial image I in the display device 1TD. On the other hand, FIG. 51 shows the aerial image I captured when the wavelength plate 53 was disposed between the first liquid crystal panel 51 of the first emission axis J1 and the second liquid crystal panel 52, and the wavelength plate 53 was disposed so that the optical axis of the wavelength plate 53 was in a direction of 45° with respect to the width direction of the backlight 55. As can be understood from FIG. 51, when the wavelength plate 53 was disposed, a coloring phenomenon due to wavelength dispersion was eliminated and a color of a part in which the red aerial image I was formed disappeared before the wavelength plate 53 was disposed. That is, while both FIG. 49 and FIG. 50 are shown as grayscale images, "a part that has been colored" shown in FIG. 51 was darker than "a colored part" shown in FIG. 50, and thus it was confirmed that the above coloring phenomenon was eliminated.

Example 10

Figure 52:
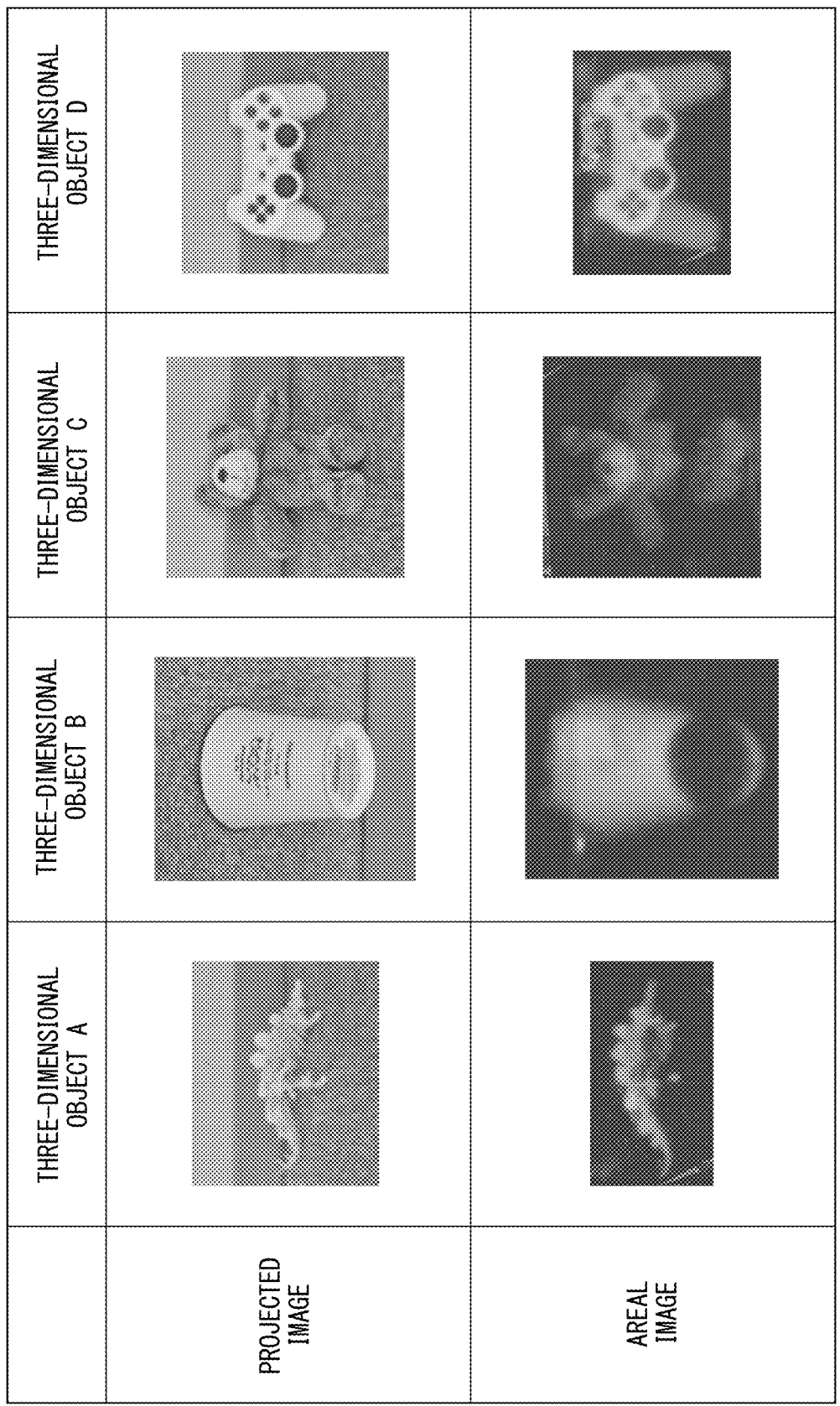
FIG. 52 shows projected images of three-dimensional objects used in a display device of Example 10 and photographs of the obtained aerial images.
Figure 53:
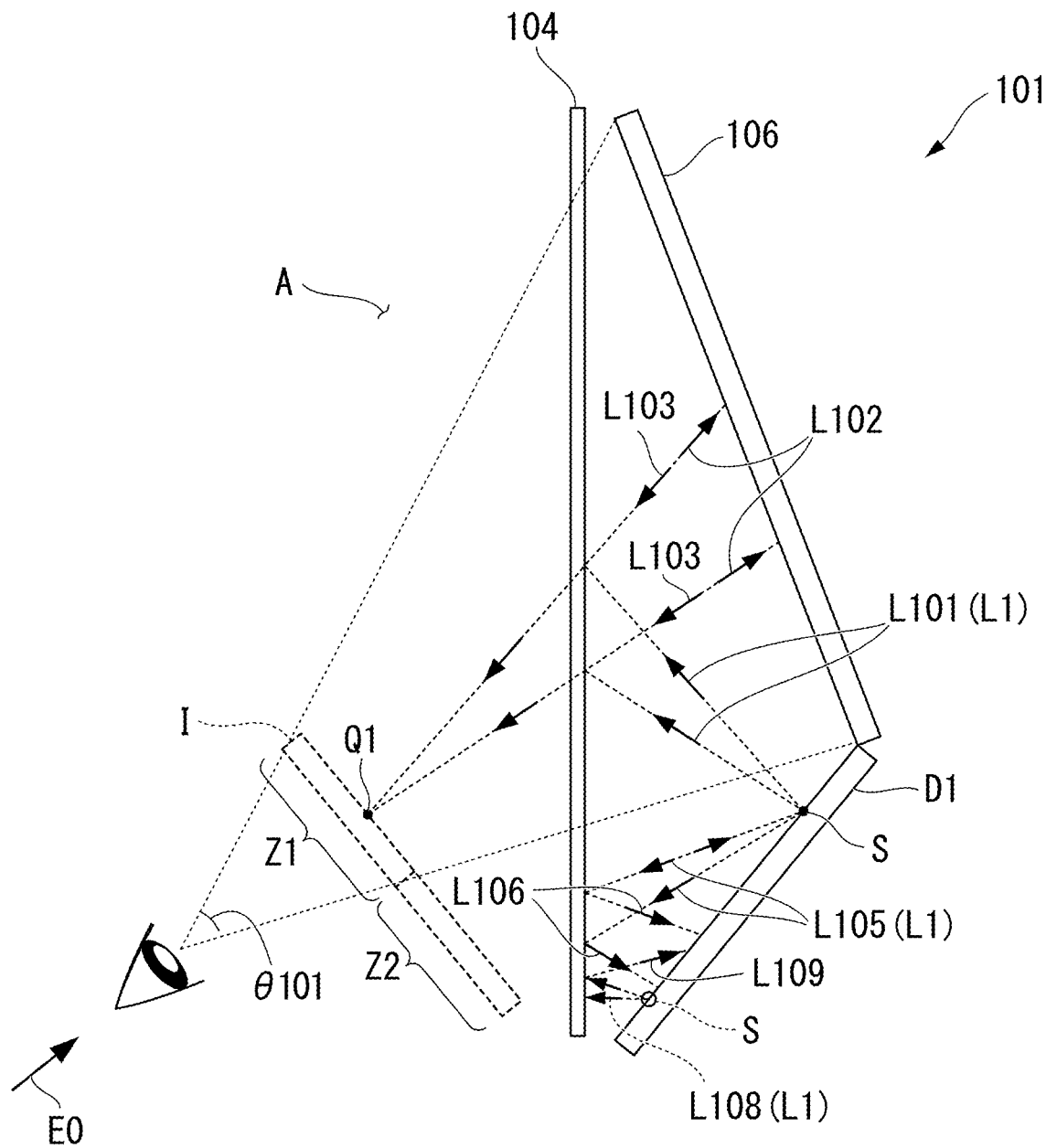
FIG. 53 is a schematic diagram showing a configuration of a conventional display device.

In order to construct the display device shown in FIG. 28, a three-dimensional object A: a dinosaur skeleton, a three-dimensional object B: a paper cup, a three-dimensional object C: a teddy bear, and a three-dimensional object D: a game controller shown in the "projected images" in FIG. 52 were individually disposed at positions corresponding to the installation position of the first display in the display device 1A as the three-dimensional objects SO1, and light was emitted to the respective three-dimensional objects SO1 appropriately using a general projector (product name: PT-DX820JW, manufacturer: Panasonic Corporation). As the first retro-reflective part 2, a prism type retro-reflective sheet (product name: Nikkalite crystal grade, manufacturer: Nippon Carbide Industries) was used. As the first light-separating part 4, an SHM-2 (product name, manufacturer: SN Partners) attached to a transparent acrylic plate was used.

According to the constructed display device 1Y, it was confirmed that, as shown in the "aerial images" in FIG. 52, when the three-dimensional object A: a dinosaur skeleton, and the three-dimensional object B: a paper cup were disposed, the aerial images I corresponding to the three-dimensional objects were observed.

As can be understood from the examples described above, according to the display device to which the present invention is applied, it can be understood that it is possible to observe the aerial image I at a wider angle, and it is possible to obtain operations and effects in various configurations.

The invention claimed is:

1. A display device, comprising:
   a light source;
   a retro-reflective part which is disposed at a position on a first emission axis that indicates an emission direction of first light emitted from the light source; and
   a light-separating part configured to reflect at least a part of the first light emitted from the light source as first reflected light and configured to transmit at least a part of the first reflected light that is retro-reflected by the retro-reflective part;
   wherein the retro-reflective part is divided into a first region in which a light that is incident into an optical incidence plane side of the retro-reflective part is retro-reflected and a second region which is a region emitting the first light as the light source or a region in which the first light emitted from the light source passes through to the optical incidence plane side and which is a region other than the first region; and
   wherein the light-separating part reflects at least part of the first light emitted from the light source as first reflected light and transmits at least part of the first reflected light retro-reflected from the first region.

2. A display device, comprising:
   a light source;
   a retro-reflective part which is disposed at a position on an emission axis that indicates an emission direction of light emitted from the light source; and
   a light-separating part configured to reflect at least a part of the light emitted from the light source as reflected light and configured to transmit at least a part of the reflected light that is retro-reflected by the retro-reflective part,
   wherein the retro-reflective part is disposed on the side opposite to the emission direction of the light with respect to the light source on the emission axis, and
   wherein, at a position at which the light source on the emission axis is disposed, there is disposed a removed section of the light source in which the light and the reflected light are able to transmit.

3. The display device according to claim 2, wherein an imaging element is disposed between the light source on the emission axis and the retro-reflective part.

4. A display device, comprising:
   a light source;
   a retro-reflective part which is disposed at a position on an emission axis that indicates an emission direction of light emitted from the light source; and
   a light-separating part configured to reflect at least a part of the light emitted from the light source as reflected light and configured to transmit at least a part of the reflected light that is retroreflected by the retro-reflective part,
   wherein the reflected light is incident on the retro-reflective part,
   the display device further including:
   a first wavelength plate that is disposed between the light source on the emission axis and the retro-reflective part, a second wavelength plate that is disposed in the emission direction of the light with respect to the retro-reflective part on the emission axis, and a polarization branching part that is disposed between the light source on the emission axis and the first wavelength plate, and transmits specific polarized light to pass therethrough, and wherein the first wavelength plate and the second wavelength plate provide a phase difference of ($\pi/2$) in an electric field vibration direction of light that is incident on each plate.

5. A display device comprising:

a first light source;

a first retro-reflective part which is disposed at a position on a first emission axis that indicates an emission direction of first light emitted from the first light source;

a light-separating part configured to reflect at least a part of the first light emitted from the first light source as first reflected light and configured to transmit at least a part of the first reflected light that is retro-reflected by the first retro-reflective part; and a second retro-reflective part which is disposed at a position on a second emission axis that indicates an emission direction of the first reflected light reflected by the light-separating part and which is disposed at a different position from the first retro-reflective part.

6. The display device according to claim 5, further comprising:

a second light source configured to emit second light to the side opposite to an emission direction of the first reflected light reflected by the first light-separating part, and wherein the second retro-reflective part is disposed at a position on a third emission axis that indicates an emission direction of the second light and is able to retro-reflect the first reflected light and transmits the second light.

7. A display device comprising:

a first light source;

a first retro-reflective part which is disposed at a position on a first emission axis that indicates an emission direction of first light emitted from the first light source;

a first light-separating part configured to reflect at least a part of the first light emitted from the first light source as first reflected light and configured to transmit at least a part of the first reflected light that is retro-reflected by the first retro-reflective part;

a first wavelength plate that is disposed between the first light source on the first emission axis and the first retro-reflective part, a second wavelength plate that is disposed in the emission direction of the first light with respect to the first retro-reflective part on the first emission axis;

a first polarization branching part that is disposed between the first light source on the first emission axis and the first wavelength plate and transmits specific polarized light;

a second light source configured to emit second light to the side opposite to an emission direction of the first reflected light reflected by the first light-separating part;

a second retro-reflective part which is disposed at a position on a second emission axis that indicates an emission direction of the second light and is able to retro-reflect the first reflected light and transmits the second light;

a second light-separating part that reflects at least some of the second light that has passed through the second retro-reflective part as second reflected light and transmits at least a part of the second reflected light retro-reflected by the second retro-reflective part;

a third wavelength plate that is disposed between the second light source on the second emission axis and the second retro-reflective part;

a fourth wavelength plate that is disposed in the emission direction of the second light with respect to the second retro-reflective part on the second emission axis; and a second polarization branching part that is disposed between the second light source on the second emission axis and the third wavelength plate and transmits polarized light perpendicular to the specific polarized light, and wherein the first wavelength plate, the second wavelength plate, the third wavelength plate and the fourth wavelength plate provide a phase difference of ($\pi/2$) in an electric field vibration direction of light that is incident on each plate.

8. A display device comprising:

a light source;

a retro-reflective part which is disposed at a position on an emission axis that indicates an emission direction of light emitted from the light source;

a first light-separating part configured to reflect at least a part of the light emitted from the light source as reflected light and configured to transmit at least a part of the reflected light that is retro-reflected by the retro-reflective part; and a second light-separating part which is disposed so as to face to the first light-separating part with the light source interposed therebetween;

wherein an emission part of the light source is directed to a space formed between the first light-separating part and the second light-separating part, wherein the second light-separating part reflect at least a part of the light as reflected light and reflect at least some of the reflected light, and wherein, in one light-separating part between the first light-separating part and the second light-separating part, a retro-reflective part is provided on the side opposite to the side that faces the other light-separating part.

9. A display device, comprising:

a display which has an S wave light-emitting part which is configured to emit S wave polarized light and a P wave light-emitting part which is configured to emit P wave polarized light and which emits light including the S wave polarized light and P wave polarized light;

a first wavelength plate which provides a phase difference of ($\pi/2$) in an electric field vibration direction of light that is incident on the first wavelength plate and which transmits the light in which is provided the phase difference by the first wavelength plate;

a retro-reflective part which transmits light that is incident from a side closer to the display on the retro-reflective part and which retro-reflects light that is incident from an opposite side of the side closer to the display on the retro-reflective part;

a second wavelength plate which provides a phase difference of ($\pi/2$) in an electric field vibration direction of light that is incident on the second wavelength plate and which transmits the light in which is provided the phase difference by the second wavelength plate; and a light-separating part which separates light that is incident from a side closer to the display on the light-separating part to reflecting light and transmitting light;

wherein the display, the first wavelength plate, the retro-reflective part, the second wavelength plate and the light-separating part are arranged in this order along an emission direction of the light emitted from the display;

wherein the light emitted from the display is transmitted through the first wavelength plate, the retroreflective part and the second wavelength plate and is incident on the light-separating part; and wherein light reflected by the light-separating part is transmitted through the second wavelength plate and is retro-reflected by the retro-reflective part.

* * * * *